US012743060B2

(12) United States Patent
Honkote et al.

(10) Patent No.: US 12,743,060 B2
(45) Date of Patent: Sep. 22, 2026

(54) SYSTEMS, METHODS AND APPARATUS FOR DATA QUALITY ASSESSMENT AND LEARNING FOR AUTOMATED DEVICES

(71) Applicant: Intel Corporation, Santa Clara, CA (US)

(72) Inventors: Vinayak Honkote, Portland, OR (US); Rita Wouhaybi, Portland, OR (US); Rajesh Poornachandran, Portland, OR (US); Anshu Mishra, Delhi (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/148,362

(22) Filed: Dec. 29, 2022

(65) Prior Publication Data

US 2023/0244191 A1 Aug. 3, 2023

(51) Int. Cl.
*G05B 13/02* (2006.01)

(52) U.S. Cl.
CPC ................................ *G05B 13/0265* (2013.01)

(58) Field of Classification Search
CPC ................................................. G05B 13/0265
See application file for complete search history.

(56) References Cited

U.S. PATENT DOCUMENTS

| | | | | |
|---|---|---|---|---|
| 8,996,224 | B1 | 3/2015 | Herbach | |
| 10,156,848 | B1 | 12/2018 | Konrardy | |
| 10,162,355 | B2 | 12/2018 | Hayon | |
| 10,185,998 | B1 | 1/2019 | Konrardy | |
| 10,223,479 | B1 | 3/2019 | Konrardy | |
| 10,324,463 | B1 | 6/2019 | Konrardy | |
| 10,395,332 | B1 | 8/2019 | Konrardy | |
| 2006/0167784 | A1 | 7/2006 | Hoffberg | |
| 2007/0063875 | A1 | 3/2007 | Hoffberg | |
| 2010/0317420 | A1 | 12/2010 | Hoffberg | |
| 2013/0185309 | A1 * | 7/2013 | Bhide | G06F 16/2272 707/748 |

(Continued)

FOREIGN PATENT DOCUMENTS

WO 2018126067 A1 7/2018

OTHER PUBLICATIONS

Leach, et al., 2014. "Contextual anomaly detection in crowded surveillance scenes." Pattern Recognition Letters, 44, pp.71-79.

Hayes, et al., 2015. "Contextual anomaly detection framework for big sensor data." Journal of Big Data, 2(1), p. 2.

Rifai et al., "A Generative Process for Sampling Contractive Auto-Encoders," Proceedings of the 29th International Conference on Machine Learning, Edinburgh, Scotland, 2012 (8 pages).

(Continued)

*Primary Examiner* — Suresh Suryawanshi
(74) *Attorney, Agent, or Firm* — Hanley, Flight & Zimmerman, LLC

(57) ABSTRACT

Methods, apparatus, systems and articles of manufacture (e.g., physical storage media) to perform data quality assessment and learning for automated agents are disclosed. An example apparatus disclosed herein includes processor circuitry to calculate a data quality score for data generated by sensors of an autonomous agent. The processor circuitry also generates a reputation score based on the data quality score and the data generated by the sensors. The reputation score indicates a level of confidence in an accuracy of the data quality score. Usage of the data by an action circuitry of the autonomous agent is controlled based on the data quality score and the reputation score. The data quality score and the reputation score are a first value and a second value, respectively.

24 Claims, 13 Drawing Sheets

(56) References Cited

U.S. PATENT DOCUMENTS

| | | | | |
|---|---|---|---|---|
| 2014/0201126 | A1 | 7/2014 | Zadeh | |
| 2015/0353085 | A1 | 12/2015 | Lee | |
| 2016/0170998 | A1 | 6/2016 | Frank | |
| 2016/0191163 | A1 | 6/2016 | Preston | |
| 2016/0224803 | A1 | 8/2016 | Frank | |
| 2018/0018508 | A1 | 1/2018 | Tusch | |
| 2018/0188043 | A1 | 7/2018 | Chen | |
| 2018/0188372 | A1 | 7/2018 | Wheeler | |
| 2018/0188743 | A1 | 7/2018 | Wheeler | |
| 2018/0189578 | A1 | 7/2018 | Yang | |
| 2018/0204111 | A1 | 7/2018 | Zadeh et al. | |
| 2018/0257661 | A1 | 9/2018 | Kroop | |
| 2018/0370540 | A1 | 12/2018 | Yousuf | |
| 2019/0135300 | A1* | 5/2019 | Gonzalez Aguirre | G06N 3/0464 |
| 2019/0138423 | A1* | 5/2019 | Agerstam | G06N 3/096 |
| 2019/0139403 | A1 | 5/2019 | Alam | |
| 2019/0225234 | A1 | 7/2019 | Kumar | |
| 2019/0243371 | A1 | 8/2019 | Nister | |
| 2019/0258251 | A1 | 8/2019 | Ditty | |
| 2019/0258953 | A1 | 8/2019 | Ulrich | |
| 2019/0265703 | A1 | 8/2019 | Hicok | |
| 2019/0302761 | A1 | 10/2019 | Huang | |
| 2019/0303759 | A1 | 10/2019 | Farabet | |
| 2019/0371052 | A1 | 12/2019 | Kehl | |
| 2020/0057453 | A1 | 2/2020 | Laws | |
| 2020/0059669 | A1 | 2/2020 | Nishi | |
| 2020/0111011 | A1 | 4/2020 | Viswanathan | |
| 2020/0175744 | A1 | 6/2020 | Rosenzweig | |
| 2020/0184278 | A1 | 6/2020 | Zadeh | |
| 2020/0189591 | A1 | 6/2020 | Mellinger, III | |
| 2020/0200547 | A1 | 6/2020 | Miller | |
| 2020/0202167 | A1 | 6/2020 | Gross | |
| 2020/0202168 | A1 | 6/2020 | Mao | |
| 2020/0202706 | A1 | 6/2020 | Chaves | |
| 2020/0207371 | A1 | 7/2020 | Dougherty | |
| 2020/0218908 | A1 | 7/2020 | Lee | |
| 2020/0218913 | A1 | 7/2020 | Unnikrishnan | |
| 2020/0219316 | A1 | 7/2020 | Baik | |
| 2020/0225032 | A1 | 7/2020 | Chen | |
| 2020/0225655 | A1 | 7/2020 | Cella | |
| 2021/0092160 | A1* | 3/2021 | Crabtree | G06N 3/094 |
| 2021/0224383 | A1* | 7/2021 | Mizoguchi | G06F 21/54 |
| 2021/0357699 | A1* | 11/2021 | Saillet | G06F 18/217 |
| 2022/0083600 | A1* | 3/2022 | Gout | G06F 16/906 |
| 2022/0101182 | A1* | 3/2022 | Patel | G06N 20/00 |
| 2022/0198139 | A1* | 6/2022 | De Paepe | G06F 40/40 |
| 2022/0351072 | A1* | 11/2022 | Ahmed | G06N 20/00 |
| 2024/0127306 | A1* | 4/2024 | Kim | G06Q 30/0623 |

OTHER PUBLICATIONS

Park et al., "Multimodal Execution Monitoring for Anomaly Detection During Robot Manipulation," IEEE International Conference on Robotics and Automation (ICRA), 2016 (8 pages).

Kameswari et al., "Sensor Data Analysis and Anomaly Detection using Predictive Analytics for Process Industries," IEEE Workshop on Computational Intelligence: Theories, Applications and Future Directions, Kanpur, India, Dec. 14-17, 2015 (8 pages).

Moosavi-Dezfooli et al., "Universal Adversarial Perturbations," 2017 IEEE Conference on Computer Vision and Pattern Recognition (CVPR), 2017 (9 pages).

H. H. Bosman et al., "Spatial Anomaly Detection in Sensor Networks Using Neighborhood Information," Information Fusion, vol. 33, pp. 41-56. Available online Apr. 26, 2016 <URL: https://www.sciencedirect.com/science/article/pii/S1566253516300252> (16 pages).

Maddern, Will, et al., "Real-time probabilistic fusion of sparse 3D LIDAR and dense stereo," 2016 IEEE/RSJ International Conference on Intelligent Robots and Systems (IROS), Daejeon Convention Center, Oct. 9-14, 2016, Daejeon, Korea (https://ieeexplore.ieee.org/stamp/stamp.jsp?tp=&arnumber=7759342).

Papernot et al., "Practical Black-Box Attacks against Machine Learning," Proceedings of the 2017 ACM Asia Conference on Computer and Communications Security, 2017. Available online Mar. 19, 2017 <URL: https://arxiv.org/pdf/1602.02697.pdf> (14 pages).

Charte et al., "A Practical Tutorial on Autoencoders for Nonlinear Feature Fusion: Taxonomy, Models, Software and Guidelines," Information Fusion, vol. 44, pp. 78-96. Available online Dec. 23, 2017 <URL: https://doi.org/10.1016/j.inffus.2017.12.007> (19 pages).

Akhtar et al., "Threat of Adversarial Attacks on Deep Learning in Computer vision: A Survey," IEEE Access, vol. 6, Feb. 19, 2018, pp. 14410-14430 (21 pages).

Su et al., "One Pixel Attack for Fooling Deep Neural Networks," In CORR (Computing Research Repository) online, Feb. 22, 2018. Retrieved from the Internet: <URL: http://arxiv.org/abs/1710.08864> (11 pages).

Eykholt et al., "Robust Physical-World Attacks on Deep Learning Visual Classification," IEEE Conference on Computer Vision and Pattern Recognition (CVPR), 2018. Available online Apr. 10, 2018 <URL: https://arxiv.org/pdf/1707.08945.pdf> (11 pages).

United States Patent and Trademark Office, "Non-Final Action" issued in U.S. Appl. No. 16/235,917 on Oct. 15, 2020 (55 pages).

United States Patent and Trademark Office, "Final Action" issued in U.S. Appl. No. 16/235,917 on May 3, 2021 (59 pages).

United States Patent and Trademark Office, "Notice of Allowance" issued in U.S. Appl. No. 16/235,917 on Aug. 27, 2021 (20 pages).

* cited by examiner

SYSTEMS, METHODS AND APPARATUS FOR DATA QUALITY ASSESSMENT AND LEARNING FOR AUTOMATED DEVICES

FIELD OF THE DISCLOSURE

This disclosure relates generally to data quality and, more particularly, to systems, methods and apparatus for data quality assessment and learning for automated devices.

BACKGROUND

In recent years, sophisticated autonomous agents (also referred to as devices) which can include moving vehicles/drones, immobile industrial equipment, etc., are becoming a reality. Such agents rely on data captured at various sensors of the agents. Automated decisions about how the agent is to act/react to an event, for example, are based on systems that process the captured sensor data.

BRIEF DESCRIPTION OF THE DRAWINGS

In general, the same reference numbers will be used throughout the drawing(s) and accompanying written description to refer to the same or like parts. The figures are not to scale.

Figure 1:
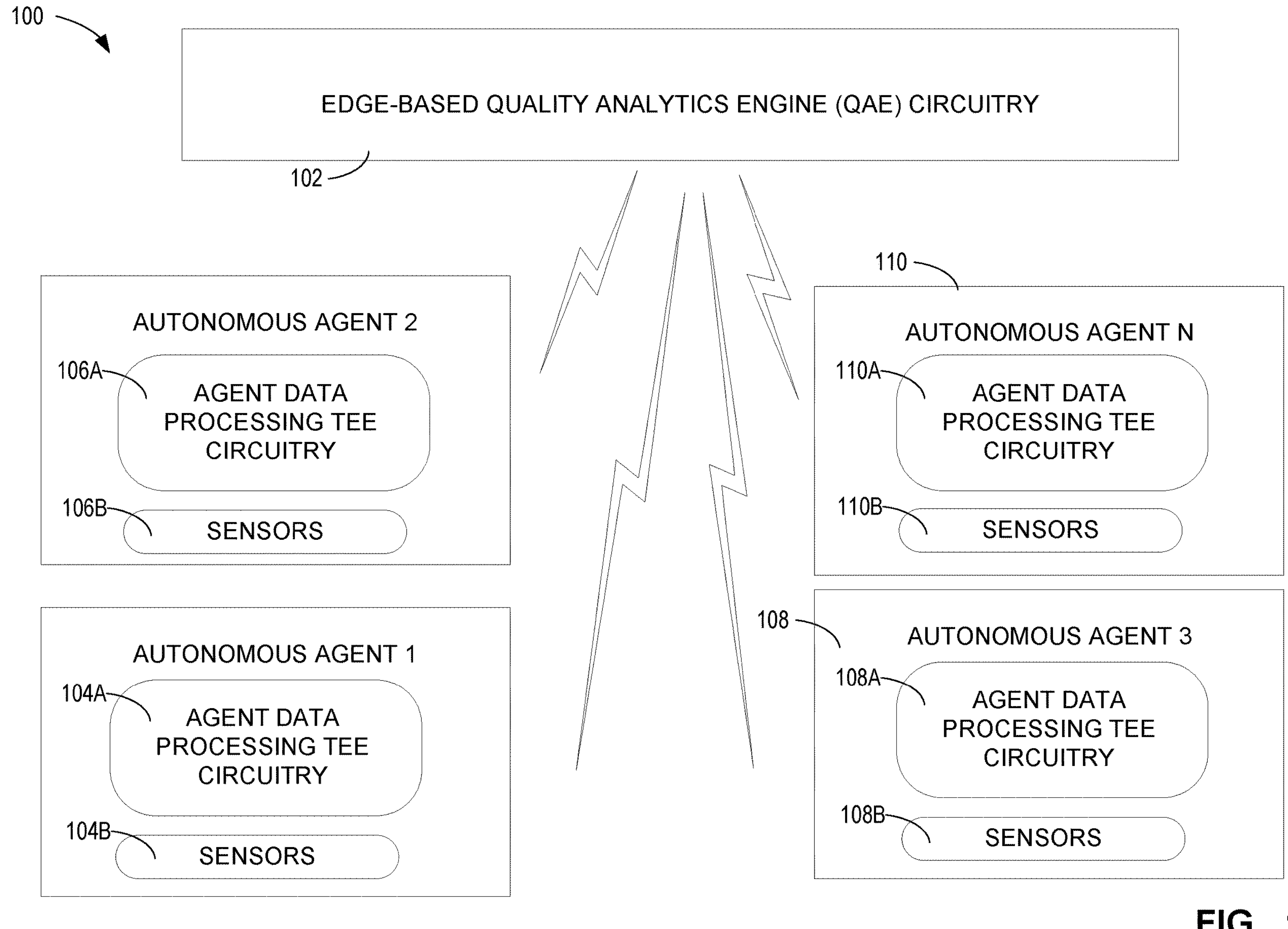
FIG. 1 is a block diagram of a high level system architecture for data quality and learning system including autonomous agents and an edge-based quality analytics engine, in accordance with the teachings herein.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

FIG. 1 is a block diagram of an example system architecture 100 for a data quality and learning system having an example edge-based quality analytics engine (QAE) circuitry 102 in communication with example autonomous agents 104, 106, 108, 110. In the illustrated example, the edge-based QAE circuitry 102 is executed on or otherwise implemented by an edge server/node. In some examples, the autonomous agents 104, 106, 108, 110 are independent of each other and receive information from the edge-based QAE circuitry 102. In some examples, any number (e.g., "N") of autonomous agents are included in the system 100. Likewise, in some examples, the system 100 includes multiple edge-based nodes each having example edge-based QAE circuitry 102 to communicate with the same or different autonomous agents (e.g., any of the autonomous agents 104, 106, 108, 110). Information supplied by the edge-based QAE circuitry 102 to the autonomous agents 104, 106, 108, 110 is intended to improve or, in some cases, adjust the operation of the autonomous agents 104, 106, 108, 110. In some examples, any (or all) of the autonomous agents 104, 106, 108, 110 can include an example agent data processing trusted execution environment (TEE) circuitry 104A, 106A, 108A, 110A to securely process data collected by example local sensors 104B, 106B, 108B, 110B.

One or more of the example edge-based QAE circuitry 102, the example autonomous agents 104, 106, 108, 110, the example agent data processing TEE circuitry 104A, and the example sensors 104B of the system 100 of FIG. 1 may be instantiated (e.g., creating an instance of, bring into being for any length of time, materialize, implement, etc.) by processor circuitry such as a central processing unit executing instructions. Additionally or alternatively, the edge-based QAE circuitry 102, the autonomous agents 104, 106, 108, 110, the agent data processing TEE circuitry 104A, and the example sensors 104B of the system 100 of FIG. 1 may be instantiated (e.g., create an instance of, bring into being for any length of time, materialize, implement, etc.) by an ASIC or an FPGA structured to perform operations corresponding to the instructions. It should be understood that some or all of the blocks of the system 100 of FIG. 1 may, thus, be instantiated at the same or different times. Some or all of the edge-based QAE circuitry of the system 100 may be instantiated, for example, in one or more threads executing concurrently on hardware and/or in series on hardware. Likewise, some or all of the, the autonomous agents 104, 106, 108, 110, and/or the agent data processing TEE circuitry 104A, 106A, 108A, 110A may be instantiated, for example, in one or more threads executing concurrently on hardware and/or in series on hardware. Moreover, in some examples, some or all of the blocks of the system 100 of FIG. 1 may be implemented by microprocessor circuitry executing instructions to implement one or more virtual machines and/or containers.

The example edge-based QAE circuitry 102 of the system 100 employs machine learning and/or active learning machine learning to generate data quality scores, data anomalies (based on previous and current contexts in which the data was collected), to assign reputation scores to the data quality scores, etc. In some examples, the data for which quality prediction and anomaly detection occurs is collected by any of the sensors 104B, 106B, 108B, 110B of the autonomous agents 104, 106, 108, 110 and supplied to the corresponding one of the agent data processing TEE circuitry 104A, 106A, 108A, 110A for use in determining the quality of the data (e.g., whether the data can be trusted as being accurate (e.g., good quality) or is suspected of being inaccurate (poor quality) for one or more reasons described further below). In some examples, the agent data processing TEE circuitry 104A, 106A, 108A, 110A also analyzes the data to determine whether any data anomalies are detected. In some examples, the sensed data is supplied/communicated to the example edge-based QAE circuitry 102 for processing. The processing performed at the edge-based QAE circuitry 102 can be based on aggregated data sensed by any of the local sensors 104B, 106B, 108B, 110B at any number of the autonomous agents 104, 106, 108, 110. As used herein, data aggregation refers to combining data from different sources in a manner that preserves privacy and security of the data. In some examples, aggregated data can be used to generate synthetic data for further use.

The terms "quality score(s)," "data quality score(s)," "data reputation score(s)," "reputation score(s)" as used herein are intended to represent values. In some examples, such scores can be expressed as percentage values. In some examples, such scores can be depicted as "probabilistic values" (e.g., between 0 and 1), thereby qualifying the score with a probability of occurrence. In some examples, including in some occurrences/controlled scenarios, such scores can be binary (0 or 1) as well. In some examples, the data/features is/are gathered in very deterministic scenarios/environments (such as, (i) in known environment/static environments (ii) by sensors operating mutually exclusively and/or (iii) in an environment such that, at any point in time, only one sensor active (or a limited number or type of sensors) and all parameters for the sensor (or sensors) are known and can be configured.

Thus, as used herein, the terms identified above (e.g., "quality score(s)," "data quality score(s)," "data reputation score(s)," "reputation score(s)") whether or not followed by or accompanied by the term "value" represented values. Further, the "values" can take on any form in addition to those identified above.

In some examples, either and/or both of the edge-based QAE circuitry 102 and any of the agent data processing TEEs (e.g., the example agent data processing TEE 104A) associated with any of the autonomous agents 104, 106, 108, 110 pro-actively identify the nature of noisy, irrelevant data, determine reasons for the generation of the noisy, irrelevant data (e.g., faulty sensory, processing errors, environmental conditions, etc.). In some examples, the edge-based QAE circuitry 102 determines one or more changes to be made to a manner in which the autonomous agents 104, 106, 108, 110 operate. In some examples, such changes can relate to adjustments to be made to scaling factors and/or weighting values and/or policies that govern operation of the autonomous agents 104, 106, 108, 110. In some examples, the edge-based QAE circuitry 102 determines new threshold levels to be used to compare against a data quality score to identify whether the data quality score indicates a corresponding set of data/features is of good (or high) quality or instead indicates the corresponding data is of poor (or low) quality. In some examples, one or more operational policies associated with each of the autonomous agents 104, 106, 108, 110 are used to ensure that the autonomous agents 104, 106, 108, 110 are operating within a set of constraints, rules, limitations, permissions, authorizations, etc.

Figure 6:
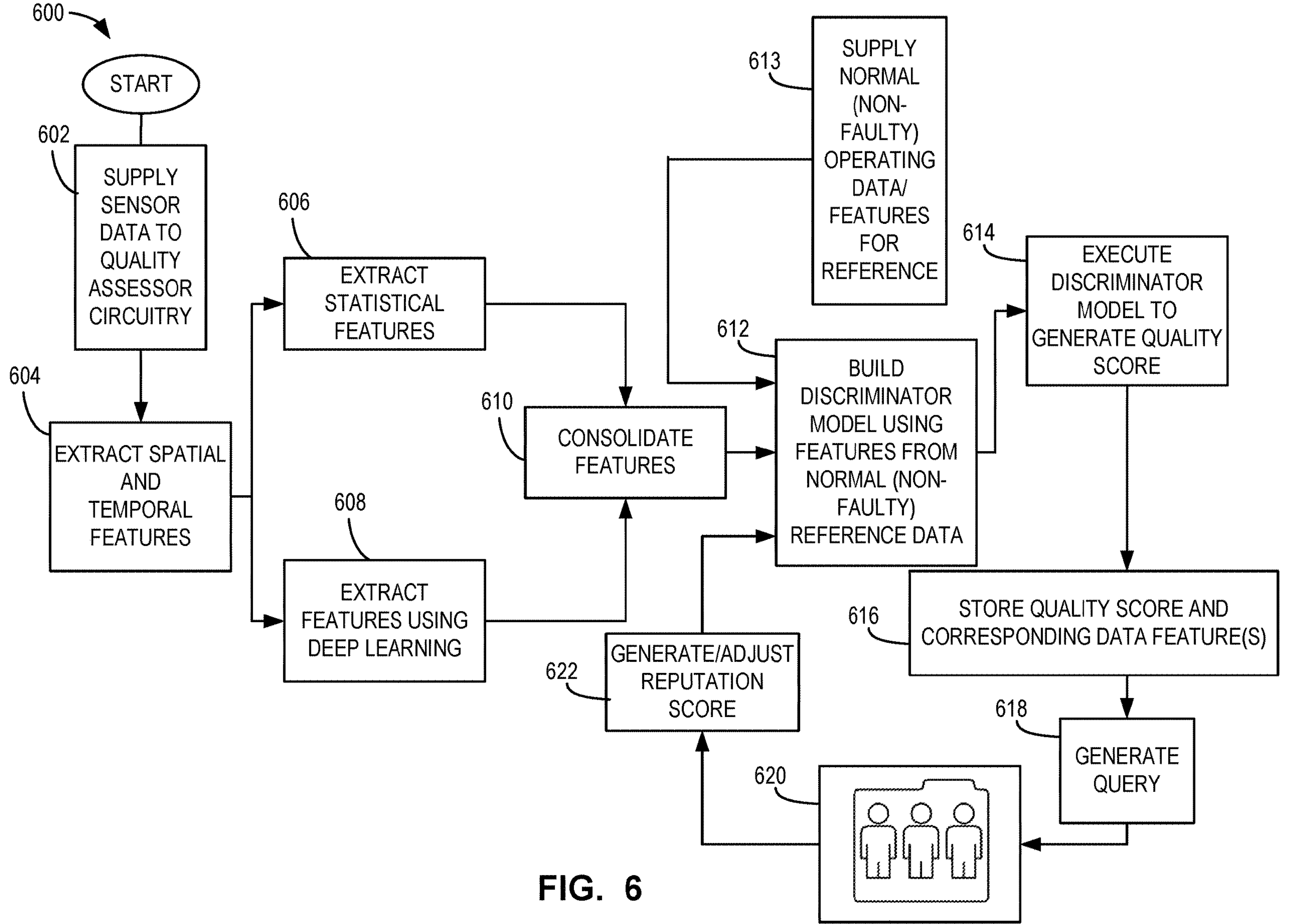
FIG. 6 is a flowchart representative of example machine readable instructions and/or example operations that may be executed by the example system of FIG. 4 to generate data quality and reputation scores.
Figure 7:
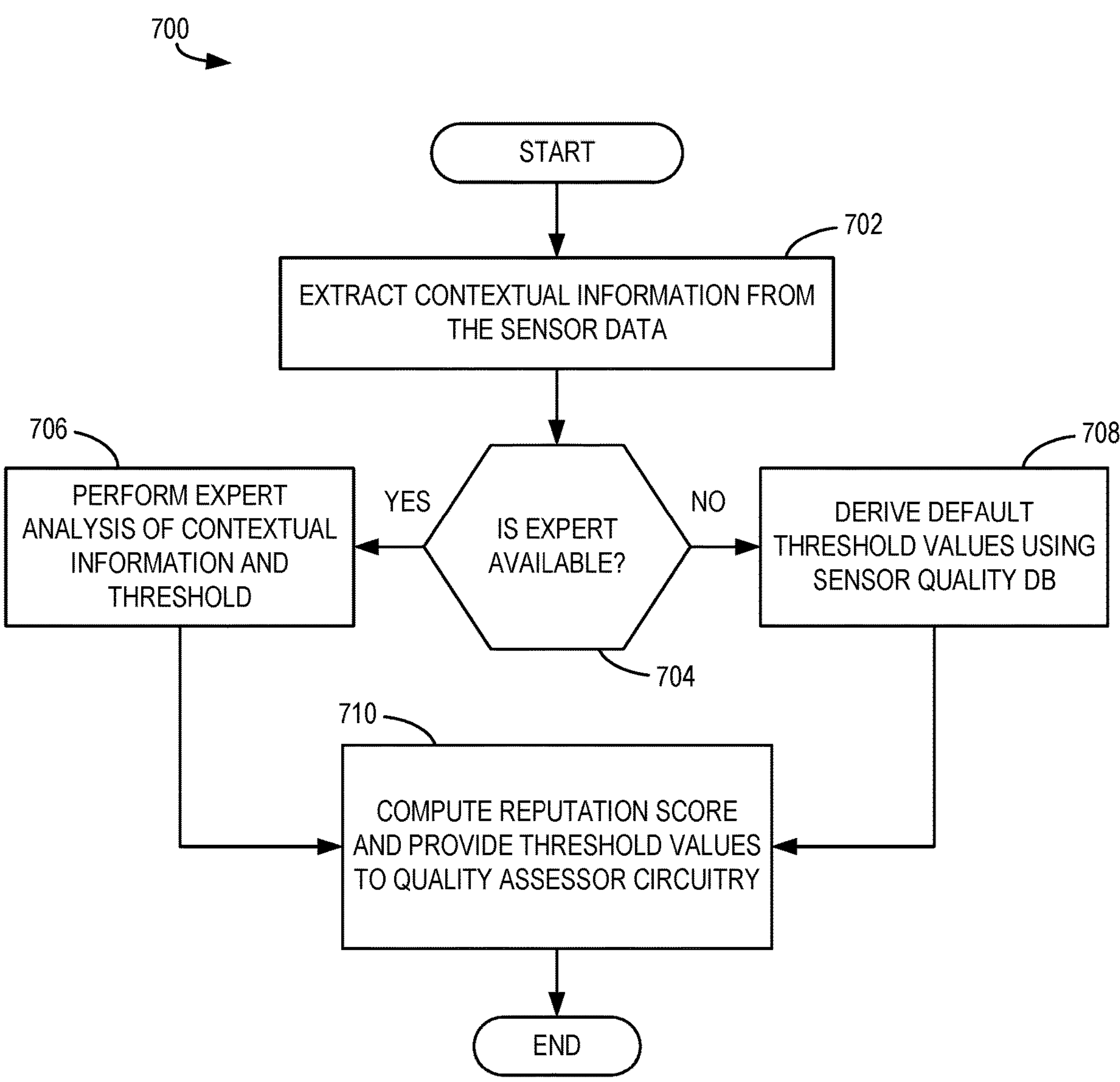
FIG. 7 is a flowchart representative of example machine readable instructions and/or example operations that may be executed by the example system of FIG. 4 in connection with the active learning machine learning circuitry of FIG. 4.

In some examples, the edge-based QAE circuitry 102, the example autonomous agents 104, 106, 108, 110, the example agent data processing TEE circuitry 104A, and the example sensors 104B of the system 100 are instantiated by processor circuitry executing edge-based QAE circuitry instructions and/or autonomous agent data processing instructions configured to perform operations such as those represented by any of the flowcharts of FIGS. 6, 7, and/or 8.

In some examples, the edge-based QAE circuitry 102 of the system 100 includes means for performing quality analytics. For example, the means for determining quality analytics may be implemented by the edge-based QAE circuitry 102 (described in greater detail with respect to FIG. 2 below). In some examples, the edge-based QAE circuitry 102 may be instantiated by processor circuitry such as the example processor circuitry 912 of FIG. 9. For instance, the edge-based QAE circuitry 102 may be instantiated by the example microprocessor 1200 of FIG. 12 executing machine executable instructions such as those implemented by at least some of the blocks of FIGS. 6, 7, and 8. In some examples, the edge-based QAE circuitry 102 may be instantiated by hardware logic circuitry, which may be implemented by an ASIC, XPU, or the FPGA circuitry 1300 of FIG. 13 structured to perform operations corresponding to the machine readable instructions. Additionally or alternatively, the edge-based QAE circuitry 102 may be instantiated by any other combination of hardware, software, and/or firmware. For example, the edge-based QAE circuitry 102 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the agent data processing TEE circuitry 104A, 106A, 108A, 110A of the system 100 includes means for determining a quality score for sensor data based on the sensor data and based on telemetry data. In some examples, the agent data processing TEE circuitry 104A, 106A, 108A, 110A also includes means for detecting anomalies within the collected sensor data and/or telemetry data, as well as means for detecting a context in which the corresponding data is/was collected. The agent data processing TEE circuitry 104A, 106A, 108A, 110A also includes means for achieving active learning machine learning for use in generating and/or adjusting a reputation score assigned to collected sensor data or sets of sensor data. Additionally, the agent data processing TEE circuitry 104A, 106A, 108A, 110A includes means for, based on the data quality score, anomaly information, a reputation score, etc., evaluating the quality score of the sensed data. The means for evaluating can utilize a threshold quality value and a comparator, for example, for comparing the threshold value to the data quality score of the sensed data. If the data quality value satisfies, the threshold, the corresponding data can be used to decide whether one or more actions are to be taken by a corresponding one of the autonomous agents 104, 106, 108, 110. For example, any of the means for determining a quality score for sensor data based on the sensor data and based on telemetry data, the means for detecting anomalies within the collected sensor data and/or telemetry data, the means for detecting a context in which the corresponding data is collected, the means for achieving active learning machine learning to generate or adjust a data reputation score, the means for determining (based on the quality score, anomaly information, the reputation score, etc.) whether the collected sensor data (or sets of sensor data) is/are of a sufficiently high quality to permit the data to affect decision making, the data reputation score, etc., determining whether the collected sensor data (or sets of sensor data) is/are of a sufficiently high quality to affect decision making by the corresponding ones of the autonomous agents 104, 106, 108, 110. In some examples, the decision making pertains to one or more one or more actions and whether such actions should be taken by the corresponding ones of the autonomous agents 104, 106, 108, 110. In some examples, the actions should not be taken due to the evaluated, corresponding data being of an insufficiently high quality. Such actions can include any action(s) that the autonomous agent is designed to carry out. For example, if the autonomous agent is a vehicle in motion, the action may include any of braking, accelerating, making a turn, activating head lamps, activating windshield wipers, etc.

Figure 10:
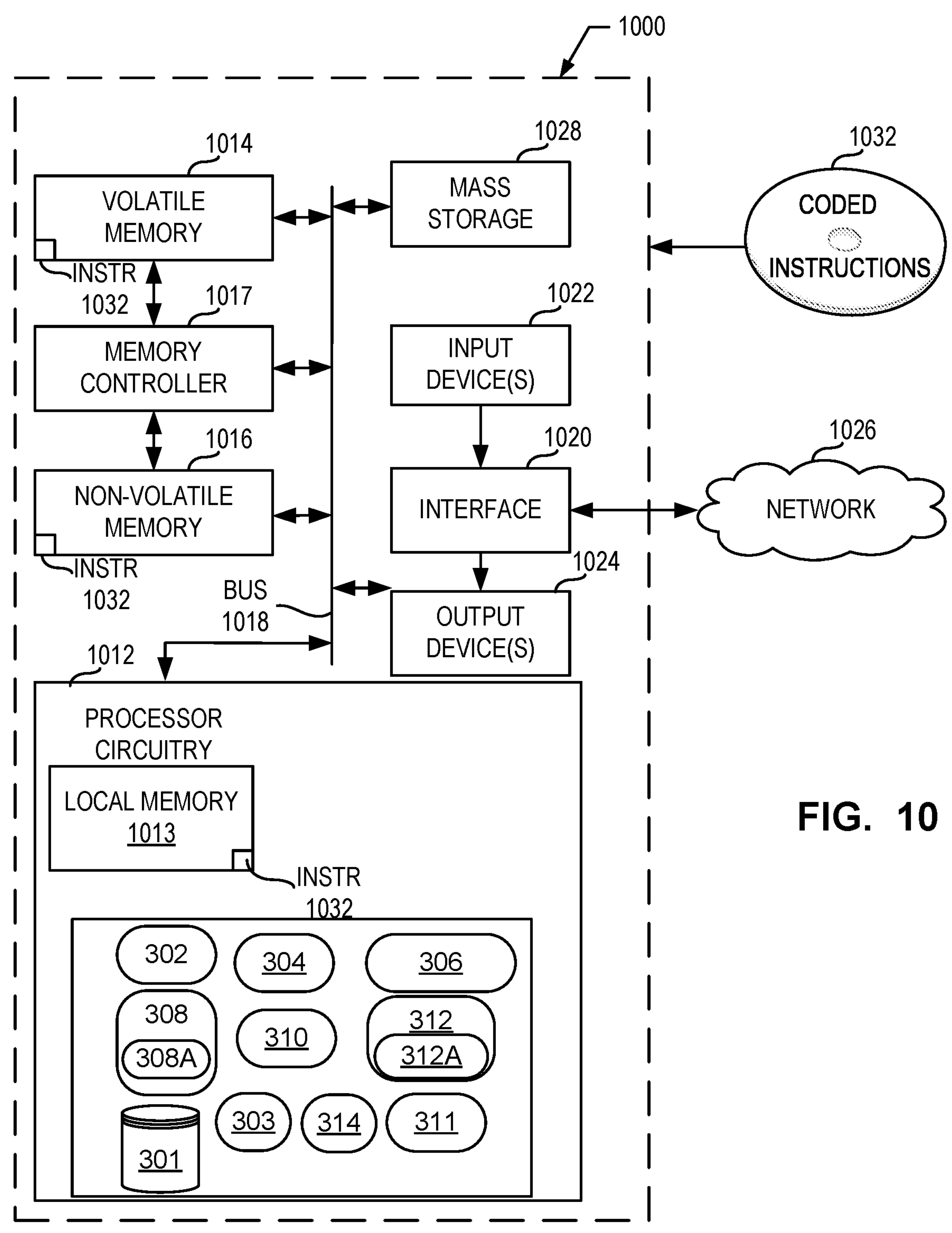
FIG. 10 is a block diagram of an example processing platform including processor circuitry structured to execute the example machine readable instructions and/or the example operations of FIGS. 6, 7, and 8 to implement the example circuitry of the edge-based quality analytics engine circuitry 102 of FIG. 1.

In some examples, the agent data processing TEE circuitry 104A, 106A, 108A, 110A may be instantiated by processor circuitry such as the example processor circuitry 1012 of FIG. 10. For instance, the agent data processing TEE circuitry 104A, 106A, 108A, 110A may be instantiated by the example microprocessor 1200 of FIG. 12 executing machine executable instructions such as those implemented by at least some of the blocks of FIGS. 6, 7, and 8. In some examples, the agent data processing TEE circuitry 104A, 106A, 108A, 110A may be instantiated by hardware logic circuitry, which may be implemented by an ASIC, XPU, or the FPGA circuitry 1300 of FIG. 13 structured to perform operations corresponding to the machine readable instructions. Additionally or alternatively, the agent data processing TEE circuitry 104A, 106A, 108A, 110A may be instantiated by any other combination of hardware, software, and/or firmware. For example, the agent data processing TEE circuitry 104A, 106A, 108A, 110A may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 2:
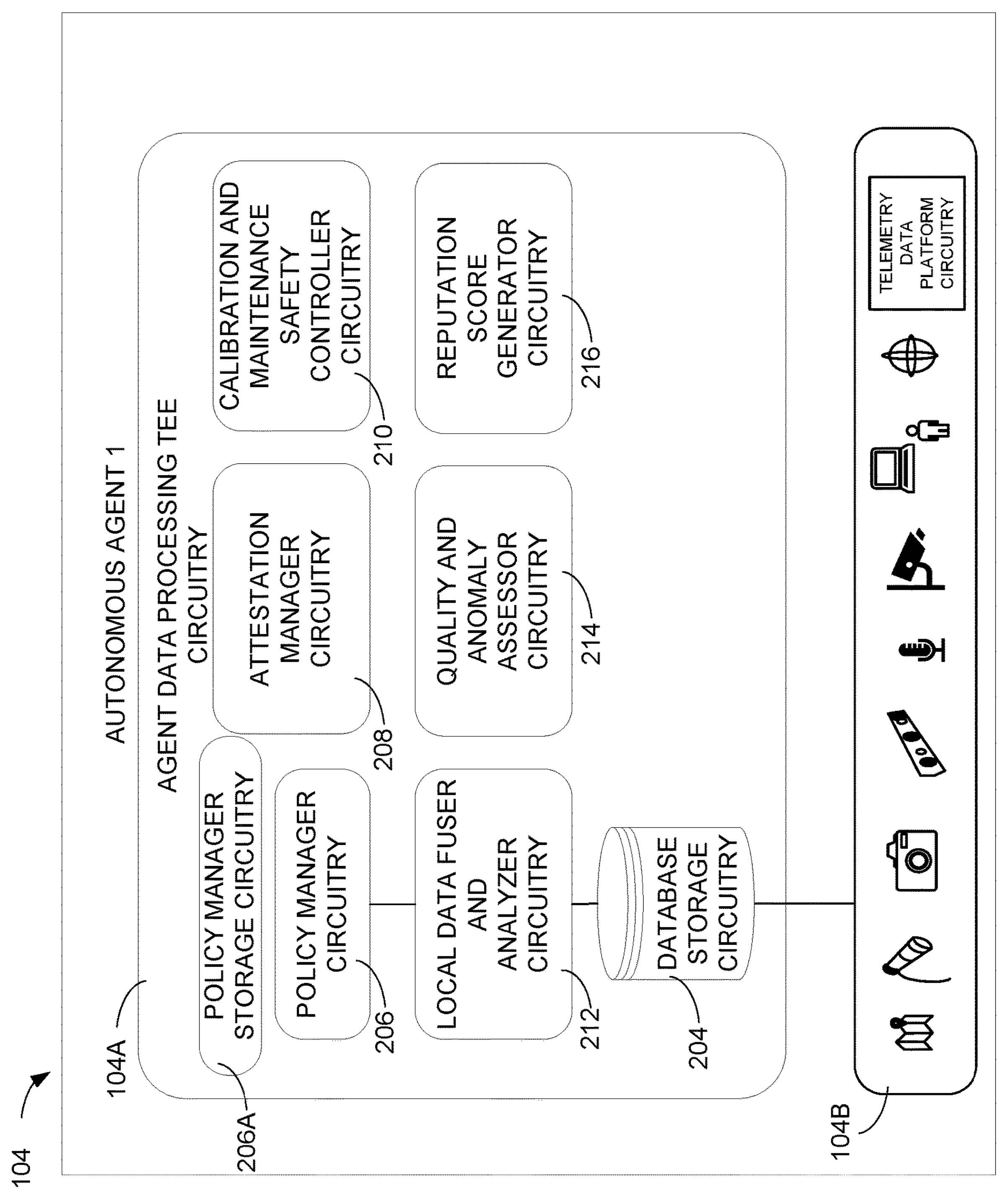
FIG. 2 is a block diagram of the autonomous agent of FIG. 1.

FIG. 2 is a block diagram of an example one of the autonomous agents 104, 106, 108, 110 (e.g., the autonomous agent 104) of the high level system architecture 100 of FIG. 1. The autonomous agents 104, 106, 108, 110, as described in connection with FIG. 1, can include the example sensors 104B, 106B, 108B, 110B and the example agent data processing TEE circuitry 104A, 106A, 108A, 110A. Although, for illustrative purposes, only the autonomous agent 104 is included in FIG. 2, the agent data processing TEE circuitry 104A and the local sensors 104B are intended to represent the corresponding agent data processing TEE circuitry 106A, 108A, 110A and the corresponding local sensors 106B, 108B, 110B, respectively, of the other autonomous agents 106, 108, 110. In some examples, the agent data processing TEE 104A includes an example database storage circuitry 204, an example policy manager circuitry 206, an example attestation manager circuitry 208, an example calibration and maintenance safety controller circuitry 210, an example local data fuser and analyzer circuitry 212, an example quality and anomaly assessor circuitry 214, and an example reputation score circuitry 216.

One or more of the blocks of the agent data processing TEE circuitry 104A, 106A, 108A, 110A including the example database storage circuitry 204, the example policy manager circuitry 206, the example attestation manager circuitry 208, the example calibration and maintenance safety controller circuitry 210, the example local data fuser and analyzer circuitry 212, the example quality and anomaly assessor circuitry 214, and the example reputation score circuitry 216 of FIG. 2 may be instantiated (e.g., create an instance of, bring into being for any length of time, materialize, implement, etc.) by processor circuitry such as a central processing unit executing instructions. Additionally or alternatively, one or more of the database storage circuitry 204, the policy manager circuitry 206, the attestation manager circuitry 208, the calibration and maintenance safety controller circuitry 210, the local data fuser and analyzer circuitry 212, the quality and anomaly assessor circuitry 214, and the reputation score circuitry 216 of FIG. 2 may be instantiated (e.g., create an instance of, bring into being for any length of time, materialize, implement, etc.) by an ASIC or an FPGA structured to perform operations corresponding to the instructions. It should be understood that some or all of the database storage circuitry 204, the policy manager circuitry 206, the attestation manager circuitry 208, the calibration and maintenance safety controller circuitry 210, the local data fuser and analyzer circuitry 212, the quality and anomaly assessor circuitry 214, and the reputation score circuitry 216 of the system 200 of FIG. 2 may, thus, be instantiated at the same or different times. Some or all of the database storage circuitry 204, the policy manager circuitry 206, the attestation manager circuitry 208, the calibration and maintenance safety controller circuitry 210, the local data fuser and analyzer circuitry 212, the quality and anomaly assessor circuitry 214, and the reputation score circuitry 216 may be instantiated, for example, in one or more threads executing concurrently on hardware and/or in series on hardware. Moreover, in some examples, some or all of the database storage circuitry 204, the policy manager circuitry 206, the attestation manager circuitry 208, the calibration and maintenance safety controller circuitry 210, the local data fuser and analyzer circuitry 212, the quality and anomaly assessor circuitry 214, and the reputation score circuitry 216 of FIG. 2 may be implemented by microprocessor circuitry executing instructions to implement one or more virtual machines and/or containers.

In some examples, the example sensors 104B can be any number of sensors and/or any number of different types of sensors suitable to the operation of the autonomous agent. Such example sensors 104B can include global positioning sensors, light sensors, cameras, power strips, microphones, an infra-red camera, a data interface of a processor at which data can be entered by a user, pressure sensors, liquid sensors compasses, a distance-traveled sensor (e.g., an odometer), a speed sensor, an acceleration sensor, etc. In fact, any type of sensor device capable of sensing information useful to the operation of the autonomous agent (e.g., autonomous agent 104) can be included in, or otherwise associated with, the autonomous agent 104. In some examples, the local sensors 104B supply sensed data/information to the example database storage circuitry 204 of the autonomous agent 104. It is intended that statements made regarding the operational capabilities of the autonomous agent 104, the agent data processing TEE circuitry 104A, and the local sensor 104B also apply to the autonomous agents 106, 108, 110, and apply to the agent data processing TEE circuitry 106A, 108A, 110A, and apply to the local sensors 106B, 108B, 110B.

In some examples, the example quality and anomaly assessor circuitry 214 uses quality learning and quality inference techniques to perform a quality analysis on any of the asserted sensory data. In some such examples, the assessment of the data is performed in real-time based on one or more policies contained in a storage associated with or otherwise accessible to the example policy manager circuitry 206 (e.g., a policy manager storage circuitry 206A). In some examples, the asserted sensory data is supplied to the example database storage circuitry 204 for storage and in some examples the asserted sensory data is also supplied to the quality and anomaly assessor circuitry 214. In some examples, the quality and anomaly assessor circuitry 214 accesses the sensed data stored in the example database storage circuitry 204.

In some examples, the policies enforced by the example policy manager can include ensuring that any software, hardware, and/or firmware licenses are up-to-date, ensuring that any required approvals and/or attestations have been obtained and/or are met, ensuring that any requirements pertaining to any applicable protocols are adhered to, ensuring that security demands and/or safety policies are met, etc. In some examples, one or more protocols enforced by the policy manager circuitry 206 can require that certain operations can only be performed within in a particular geographic region or cannot be performed within a geographical region. For example, an example communication protocol can indicate that within a particular geographical region, Bluetooth sensors cannot be used in a particular manner. In some such examples, the Bluetooth sensors can be automatically disabled when the policy manager circuitry 206 becomes aware that the autonomous agent has entered that particular geographical region.

In some examples, the operations performed by the policy manager circuitry 206 are performed before or after (as required by the policy) any data quality analysis has been performed. In some examples, the policy manager circuitry 206 provides a green flag when all relevant policies are met and changes the flag when a violation of a policy is detected. In some examples, one or more of the blocks included in the autonomous agent can be designed and/or programmed to react (in a known manner) to a change in the color of the flag from green to a non-green color (and vice versa) automatically.

In some examples, the example local data fuser and analyzer circuitry 212 can be designed to provide input to the example policy manager circuitry 206 and/or the example attestation manager circuitry 208 for use by the policy and attestation manager circuitries 206/208 in determining whether relevant policies/protocols/etc., are being met. In some examples, the local data fuser and analyzer circuitry 212 can include prepopulated fields to be verified by the example policy manager circuitry 206 and/or the attestation manager circuitry 208 as needed to ensure the policies/attestations/protocols are met.

In some examples, the example local data fuser and analyzer using any of a number of data fusion and/or consolidation techniques to create a set of infused (or consolidated) data to be analyzed. In some example, the local data fuser and analyzer circuitry 212 fuses data points from different sensors (e.g., vision, radar, LiDAR, audio etc.) to enable key capabilities. In some examples, such data to be fused can include data from a depth camera, a monocular camera and a stereo camera. Such camera data, when fused, can enable mapping of terrain, for example. By way of further example, data from an inertial measurement unit (IMU), data from light detection and ranging technology (LiDAR) and other range sensors fused to obtain localization information (e.g., a current position of an object, device, etc.). In another example, data-points from different sensors can be fused to enable multi-modal data. Multi-modal data can be used to determine multi-modal behavior, which lends greater insights into how and why a system (e.g., the autonomous agents 104, 106, 108, 110) is operating the way it is. Any or several of a variety of multiple algorithms can be used to perform fusion including, for example, a Kalman filter, an extended Kalman filter, k-means clustering, a k-nearest neighbors algorithm, support vector machine (SVM) classification, etc.

In some examples, the example reputation score circuitry 216 (also referred to herein as the reputation score circuitry 216) builds and manages data reputation scores. In some examples, and as described in further detail below, the reputation score circuitry 216 builds/manages the reputation scores based on a signal to noise ratio (or noise segregated from a signal) associated with a set of sensor data/features being evaluated by the example quality & anomaly assessor circuitry 214. In some examples, the signal to noise ratio is determined across one or more of the sensors 104B of the autonomous agent 104. In some examples, the reputation score circuitry 216 can evaluate one or more of the sensors 104B against a revocation list (if any) furnished by the example policy manager circuitry 206 and/or the example policy manager storage circuitry 206A.

In some examples, a reputation score is generated based on previously processed feature and/or sensor data for which quality scores have been generated and can take any form including a probabilistic value, a binary value, etc. The reputation score represents the reputation of a data quality score. In some examples, a data quality score with a good reputation is likely to be accurate than a data quality score with a bad reputation. In some instances, data assigned a high data quality score that is determined to have a poor reputation score can cause the reputation score circuitry 216 to discard or otherwise ignore the data as the quality score of the data, though identified as high is suspect due to the poor reputation score. Thus, in some examples, a higher reputation score can be used to infer a higher confidence in the results of the quality and anomaly evaluation than a lower reputation score. In other examples, a lower reputation score can be used to infer higher confidence in the results of the quality and anomaly evaluation than a higher reputation score.

In some examples, the examples quality and anomaly assessor circuitry 214 determines whether anomalies are present in the data using a function that is based on observed quality of the data. In some such examples, the anomaly detection function can operate on a quality score assigned to the set of data/features currently being evaluated/processed, a running average of past data (data collected previously) represented for example in a histogram format, an anomaly reference threshold obtained using offline reference/training data (referred to in more detail below) and using one or more scaling factors (also described further below). In some examples, the anomaly detection function can generate a value that indicates a likelihood (e.g., a probability) that the current set of data/features has one or more anomalies and/or (when viewed as a whole) demonstrates system behavior that is anomalous.

In some examples, the example reputation score circuitry 216 determines a signal to noise ratio and/or segregates the signal "data" from the signal "noise" using both the sensed signal information and the data quality score assigned thereto. In some such examples, after the data is sensed and the data quality score is determined/computed, the signal to noise ratio is determined (or the data and noise are segregated), where the term "signal" refers, in this instance, to sensed data that is usable as it has been determined to be of good quality. In some examples, the signal to noise ratio can be determined when an anomaly has been detected thereby indicating that some form of "noise" may be responsible for the anomaly or otherwise associated with the anomaly. Unlike many technologies in which data determined to be noisy (e.g., determined to have noise included in the same signal) is discarded and/or dropped from further evaluation, the reputation score circuitry 216 can use the so-called "noisy" spatiotemporal data-points to intelligently 'learn,' based on, for example, a context in which the spatiotemporal data-points are collected. As the definition of noise can be different for data collected by the same sensors but across different applications/scenarios/contexts, the temporal aspects can be evaluated to determine how to qualify the noise for corresponding data-points changes. For instance, in some example contexts, so-called noise may be expected due to current environmental conditions and, therefore useable by the autonomous agent when determining whether one or more actions are to be taken (as described further below). In other example contexts, so-called noise may be unexpected and, therefore, cause the data quality and/or reputation to be assessed as being problematic and, unusable by the autonomous agent. Thus, the so-called noise may be qualified differently in different circumstances/contexts.

In certain scenarios, it is possible that certain ones of the sensors (e.g., the sensors 104B, 106B, 108B, 110B) cannot be and/or should not be used due to, for example, a malfunction, physical damage to the device, and/or any other reason that the operation of the certain ones of the sensor is impaired or suspected of impairment. Information about such possible impairment is furnished by the policy manager circuitry 206 (or the example policy manager circuitry storage 206A) in the form of a revocation list. During reputation score computation, the sensor (e.g., any one or more of the sensors 104B, 106B, 108B, 110B) used to generate/capture the sensed data, is checked against the revocation list. In some examples, the revocation list identifies sensors/equipment that have been identified as "revoked" such that any data generated by such revoked sensors/equipment (any of sensors 104B) are not to be used. Provided the sensor that collected the sensed data associated with the calculated signal to noise "s/n" ratio is not on the revocation list, the sensed data is to be used. If the sensor is on the revocation list, a reputation score generated for that sensor in that instance has no meaning and is therefore dropped or otherwise ignored. If the sensor (e.g., any of the sensors 104B, 106B, 108B, 110B) is not part of the revocation list, then the reputation score for that sensor is valid and the computation proceeds.

In some examples, one or more humans having expertise in the system from which data is collected (e.g., any of the autonomous agents 104, 106, 108, 110) review quality data scores, anomaly-based information, a signal to noise ratio, a context in which corresponding sensor data was collected, etc., to build on an existing reputation score, to raise (or decrease) an existing reputation score, to generate an initial reputation score, etc. The reputation score corresponds, as indicated herein below and above, to the sensed data (or set of corresponding feature data) currently being analyzed. In some such examples, the experts, if needed or helpful, cause additional tags/labels to be attached to (or otherwise associated with) the asserted sensory data and/or features associated with the asserted sensory data that is currently being evaluated/examined. In some examples, a set of sensor data currently being evaluated for quality is similar, or identical to previously evaluated sets of sensor data. Further, in some examples both the currently and previously processed sets of sensor data were collected in similar or identical contexts. In some such examples, provided that the previously evaluated sets of sensor data have been consistently evaluated by the quality and anomaly assessor circuitry 214 as having a same (or similar) levels of quality (e.g., similar quality scores), the reputation score generated by the reputation score circuitry 216 for the currently processed set of sensor data is likely to be increased. Thus, a high reputation score generated by the reputation score circuitry 216 for any set of sensor data indicates that the corresponding quality score is to be treated as trustworthy.

In some examples, future data sets can be assigned a same quality score by the quality and anomaly assessor circuitry 214 and a same reputation score by the reputation score circuitry 216 as were assigned to previously evaluated data sets, provided that such future data sets are similar (both in data values and context) to (or identical to) such previously evaluated data sets. In some such examples, as such future data sets are assigned quality scores and reputation scores without need of performing quality and/or anomaly evaluations, a significant reduction in a number of compute cycles (power) can occur as well as increased processing speed, both of which are beneficial to the operation of the quality and anomaly assessor circuitry 214.

In some examples, the example policy manager circuitry 206 and the example attestation manager circuitry 208 perform a remote attestation challenge/response protocol based on provisioned credentials and thereby protect tampering/hacking of the agent data processing TEE 104A and the processing performed within the TEE 104A. In some examples, system administrators use the credentials to securely communicate with the policy manager circuitry 206 in the agent data processing TEE 104A. In some examples, system administrators can securely communicate with the policy manager circuitry 206 to perform dynamic out-of-band policy management.

In some examples, the policies include licenses required to operate the system, necessary approvals to operate the system, attestations needed to communicate with the system, security, safety and/or other protocols to be followed by the system, etc. In some examples, the policy manager circuitry 206 is responsible for ensuring that the corresponding autonomous agent (e.g., autonomous agent 104) is adhering to the policies. In some examples, to enforce compliance/adherence, data from the sensors 104B is supplied by the local data fuser and analyzer circuitry 212 to the policy manager circuitry 206, and attestation manager circuitry 208 at a same or earlier time as the sensor data is supplied to any of the other blocks of the example agent data processing TEE 104A. In some examples, the sensor data is tagged by the corresponding one of the sensors or by the local data fuser and analyzer circuitry 212 with information relevant to the policies. In some examples, the policy manager circuitry 206 verifies the contents of such tags to determine whether adherence/compliance is achieved. In some examples, when compliance/adherence is not achieved, the policy manager circuitry 206 causes operation of the autonomous system to halt operations or causes the autonomous agent 104 to take one or more actions to come into compliance.

By way of example only, a policy can restrict usage of a particular type of sensor in a particular manner within a defined geographical area. Assuming the autonomous agent 104 enters that defined area and normal operation includes using the restricted sensor type in the restricted manner, the policy manager circuitry 206 can respond to the entry of the example autonomous agent 104 into the defined region by causing the autonomous agent 104 to take measures to deactivate the relevant sensors or stop using the sensors in the prohibited manner until the policy manager circuitry 206 determines that the autonomous agent 104 has moved outside of the defined area. In some examples, the policy manager circuitry 206 can use data sensed by a geographical positioning system sensor to learn the location of the autonomous agent 104 and/or can use sensed data supplied by any of the example sensors 104B to ensure that operations are in accordance with the policies.

The example local data fuser and analyzer circuitry 212 uses advanced active learning combined with data fusion capabilities (if permissible by the policy manager circuitry 206) to perform quality analysis across a multi-modality sensor fused scenario (e.g., vision data+audio data+thermal data+etc.).

The example calibration and maintenance safety controller circuitry 210 adapts/adjusts scaling factors for the blocks included in the agent data processing TEE 104A to support real-time calibration as needed to ensure reliable and safe operation of the sensors (e.g., any of the example sensors 104B, 106B, 108B, 110B) as well as the autonomous agent. In some examples, the calibration and maintenance safety controller circuitry 210 performs such scaling factor adjustments operations/calibrations based on dynamic active learning information, including, for example, reputation information/scores, etc., that are computed during operation. In some examples, the revocation list can be obtained at a time of deployment from the edge-based QAE circuitry 102 (of FIG. 1 and FIG. 3). Further, through "transfer learning" some of these aspects can be shared/exchanged across agents/groups through additional edge servers including servers such as the edge-based QAE circuitry 102.

Further details about the circuitry included in the agent data processing TEE circuitry 104A, 106A, 108A, 110A are provided below in connection with FIGS. 3-5, as the operations performed by the blocks of the agent data processing TEE circuitry 104A are also performed by various ones of the blocks at the example edge-based QAE circuitry 102 (see FIG. 1). In some examples, operations performed at the agent data processing TEE circuitry 104A are performed partially at the edge-based QAE circuitry 102 or are performed in a more enhanced manner at the edge-based QAE circuitry 102 (or vice versa) as described in greater detail below.

One or more of the example agent data processing TEE circuitry 104A including the example database storage circuitry 204, the example policy manager circuitry 206, the example attestation manager circuitry 208, the example calibration and maintenance safety controller circuitry 210, the example local data fuser and data analyzer circuitry 212, the example quality and anomaly assessor circuitry 214, and the example reputation score circuitry 216 may be instantiated (e.g., create an instance of, bring into being for any length of time, materialize, implement, etc.) by processor circuitry such as a central processing unit executing instructions. Additionally or alternatively, the agent data processing TEE circuitry 104A including the database storage circuitry 204, the policy manager circuitry 206, the attestation manager circuitry 208, the calibration and maintenance safety controller circuitry 210, the local data fuser and data analyzer circuitry 212, the quality and anomaly assessor circuitry 214, and the reputation score circuitry 216 may be instantiated (e.g., create an instance of, bring into being for any length of time, materialize, implement, etc.) by an ASIC or an FPGA structured to perform operations corresponding to the instructions. It should be understood that some or all of the agent data processing TEE circuitry 104A including the database storage circuitry 204, the example policy manager circuitry 206, the attestation manager circuitry 208, the calibration and maintenance safety controller circuitry 210, the local data fuser and analyzer circuitry 212, the quality and anomaly assessor circuitry 214, and the reputation score circuitry 216 of FIG. 2 may, thus, be instantiated at the same or different times. Some or all of the agent data processing TEE circuitry 104A including the database storage circuitry 204, the policy manager circuitry 206, the attestation manager circuitry 208, the calibration and maintenance safety controller circuitry 210, the local data fuser and analyzer circuitry 212, the quality and anomaly assessor circuitry 214, and the reputation score circuitry 216 of FIG. 2 may be instantiated, for example, in one or more threads executing concurrently on hardware and/or in series on hardware. Moreover, in some examples, some or all of the agent data processing TEE circuitry 104A including the database storage circuitry 204, the policy manager circuitry 206, the attestation manager circuitry 208, the calibration and maintenance safety controller circuitry 210, the local data fuser and analyzer circuitry 212, the quality and anomaly assessor circuitry 214, and the reputation score circuitry 216 of FIG. 2 may be implemented by microprocessor circuitry executing instructions to implement one or more virtual machines and/or containers.

Figure 8:
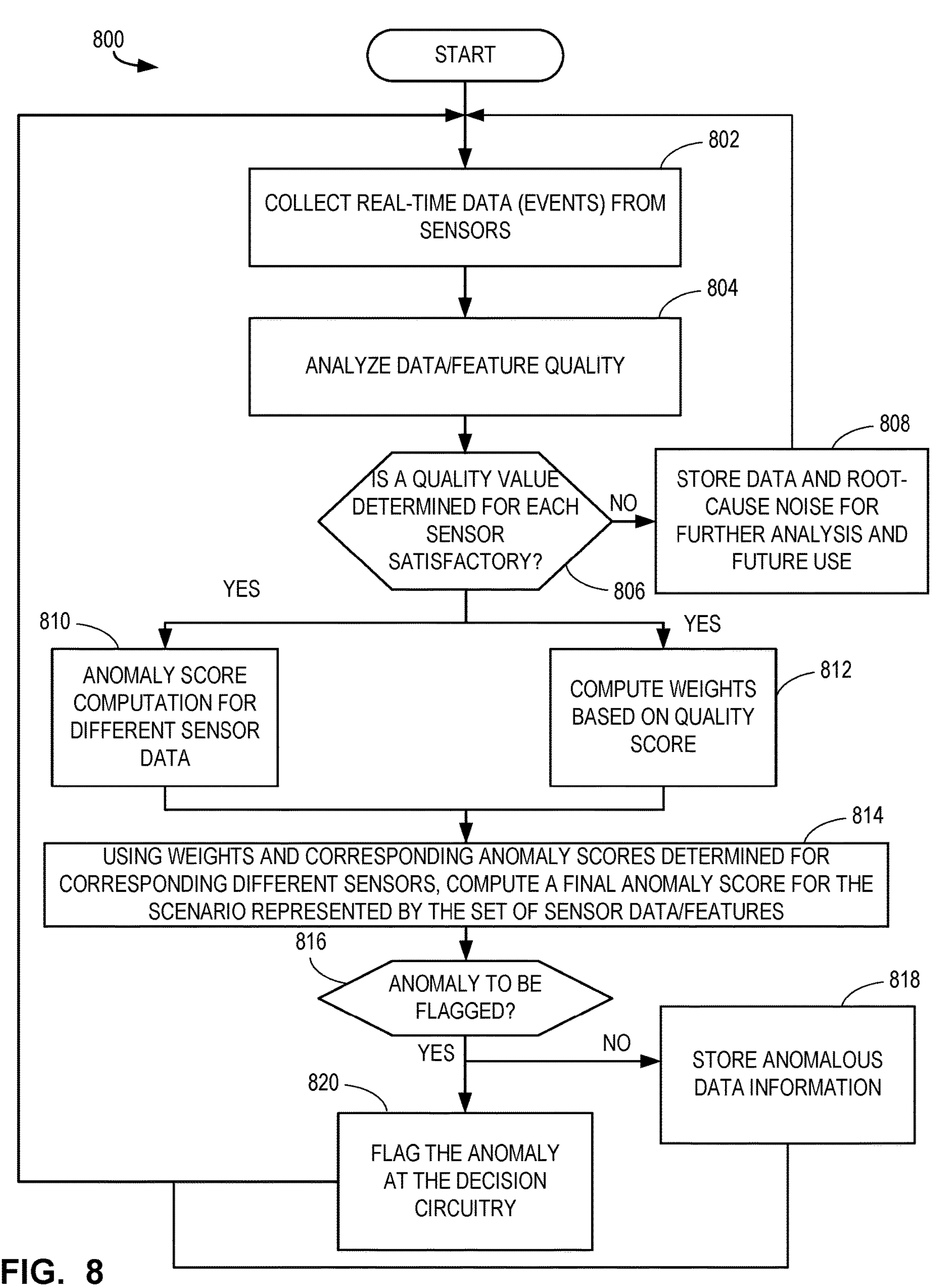
FIG. 8 is a flowchart representative of example machine readable instructions and/or example operations that may be executed by the example system of FIG. 4.

In some examples, the example agent data processing circuitry TEE 104A including the example database storage circuitry 204, the example policy manager circuitry 206, the example attestation manager circuitry 208, the example calibration and maintenance safety controller circuitry 210, the example local data fuser and analyzer circuitry 212, the example quality and anomaly assessor circuitry 214, and the example reputation score circuitry 216, are instantiated by processor circuitry executing agent data processing instructions and/or configured to perform at least some of the operations represented by the flowcharts of FIGS. 6, 7 and 8.

In some examples, the example agent data processing TEE circuitry 104A of FIG. 2 includes means for managing operation of the autonomous agent 104 in accordance with one or more policies or operating rules. In some examples, the means for managing operation of the autonomous agent 104 can be implemented by the example policy manager circuitry 206. In some examples, the agent data processing TEE circuitry 104A of FIG. 2 includes means for managing one or more attestation processes. In some examples, the attestation processes allow the agent data processing TEE circuitry 104A to verify the identity of any outside devices and/or can attest to its own credentials when communicating with any outside devices. In some examples, the means for managing one or more attestation processes can be implemented by the example attestation manager circuitry 208.

In some examples, the agent data processing TEE circuitry 104A of FIG. 2 includes means for controlling the safety (e.g., the safe operation) of the autonomous agent 104. In some examples, the means for controlling the safety of the autonomous agent 104 includes means for calibrating and determining (or predicting) when maintenance is to be performed on any of the agent data processing TEE circuitry 104A. In some examples, the means for controlling the safety of the autonomous agent 104 can be implemented by the example the calibration and maintenance safety controller circuitry 210.

In some examples, the agent data processing TEE circuitry 104A of FIG. 2 includes means for fusing and analyzing data collected by the sensors 104B. In some examples, the means for fusing and analyzing data performs one or more techniques to fuse collected data and analyze the data to identify features of the data and/or to remove any obvious data outliers. In some examples, the means for fusing and analyzing data can include means for scaling the different types of data and/or converting the units in which the different types of the collected data are represented. In some examples, the means for fusing and analyzing data collected by the sensors 104B can be implemented by the example local data fuser and analyzer circuitry 212.

In some examples, the agent data processing TEE circuitry 104A of FIG. 2 includes means for assessing the quality of the sensed data. In some examples, assessing the quality of the sensed data can include assessing whether the data includes any anomalies. In some examples, the means for assessing the quality of the sensed data can include means for deriving/determining a data quality score (also referred to as a data quality value) for the sensed data and/or determining whether the data quality score/value meets a threshold value. In some examples, the means for assessing he quality of the sensed data can be implemented by the example quality and anomaly assessor circuitry 214.

In some examples, the agent data processing TEE circuitry 104A of FIG. 2 includes means for generating/adjusting a reputation score. In some examples, the means for generating/adjusting the reputation score can include means for identifying unexpected behaviors exhibited via the sensor data that include means for segregating data from noise in a signal containing both. In some examples, the means for generating/adjusting the reputation score includes means for reviewing data anomalies, data quality scores, sensed data and context information associated with the data. The means for generating/adjusting a reputation score can be implemented by the example the reputation score circuitry 216.

In some examples, the example agent data processing TEE circuitry 104A, 106A, 108A, 110A including the example database storage circuitry 204, the example policy manager circuitry 206, the example attestation manager circuitry 208, the example calibration and maintenance safety controller circuitry 210, the example local data fuser and analyzer circuitry 212, the example quality and anomaly assessor circuitry 214, and the example reputation score circuitry 216 may be instantiated by processor circuitry such as the example processor circuitry 1012 of FIG. 10. For instance, the agent data processing TEE circuitry 104A, 106A, 108A, 110A including one more of the database storage circuitry 204, the policy manager circuitry 206, the attestation manager circuitry 208, the calibration and maintenance safety controller circuitry 210, the local data fuser and analyzer circuitry 212, the quality and anomaly assessor circuitry 214, and the reputation score circuitry 216 may be instantiated by the example microprocessor 1200 of FIG. 12 executing machine executable instructions such as those implemented by at least some of the blocks of FIGS. 6, 7, and 8. In some examples, the agent data processing TEE circuitry 104A, 106A, 108A, 110A including one or more of the database storage circuitry 204, the policy manager circuitry 206, the attestation manager circuitry 208, the calibration and maintenance safety controller circuitry 210, the local data fuser and analyzer circuitry 212, the quality and anomaly assessor circuitry 214, and the reputation score circuitry 216) may be instantiated by hardware logic circuitry, which may be implemented by an ASIC, XPU, or the FPGA circuitry 1300 of FIG. 13 structured to perform operations corresponding to the machine readable instructions. Additionally or alternatively, the agent data processing TEE circuitry 104A, 106A, 108A, 110A including one or more of the database storage circuitry 204, the policy manager circuitry 206, the attestation manager circuitry 208, the calibration and maintenance safety controller circuitry 210, the local data fuser and analyzer circuitry 212, the quality and anomaly assessor circuitry 214, and the reputation score circuitry 216) may be instantiated by any other combination of hardware, software, and/or firmware. For example, the agent data processing TEE circuitry 104A, 106A, 108A, 110A including one or more of the database storage circuitry 204, the policy manager circuitry 206, the attestation manager circuitry 208, the calibration and maintenance safety controller circuitry 210, the local data fuser and analyzer circuitry 212, the quality and anomaly assessor circuitry 214, and the reputation score circuitry 216) may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 3:
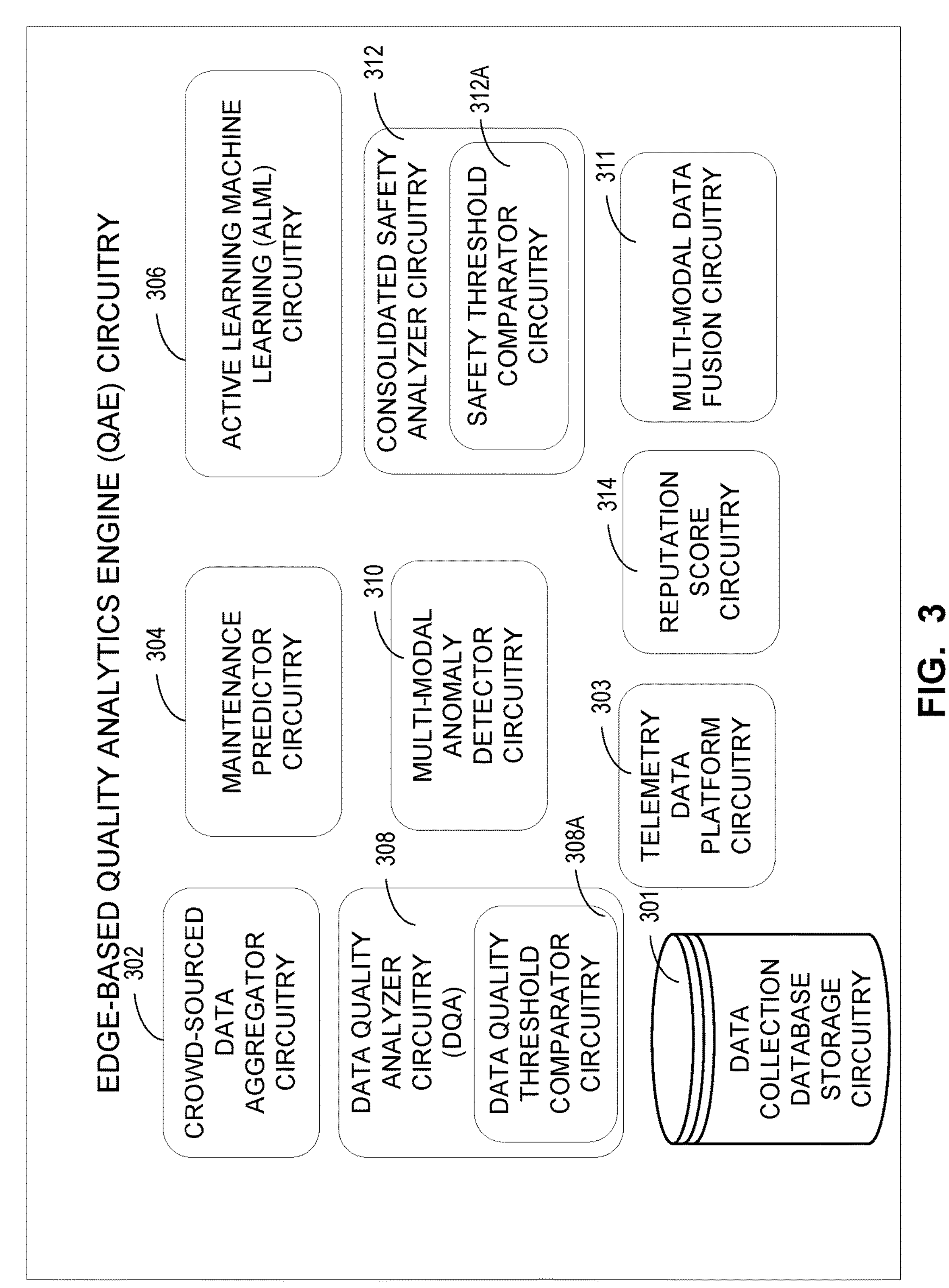
FIG. 3 is a block diagram of the edge-based data quality analytics engine of FIG. 1.

FIG. 3 is a block diagram of the example edge-based QAE circuitry 102 of FIG. 1. In some examples, the edge-based QAE circuitry 102 includes example data collection database storage circuitry 301, example crowed-sourced data aggregator circuitry 302 (also referred to as the data aggregator), an example telemetry data platform circuitry 303, an example maintenance predictor circuitry 304, example active learning machine learning (ALML) circuitry 306, example data quality analyzer (DQA) circuitry 308 (having an example data quality threshold comparator circuitry 308A), example multi-modal anomaly detector circuitry 310 (also referred to as the anomaly detector 310), example multi-modal data fusion circuitry 311, example consolidated safety analyzer circuitry 312, (also referred to as the safety analyzer circuitry 312), example safety threshold comparator circuitry 312A, and example reputation score circuitry 314.

In some examples, the crowd-sourced data aggregator circuitry 302 collects/receives the sensed data from the local sensors 104B (FIGS. 1 and 2) of the autonomous agent 104 (FIGS. 1 and 2). In some examples, the crowd-sourced data aggregator circuitry 302 receives sensed data from the local sensors 104B, 106B, 108B, 110B of any (or all) of the autonomous agents 104, 106, 108, 110. In some examples, the crowd-sourced data aggregator circuitry 302 also receives (or otherwise collects) sensed data from the example telemetry data platform 303. In some examples, the crowd-sourced aggregator circuitry collects/receives sensed data stored in the example data collection database storage circuitry 301.

In some examples, the example crowd-sourced data aggregator circuitry 302 performs cross correlation techniques (e.g., using, for example, a cross-correlation filter) on the supplied sensor data to rank the importance of the sensed data. In some examples, the cross-correlation filter identifies one or more types of the sensed data that can be eliminated from the data quality analysis and, in some examples, the cross-correlation filter assigns different weights to the different types of sensed data based on the rank of the sensed data. In some examples, the weights can be assigned to an output of a machine learning model that uses the sensed data as an input. In some examples, cross-correlation is used to identify different types of the sensed data that are correlated. In some such examples, the cross-correlation with peer nodes (e.g., across multiple, different autonomous agents) is performed at the edge-based QAE circuitry 102. Thus, the aggregation of data across multiple different ones of the autonomous agents 104, 106, 108, 110 can be used as input to the consolidated safety analyzer"]

In some examples, a safety analysis is performed on the edge-based QAE circuitry 102. As mentioned above, consolidation can refer to combining data obtained from multiple/different ones of the autonomous agents 104, 106, 108, 110. In some examples, data from the different autonomous agents 104, 106, 108, 110 can include anomaly scores, quality scores, reputation scores, etc.). In some examples, the example consolidated safety analyzer circuitry 312 can determine whether any of the received and, in some cases, consolidated data is indicative of anomalous motor operation of one or more of the autonomous agents 104, 106, 108, 110. For example, In some examples, such anomalous motor operation can cause the affected ones of the autonomous agents 104, 106, 108, 110 to move in a non-deterministic manner which can result in a collision. In some examples, the consolidated safety analyzer circuitry 312 can issue a safety alarm when such anomalous motor operation is detected. The safety alarm may alert humans using (or near) the (possibly defective) autonomous agent (e.g., any of the autonomous agents 104, 106, 108, 110) so that the humans may take action to prevent or limit any damage that may result from the anomalous motor operation. In some examples, the safety alarm can trigger one or more automated actions to be taken by the autonomous agent exhibiting the anomalous behavior. In some examples, the safety alarm is supplied to the one or more of the autonomous agents that are experiencing the anomalous behavior.

In some example scenarios, the example consolidated safety analyzer circuitry 312 includes the example safety threshold comparator circuitry 312A to compare sensed data from the autonomous agents 104, 106, 108, 110 with a safety threshold value, and when the safety threshold value is satisfied (or violated), the consolidated safety analyzer circuitry 312 can communicate instructions to the ones of the autonomous agents 104, 106, 108, 110 that will be (or are) affected by the safety analysis outcome. Such instructions can result in changes to one or more operations performed by the ones of the example autonomous agents 104, 106, 108, 110. In some examples, the operational changes can include changes in navigational operations, changes in speed, changes in operating status (e.g., shutdown command), changes to an amount or type of data to be sensed/transmitted to the edge-based QAE circuitry 102 for use in determining whether the data is in fact indicative of anomalous operation, etc.

In some examples, the sensed data obtained from multiple/different ones of the autonomous agents 104, 106, 108, 110 can be analyzed to determine a systemic issue affecting the sensors 104B, 106B, 108B, 110B and/or processing across multiple ones of the autonomous agents 104, 106, 108, 110. In some such examples, anomalous motor (or other) operation can be detected among multiple ones of the autonomous agents 104, 106, 108, 110 such that there are changes/fixes to be made across all such autonomous agents (similar to a recall notice issued by an auto manufacturer).

In some examples, the output of the example crowd-sourced data aggregator circuitry 302 is supplied to the example maintenance predictor circuitry 304. The maintenance predictor circuitry 304 predicts when maintenance will be required on one or more of the autonomous agents(s) from which the sensed data was collected so that maintenance can be scheduled in advance of system (or system component) failure (e.g., failure of the edge-based QAE circuitry 102, and/or failure of any of the data collection database storage circuitry 301, the crowd-sourced data aggregator circuitry 302, the telemetry data platform 303, the maintenance predictor circuitry 304, the example DQA circuitry 308, the example data quality threshold comparator circuitry 308A, the example ALML circuitry 306, the example multi-modal anomaly detector circuitry 310, the example multi-modal data fusion circuitry 311, the example consolidated safety analyzer circuitry 312 (including the example safety threshold comparator circuitry 312A), the example reputation score circuitry 314, etc.).

In some examples, the maintenance predictor circuitry 304 is implemented as an ensemble of machine learning algorithms/models. In some examples, different ones of the algorithms are designed to handle different types of data. In some examples, some or all of the algorithms are designed to process a same type of sensed data but use different techniques to do so. In some examples, each of the algorithms is designed to determine a predictive maintenance model that will estimate when a corresponding one or more of the autonomous agents 104, 106, 108, 110 from which the data was collected will require maintenance or when a portion (or portions) of the autonomous agent(s) 104, 106, 108, 110 will require maintenance.

The example ALML circuitry 306 is used to inject expert evaluations of, for example, any of the sensor data (and/or the corresponding feature data). In some examples, the ALML circuitry 306 injects expert evaluations of corresponding quality scores and/or reputation scores. An expert can examine the sensor data or feature data and label it appropriately and/or set such data aside for use in determining a root cause for a low quality score generated for the data. In some examples, when evaluating data having a low quality score an expert can determine whether the data is actually low quality or is not low but rather appears to be low quality because of the data type and/or a context in which the data was collected. In some examples, as described in connection with the example reputation score circuitry 216 of FIG. 2 (above) and the example feedback circuitry 428 of FIG. 4 (see below) the ALML circuitry 306 provides a manner in which user/human input can be used to learn from sets of data/features collected under different circumstances/contexts. As described above, in some examples, the user can access information about data determined to include noise. In some such examples, information about the noise, the data and a context in which the corresponding set of data/features were collected can be evaluated by a user and then an outcome of the user evaluation can be supplied to the ALML 306 for use in training the machine learning model. Thus, unlike many data collection/processing technologies in which data determined to be noisy (e.g., determined to have noise included in the same signal) is discarded and/or dropped from further evaluation, the example reputation score circuitry 314 and the example ALML circuitry 306 can use the "noisy" spatiotemporal set of data-points/features to intelligently 'learn,' based on, for example, a context in which the spatiotemporal data-points are collected. As the definition of noise can be different for data collected by the same sensors but across different applications/scenarios/contexts, the temporal aspects can be evaluated by the user to determine how to qualify the noise for corresponding data-points changes and the user evaluation can then be used to train the model of the ALML for evaluation of future sets of data/features. When noise is expected due to current environmental conditions, the data is useable by the autonomous agent (or other device) when determining whether one or more actions are to be taken (as described further below). When, depending on a context, so-called noise is unexpected, the data is (or can be) deemed problematic and, unusable by the autonomous agent (or other device). Thus, the so-called noise may be qualified differently in different circumstances/contexts.

For further example, when data collected from an image sensor (one of the sensors 104B, 106B, 108B, 110B) has a low quality score or when sensed data has been determined to be (or likely be) anomalous, the expert may determine that the sensed data is not to be used for decision making. In some examples, the expert may suspect that the image sensor that generated the data having the low quality score is faulty and take any number of actions to resolve the issue.

In some examples, the expert may determine, using a label accompanying the low quality data score, or using sensed data collected at a same time as the low quality sensor, that the low quality data score is not due to a faulty sensor but is instead due to the time of day at which the data was collected (e.g., after sundown), or the place at which the sensed data was collected (e.g., while the autonomous agent of interest (e.g., a mobile autonomous agent) was traveling through a darkened tunnel), weather conditions at the time the data was collected, etc. In some examples, the time and/or place at which the data was collected can be included in data labels added by the expert based on other sensed data or may have been included in tags associated with the data at the autonomous agent. In such examples, both time and place and conditions (e.g., weather) of a collected data set (e.g., after sundown, while in a darkened area) are associated with darker lighting conditions. The darker lighting conditions can account for the image data having a low quality score and, as such, time and place/location and weather conditions are but a few examples of context that can affect whether a low data quality score is a cause for concern or can be ignored. In some examples, the experts can use the evaluation of the sensed image data within a context as an opportunity to inject labels/tags indicating whether such image data (if determined to be low quality) can be ignored or given less value (weight) when decision making is performed. In this manner, both context and quality are taken into consideration when determining whether a low quality data score is a cause for concern.

By injecting the expert evaluations in the way of tags/labels, the resulting tagged/labeled data is more useful in training of the machine learning models of, for example, the example quality and anomaly assessor circuitry 214. In some examples, the machine learning models are partially or fully developed and trained at the ALML circuitry 306 of the edge-based QAE circuitry 102 and then communicated to the example quality & anomaly assessor circuitry 214 for usage thereat. Using the expert evaluations improves the accuracy of data tags/labels, and the accuracy of the quality scores, and further speeds the rate at which incoming sensor data can be evaluated/assessed. As a result, decisions that are based on the analyses that use the active machine learning models are more accurate and are made in less time.

In some examples, expert evaluation can be used to build a reputation score. In some such examples, when a low data quality score is encountered (or any data quality score (high or low)), the example reputation score circuitry 314 can use that quality score to generate a query for an expert. The query results can be used by an expert tasked with evaluation of the corresponding data (e.g., the data and/or features that were assigned the quality score in question). In some examples, the query probes any, some, or all of the example data collection database storage circuitry 301, the example reputation score storage circuitry 421, the example data collection database storage circuitry 402, the example anomaly database storage circuitry 410, etc., to identify information related to the data that has been assigned the unacceptable data quality score (also referred to as the scored data). In some examples, the query determines one or more classifications of the scored data and obtains other data from the storage circuitry having the same classifications. In some examples, the classifications are based on a sensor or set of sensors that collected the scored data or that are the same type of sensor as the sensor(s) that collected the scored data, context information similar to the context information of the scored data, data collection times similar to or related to the data collections times of the scored data, etc. As such, the query results can include sensor data, feature data, etc., having some commonalities with the scored data.

In some examples, the expert can consult additional data or other information to assign a reputation to the sensed data. In some examples, the DQA circuitry 308 uses the reputation score to weight or otherwise affect (raise or lower) an importance to be assigned to future sensed data (incoming data) associated with prior sensed data having the same reputation score or similar reputation score (e.g., within a threshold) and a same quality score. Thus, in some examples, the data quality score calculated for a set of data/features affects a reputation score assigned to that data. In some such examples, when a set of data/features is encountered that is similar to data collected at an earlier time (e.g., similar in value, context etc.), a reputation score assigned to the data from the earlier time can be assigned to data collected at a later time without requiring calculation of a new reputation score. Similarly, in some examples, when the reputation score determined for earlier-processed data/features is good, the analyses to calculate a new reputation score for the later-collected data can be bypassed. The ability to use the same reputation score in the manner described, greatly reduces the amount of energy and compute cycles of the example edge-based QAE circuitry 102 thereby improving the operation of the computing structure(s) used to implement the edge-based QAE circuitry 102.

In some examples, the example DQA circuitry 308 uses the reputation score to assist in the training of a ALML discriminator model used to generate data quality scores. In this manner, the accuracy of the data quality score generated by the ALML discriminator model of the DQA circuitry 308 for those other sensed data is improved. In some examples, the ALML discriminator model is implemented by the example ALML circuitry 306 and the DQA circuitry 308 accesses the ALML circuitry 306 to determine the quality score.

In some examples, the example multi-modal data fusion circuitry 311 fuses the different types (e.g., multi-modal) of sensor data. In some examples, the example multi-modal anomaly detector circuitry 310 or the example multi-modal data fusion circuitry 311 applies any of a number of multi-modal data fusion techniques to the sensed data instead of the example multi-modal data fusion circuitry 311. In some examples, circuitry similar to the multi-modal data fusion circuitry 311 can be installed in the example local data fuser and analyzer circuitry 212 (see FIG. 2) so that multi-modal sensor fusion can be achieved at the example autonomous agents 104, 106, 108, 110. In some examples, an example sensor data fusion circuitry 426 (see FIG. 4) is used to perform the multi-modal data fusion. In some examples, ensemble learning is used to perform the sensor fusion as described in greater detail above and below. The multi-modal anomaly detector circuitry 310 examines the fused data to identify anomalies associated with the fused data (if any). In some examples, a labeled training data set (developed in advance of operation or developed during operation) is used to construct a model representing normal system behavior (e.g., the expected operating behavior the autonomous agents 104, 106, 108, 110). The model can then be used to identify anomalies by determining how likely the model is to generate the same data as the asserted sensed data supplied to the multi-modal anomaly detector circuitry 310 (by way of the example multi-modal data fusion circuitry 311). If the likelihood is low, then the data is likely anomalous, and if the likelihood is high, the data is not likely to be anomalous. In some examples, the multi-modal anomaly detector circuitry 310 receives information from the example DQA circuitry 308 indicating a relevance/importance of sensed data. As discussed further below in connection with FIG. 4, determining the relevance/importance of the sensed data can include intermediary steps in which the sensed data is used to extract feature data which, when analyzed, provides quality and/or anomaly information about the underlying sensed data. In some examples, the relevance/importance information indicates that one or more of the sensed data is highly important/relevant such that any anomaly (anomalies) associated with the sensed data should be given more consideration when determining whether the overall operation of the autonomous agent 104 (as represented by the sensor data) is anomalous. In some examples, the relevance/importance information indicates that one or more of the sensed data is of low important/relevant such that any anomaly associated with the sensed data should be given less consideration when determining whether the overall operation of the autonomous agent 104 (as represented by the sensor data) is anomalous.

In some examples, the importance/relevance determined by the example DQA circuitry 308 for each of the types of sensed data takes the form of an example weight to be used by the multi-modal anomaly detector circuitry 310 when determining whether the overall operation of the autonomous agent 104 (as represented by the sensor data, and/or extracted feature data) is anomalous. In some examples, a higher weight means the corresponding data (when anomalous) is more likely to adversely affect the overall operation of the autonomous agent 104 such that an anomaly should be indicated/flagged and used to affect the quality score and/or reputation of the sensed data. In contrast, a lower weight can mean the corresponding sensed data (when anomalous) is less likely to adversely affect the overall operation of the autonomous agent 104 such that an anomaly need not necessarily be flagged or adversely affect the data quality score or reputation.

The example multi-modal anomaly detector circuitry 310 develops/learns about the expected behavior (e.g., a normal distribution model) of data supplied by each of the example data sensors 104B. In some examples, the multi-modal anomaly detector circuitry 310 compares incoming data from each of the sensors 104B to the expected behaviors. The multi-modal anomaly detector circuitry 310 detects any anomalies in the sensed data using the outcomes of the comparisons, and weights (e.g., relevance weights supplied by a machine learning model as shown in FIG. 4) supplied by the example DQA circuitry 308, a data quality score (or multiple data quality scores) for the current set of data/features being evaluated, and, in some examples, data quality threshold values for each of the different types of sensor data/features. In some examples, different ones of the data quality threshold values correspond to different ones of the types of sensor data and collected in different contexts. In some examples, the data quality threshold values are developed using quality training of machine learning circuitry performed off-line. The multi-modal anomaly detector circuitry 310 can use the above-identified information to determine whether a set of sensor data/feature currently being processed is anomalous.

In some examples, the example DQA circuitry 308 extracts features (both spatial and temporal) from pre-processed sensor data collected by the example sensors 104B. In addition, features are extracted using both statistical and Deep Learning (DL) based extraction techniques. In some examples, expert analyses of the extracted features and/or sensed data in a given context can also be used to develop/improve a machine learning model for the deep learning based extraction techniques. In some examples, when the autonomous agents (e.g., the autonomous agents 104, 106, 108, 110) are mobile, the experts can analyze sensed data/features at the edge-based QAE circuitry 102 to improve the machine learning models to be used by the mobile autonomous agents for deep learning based feature extraction, quality score determination, ensemble learning, anomaly detection, etc. In some examples, when the autonomous agents (e.g., the autonomous agents 104, 106, 108, 110) are not mobile (e.g., are installed on a factory floor, are installed in an agricultural processing center, are installed in (or primary associated with) any location, etc.), the experts can analyze sensed sets of data/features at the site of the non-mobile autonomous agents for the purpose of developing and improving the machine learning models used for deep learning based feature extraction, quality score determination, ensemble learning, anomaly detection, etc.

In some examples, the statistical feature extraction operation generates statistical features of the data. In some examples, the deep learning feature extraction operation is applied to determine, for example, features about the content of the data. In some examples, the deep-learning feature extraction operation determines, for example, whether sensed imaged data includes particular parts of images, whether the sensed image data includes an image of a particular object, etc., and, if so, extracts that information as a feature.

For the avoidance of confusion, data fusion is the combining/fusing of data from different sensors, whereas consolidating features is a next operation performed during the data quality analysis. In some examples, a 'selected' or 'subset' of features are considered and consolidated. In some examples, individual multiple features associated with a single sensor can be extracted and the extracted multiple features can be consolidated as part of the data fusion operations described above.

The example DQA circuitry 308 consolidates the extracted data/features and determines a data quality score for at least some of the features and/or determines a single quality score a set of features as a whole. In some examples, the DQA circuitry 308 includes the example data quality threshold comparator circuitry 308A for determining whether a data quality value meets at least a threshold level of data quality. In some examples, different data quality threshold values are determined for each or at least some of the different types of sensors/data/features being analyzed. In some examples, when a data quality value determined by the QAE circuitry 308 does not meet a corresponding data quality threshold value, the data quality threshold comparator circuitry 308A identifies the corresponding data as having an insufficient level of quality and the example DQA circuitry 308 causes the data of insufficient quality to be discarded or disregarded. In some examples, the DQA circuitry 308 causes the data of insufficient quality (and any corresponding information such as a context in which the data was collected, the sensor from which the data was collected, etc.) to be supplied to a user interface (see the example user interface 404 of FIG. 4) for further evaluation by a user having knowledge of the operations performed by the autonomous agents 104, 106, 108, 110. Disclosure about performing the evaluation is described further in connection with an example active learning feedback circuitry 428 of FIG. 4 and FIG. 5.

In some examples, the example DQA circuitry 308 includes a machine learning discriminator model implemented, for example on a neural network as described further below in connection with FIG. 6. In some examples, the example DQA circuitry 308 first evaluates individual data/features and assigns the individual data/features a score. In some examples, the DQA circuitry uses the example individual data quality score(s) to determine a data quality score representative of the set of data/features as a whole.

In either event, the machine learning discriminator model, when properly trained using reference machine learning data, can discriminate between good quality data and poor quality data. In some examples, as described in greater detail above and below, the DQA circuitry 308 can use a corresponding reputation score as learning data for the machine learning discriminator model. In some examples, instead of (or in addition to) using a discriminator machine learning model, a generative adversarial network (GAN) machine learning model) can be used to not only classify the data as good (or not good) quality but can also assign a quality score to the sensed data (or corresponding feature) being analyzed. For example, when the machine learning model classifies the data as 'good' quality then a quality score associated with the data can be updated to reflect this classification.

Alternatively, an intermediate "probabilistic" approach could be employed to annotate the quality score as well. In some such examples, based on the resultant classification info assigned to sensed data (or a corresponding data feature) the GAN machine learning model can probabilistically compute a data quality score. In some examples, the DQA circuitry 308 does not include the discriminator (or GAN) machine learning model circuitry but instead accesses the ALML circuitry 306 configured to operate as the example discriminator (or GAN) machine learning model.

In some examples, the example edge-based QAE circuitry 102 includes example reference data/features representative of normal (e.g. not faulty) operation of one or more of the autonomous agents 104, 106, 108, 110. In some such examples, the normal reference data can also or instead be accessed by the DQA circuitry 308 and/or by the ALML circuitry 306 for training. In some examples, the set of reference data representative of normal (e.g. not faulty) operation of one or more of the autonomous agents 104, 106, 108, 110 can be stored in the example data collection database storage circuitry 301.

In some examples, the consolidated safety analyzer circuitry 312 adapts/adjusts scaling factors used to scale one or more of the collected raw sensor data values. Scaling permits the sensor values to be analyzed together by placing the sensor data values in a common set of units. In some examples, an initial set of scaling factors can be determined by experts that initialize operation of the DQA circuitry 308. In some examples, a previously determined model of the safe operation of the autonomous agent 104A can be used to generate the scaling factors to be applied to the sensed raw data values, at least initially. In some examples, the scaling factors are adjusted based on 1) dynamic active learning that includes one or more experts evaluating sensed data collected in different contexts, 2) reputation scores, 3) revocation (also referred to as deactivation) of one or more of the sensors 104B, 4) one or more policies enforced by the example policy manager circuitry 206 of FIG. 2, etc. The ability to dynamically adjust scaling factors to be applied to the raw sensor values ensures that the sensors 104B remain properly calibrated during operation, which is essential to safe operation of the autonomous agent 104A.

One or more of the example edge-based QAE circuitry 102 of FIGS. 1 and 3 including one or more of the example data collection database storage circuitry 301, the example crowd-sourced data aggregator circuitry 302, the telemetry data platform 303, the example maintenance predictor circuitry 304, the example ALML circuitry 306, the example DQA circuitry 308, the data quality threshold comparator circuitry 308A, the example multi-modal anomaly detector circuitry 310, the example multi-modal data fusion circuitry 311, the example consolidated safety analyzer circuitry 312, the example safety threshold comparator circuitry 312A, and the example reputation score circuitry 314 may be instantiated (e.g., create an instance of, bring into being for any length of time, materialize, implement, etc.) by processor circuitry such as a central processing unit executing instructions. Additionally or alternatively, the edge-based QAE circuitry 102 of FIG. 3 including one or more of the example data collection database storage circuitry 301, the crowd-sourced data aggregator circuitry 302, the telemetry data platform 303, the maintenance predictor circuitry 304, the ALML circuitry 306, the DQA circuitry 308, the data quality threshold comparator circuitry 308A, the multi-modal anomaly detector circuitry 310, the multi-modal data fusion circuitry 311, the consolidated safety analyzer circuitry 312, the example safety threshold comparator circuitry 312A, and the reputation score circuitry 314 may be instantiated (e.g., create an instance of, bring into being for any length of time, materialize, implement, etc.) by an ASIC or an FPGA structured to perform operations corresponding to the instructions. It should be understood that the edge-based QAE circuitry 102 of FIG. 3 including some or all of the data collection database storage circuitry 301, the crowd-sourced data aggregator circuitry 302, the telemetry data platform 303, the maintenance predictor circuitry 304, the ALML circuitry 306, the DQA circuitry 308, the data quality threshold comparator circuitry 308A, the multi-modal anomaly detector circuitry 310, the example multi-modal data fusion circuitry 311, the consolidated safety analyzer circuitry 312, the safety threshold comparator circuitry 312A, and the reputation score circuitry 314 may, thus, be instantiated at the same or different times.

Additionally, some or all of the example data collection database storage circuitry 301, the example crowd-sourced data aggregator circuitry 302, the example telemetry data platform 303, the example maintenance predictor circuitry 304, the example ALML circuitry 306, the example DQA circuitry 308, the example data quality threshold comparator circuitry 308A, the example multi-modal anomaly detector circuitry 310, the example multi-modal data fusion circuitry 311, the example consolidated safety analyzer circuitry 312, the example safety threshold comparator circuitry 312A, and the example reputation score circuitry 314 of the example edge-based QAE circuitry 102 of FIG. 2 may be instantiated, for example, in one or more threads executing concurrently on hardware and/or in series on hardware. Moreover, in some examples, some or all of the data collection database storage circuitry 301, the crowd-sourced data aggregator circuitry 302, the telemetry data platform 303, the maintenance predictor circuitry 304, the ALML circuitry 306, the DQA circuitry 308, the multi-modal anomaly detector circuitry 310, the example multi-modal data fusion circuitry 311, the consolidated safety analyzer circuitry 312, the safety threshold comparator circuitry 312A, and the reputation score circuitry 314 of the edge-based QAE circuitry 102 of FIG. 3 may be implemented by microprocessor circuitry executing instructions to implement one or more virtual machines and/or containers.

In some examples, one or more of the example data collection database storage circuitry 301, the example crowd-sourced data aggregator circuitry 302, the telemetry data platform 303, the example maintenance predictor circuitry 304, the example ALML circuitry 306, the example DQA circuitry 308, the data quality threshold comparator circuitry 308A, the example multi-modal anomaly detector circuitry 310, the example multi-modal data fusion circuitry 311, the example consolidated safety analyzer circuitry 312, the safety threshold comparator circuitry 312A, and the example reputation score circuitry 314 of the example edge-based QAE circuitry 102 of FIG. 3 are instantiated by processor circuitry executing agent data processing instructions and/or configured to perform operations such as those represented by the flowcharts of FIGS. 6, 7 and 8.

In some examples, the example edge-based QAE circuitry 102 of FIG. 3 includes means for aggregating crowd-sourced data. In some such examples, the means for aggregating the crowd sourced data aggregates data sensed and collected from multiple ones of the example autonomous agents 104, 106, 108, 110. In some examples, the means for aggregating the crowd sourced data includes means for consolidating the sensed data, means for scaling the data (if needed), means for removing any spurious data or obvious outliers, etc. In some examples, means for aggregating the crowd sourced data can be implemented by the crowd-sourced data aggregator circuitry 302.

In some examples, the example edge-based QAE circuitry 102 of FIG. 3 includes means for predicting maintenance which can be implemented by the example maintenance predictor circuitry 304. In some examples, the means for predicting maintenance determine when and/or whether any of the example data collection database storage circuitry 301, the example crowd-sourced data aggregator circuitry 302, the example telemetry data platform 303, the example maintenance predictor circuitry 304, the example ALML circuitry 306, the example DQA circuitry 308, the example data quality threshold comparator circuitry 308A, the example multi-modal anomaly detector circuitry 310, the example multi-modal data fusion circuitry 311, the example consolidated safety analyzer circuitry 312, the example safety threshold comparator circuitry 312A, and the example reputation score circuitry 314 of the example edge-based QAE circuitry 102 of FIG. 3 need (or will soon need) maintenance.

In some examples, the example edge-based QAE circuitry 102 of FIG. 3 includes means for example active learning. In some examples, the means for active learning enable access, by a human, to a set of sensed data/features, corresponding data quality score(s), corresponding context information, etc. The human can then analyze the information and make determinations as to the whether the data quality score accurately reflects the corresponding data/features, and, when needed adjust a reputation score assigned/generated for the data/features. In some examples, the adjusted reputation score (or unadjusted reputation score) and accompanying information can be supplied to a machine learning model (e.g., a discriminator model). In some examples, the machine learning model can give the human supplied information greater weight as training data such that the machine learning model is trained more quickly and accurately. In some examples, the means for active learning can be implemented by the example ALML circuitry 306.

In some examples, the example edge-based QAE circuitry 102 of FIG. 3 includes means for generating a data quality score. In some examples, the data quality score indicates whether the corresponding data/feature is of high quality (and therefore reliable) or is instead of low quality and (therefore not reliable or questionably reliable). In some examples, the means for generating a data quality score is implemented by the example DQA circuitry 308 of FIG. 3. In some examples, the DQA circuitry 308 is implemented, at least in part, by a machine learning model that can include a deep neural network such that the means for generating a data quality score can be implemented by a machine learning model. In some examples, the means for generating a data quality score also determines a relevance of one or more of the values of a data/feature. The relevance can then be used by an anomaly detector (e.g., the multi-modal anomaly detector circuitry 310 of FIG. 3 as described above) to emphasize or de-emphasize the corresponding data when performing anomaly detection.

In some examples, the example edge-based QAE circuitry 102 of FIG. 3 includes means for analyzing safety. In some examples, the means for analyzing safety can be implemented by the example consolidated safety analyzer circuitry 312 and the example safety threshold comparator circuitry 312A. In some examples, the means for analyzing safety compares sensed data from one or more of the autonomous agents 104, 106, 108, 110 with a safety threshold, and when the safety threshold is satisfied (and/or violated), the consolidated safety analyzer circuitry 312 can communicate instructions to the ones of the autonomous agents 104, 106, 108, 110 that will be (or are) affected by the safety analysis outcome. In some examples, the means for analyzing safety can include means for comparing and means for alarming.

In some examples, the example edge-based QAE circuitry 102 of FIG. 3 includes means for generating a reputation score. In some examples, the means for generating the reputation score can be implemented by the example reputation score circuitry 314. In some examples, the means for generating a reputation score can be implemented by an active machine learning model (e.g., the example ALML circuitry 306) that uses evaluations supplied by one or more humans to train the model.

Figure 9:
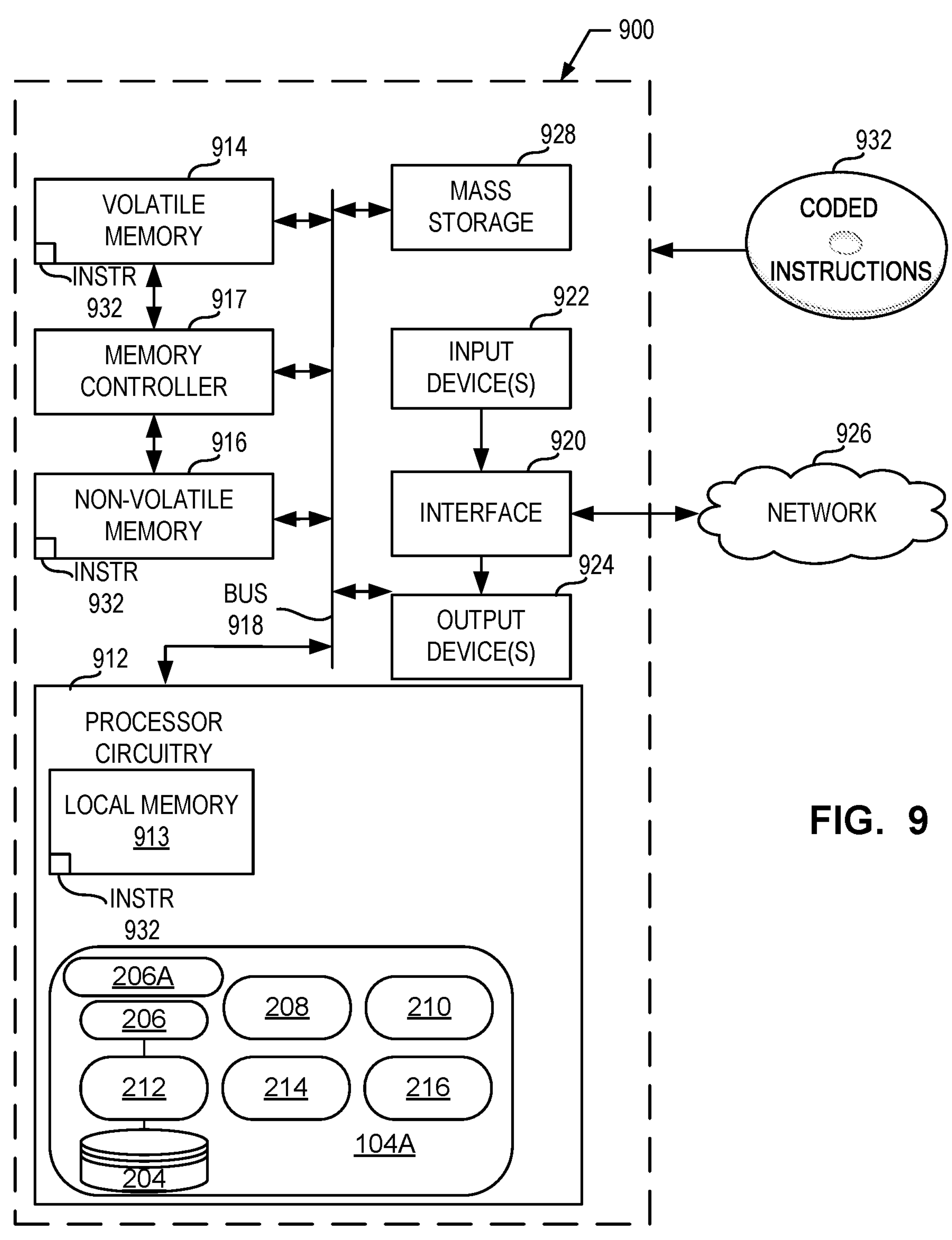
FIG. 9 is a block diagram of an example processing platform including processor circuitry structured to execute the example machine readable instructions and/or the example operations of FIGS. 6, 7, and 8 to implement the example autonomous agents of FIGS. 1 and 2.

In some examples, one or more of the example data collection database storage circuitry 301, the example crowd-sourced data aggregator circuitry 302, the example telemetry data platform 303, the example maintenance predictor circuitry 304, the example ALML circuitry 306, the example DQA circuitry 308, the example data quality threshold comparator circuitry 308A, the example multi-modal anomaly detector circuitry 310, the example multi-modal data fusion circuitry 311, the example consolidated safety analyzer circuitry 312, the example safety threshold comparator circuitry 312A, and the example reputation score circuitry 314 of the example edge-based QAE circuitry 102 of FIG. 3 may be instantiated by processor circuitry such as the example processor circuitry 912 of FIG. 9. For instance, one or more of the data collection database storage circuitry 301, the crowd-sourced data aggregator circuitry 302, the example telemetry data platform 303, the maintenance predictor circuitry 304, the ALML circuitry 306, the DQA circuitry 308, the data quality threshold comparator circuitry 308A, the multi-modal anomaly detector circuitry 310, the example multi-modal data fusion circuitry 311, the consolidated safety analyzer circuitry 312, the safety threshold comparator circuitry 312A, and the reputation score circuitry 314 of the example edge-based QAE circuitry 102 of FIG. 3 may be instantiated by the example microprocessor 1200 of FIG. 12 executing machine executable instructions such as those implemented by at least blocks of FIGS. 6, 7, and 8.

Figure 13:
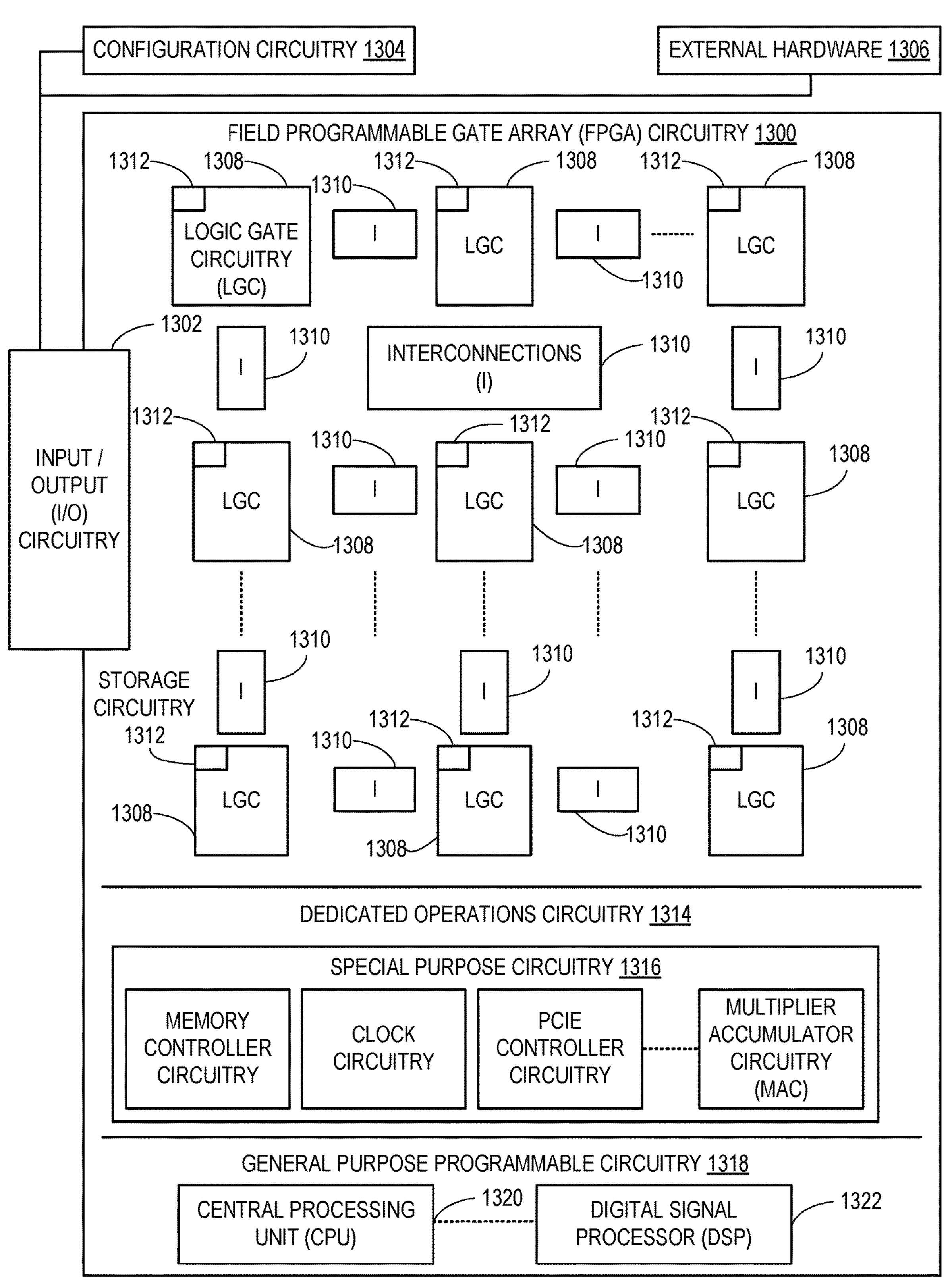
FIG. 13 is a block diagram of another example implementation of the processor circuitry of FIGS. 9-11.

In some examples, one or more of the example data collection database storage circuitry 301, the example crowd-sourced data aggregator circuitry 302, the example telemetry data platform 303, the example maintenance predictor circuitry 304, the example ALML circuitry 306, the example DQA circuitry 308, the example data quality threshold comparator circuitry 308A, the example multi-modal anomaly detector circuitry 310, the example multi-modal data fusion circuitry 311, the example consolidated safety analyzer circuitry 312, the example safety threshold comparator circuitry 312A, and the example reputation score circuitry 314 of the example edge-based QAE circuitry 102 of FIG. 3 may be instantiated by hardware logic circuitry, which may be implemented by an ASIC, XPU, or the FPGA circuitry 1300 of FIG. 13 structured to perform operations corresponding to the machine readable instructions. Additionally or alternatively, one or more of the example data collection database storage circuitry 301, the crowd-sourced data aggregator circuitry 302, the example telemetry data platform 303, the maintenance predictor circuitry 304, the ALML circuitry 306, the DQA circuitry 308, the data quality threshold comparator circuitry 308A, the multi-modal anomaly detector circuitry 310, the example multi-modal data fusion circuitry 311, the consolidated safety analyzer circuitry 312, the example safety threshold comparator circuitry 312A, and the reputation score circuitry 314 of the edge-based QAE circuitry 102 of FIG. 3 may be instantiated be by any other combination of hardware, software, and/or firmware. For example, one or more of the example data collection database storage circuitry 301, the example crowd-sourced data aggregator circuitry 302, the example telemetry data platform 303, the example maintenance predictor circuitry 304, the example ALML circuitry 306, the example DQA circuitry 308, the example data quality threshold comparator circuitry 308A, the example multi-modal anomaly detector circuitry 310, the example multi-modal data fusion circuitry 311, the example consolidated safety analyzer circuitry 312, the example safety threshold comparator circuitry 312A, and the example reputation score circuitry 314 of the example edge-based QAE circuitry 102 of FIG. 3 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 4:
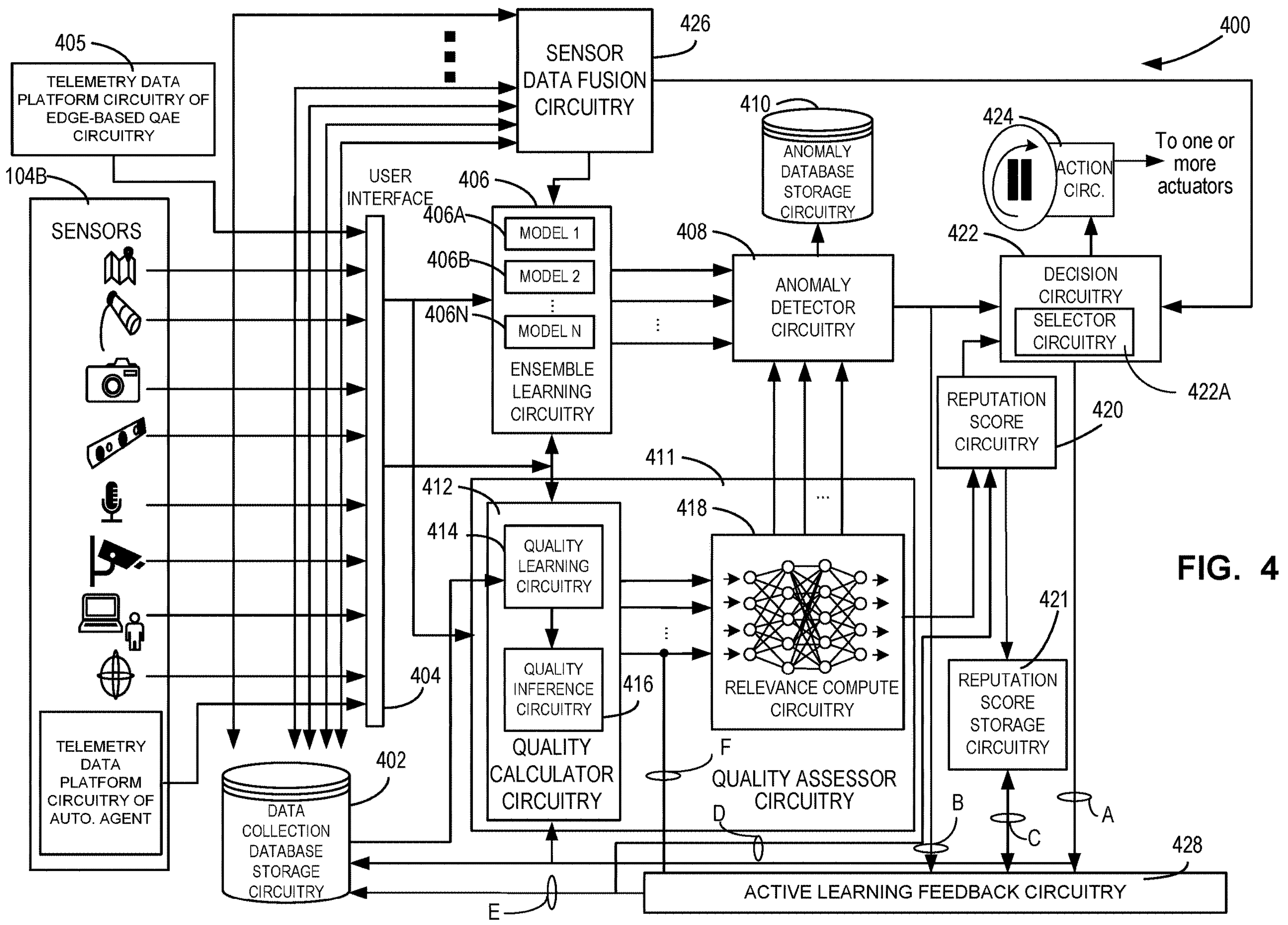
FIG. 4 is a block diagram of a data quality and learning system that can be implemented by the blocks of the autonomous agent FIGS. 1 and 2 or the blocks of the edge-based data quality analytics engine of FIGS. 1, and 3.

FIG. 4 is a block diagram 400 representing an example implementation of at least portions of the example edge-based QAE circuitry 102 (See FIG. 1 and FIG. 3). In some examples, at least portions of the block diagram 400 can also represent an example implementation of the blocks included in the agent data processing TEE circuitry 104A (see FIG. 2) and the example local sensors 104B (see FIG. 2). In some examples, the edge-based QAE circuitry 102 receives sensor data from an example set of sensors (e.g., the sensors 104B, 106B, 108B, 110B, etc.) illustrated in FIG. 1 and FIG. 2. In some examples, the edge-based QAE circuitry 102 includes an example data collection database storage circuitry 402, an example user interface circuitry 404, an example telemetry data platform circuitry 405, and example ensemble learning circuitry 406 that includes a number ("N") of example machine learning algorithms/models including a model 1 406A, a model 2 406B, . . . a model N 406N, etc.) to process the sensed data and the telemetry data.

In some examples, the example user interface circuitry 404 is an application/capability for capturing sensor data. In some cases, sensors include interfaces that need not be adapted, in others, the sensor interface is to be adapted to enable proper communication of the sensed data to the example circuitry of FIG. 4. In further examples, sensor interfaces need to be enabled and/or configured before the sensors will supply sensed data. In some examples, the example user interface circuitry 404 can be implemented as a dashboard or as a type of user interface referred to as a wrapper that can be used to capture sensor data. In some such examples, the wrapper can be a software wrapper capable of enabling capture of sensor data. The user interface circuitry 404 can, for example, enable I2C to capture IMU data or SPI to capture microphone data etc. The user interface circuitry 404 can be a wrapper that can configure relevant mechanisms to capture sensor data. In many scenarios, data fusion techniques can be applied to the data output by the user interface circuitry 404 via the sensor data fusion circuitry 426. In some examples, an output(s) of the sensor data fusion circuitry 426 is supplied to the example ensemble learning module 406. In some examples, scaled data and/or data features extracted from the sensed data can be applied to the ensemble learning circuitry 406 instead of or in addition to the sensed data.

In some examples, the example telemetry data platform circuitry 405 also supplies telemetry data to the example sensor data fusion circuitry 426. In some examples, the telemetry data is related to various operations of the devices of the edge-based QAE circuitry 102 or related to various operations of one or more of the example autonomous agents 104, 106, 108, 110, depending on where the telemetry data platform circuitry 405 is installed. As illustrated in FIG. 4, when installed the telemetry data platform circuitry is installed in one of the autonomous agents (e.g., the autonomous agent 104), the telemetry data platform circuitry is included as one of the sensors 104B. When installed in the edge-based QAE circuitry 102, the telemetry data platform circuitry 405 is illustrated apart from the sensors 104B of the autonomous agent 104. In some examples, the telemetry data platform circuitry 405 collects error correction checking data (at the platform and the device levels), time-sensitive network communication error data, device utilization data (e.g., the utilization of any of the device(s)/circuitry on-board the autonomous agent edge-based QAE 102 and/or the on-board the autonomous agents 104, 106, 108, 110 including CPU, memory, disk space, bandwidth, etc.) and/or performance of individual applications and the execution of tasks within (or by) any of the on-board devices. The telemetry data platform can also collect and supply data related to (e.g., monitor for) device failure (e.g., information indicating that any of the devices/circuitry of the edge-based QAE circuitry 102 or the agent data processing TEE circuitry 104A, 106A, 108A, 110A, etc. have failed).

In some examples, the edge-based QAE circuitry 102 also includes example anomaly detector circuitry 408 that receives the output(s) of the ensemble learning circuitry 406 and accesses example anomaly database storage circuitry 410 to make predictions as to whether a data anomaly is likely to occur. In some examples, the anomaly detector circuitry 408 analyzes the output of the ensemble learning circuitry 406 using one or more algorithms to determine the likelihood that an anomaly will occur. In some examples, anomalous data stored in the anomaly database storage circuitry 410 is accessed by the anomaly detector 408 for comparison purposes. In some examples, the anomalous data can be generated in advance using operating data (e.g., dynamically learned information) collected from autonomous agents/systems that are similar to (or nearly identical) to the autonomous agents/systems for which data anomalies are to be detected. In some examples, the contents of the anomaly database storage circuitry 410 can be generated as the system 100 operates. In some examples, pre-stored anomalous data can be supplemented with anomalous data collected during operation of the edge-based QAE 102. The anomaly detector circuitry 408 can also compare a predicted anomaly to the contents of the anomaly database storage circuitry 410 to assess the accuracy of the anomaly predictions.

In some examples, the example multi-modal anomaly detector circuitry 310 and the example multi-modal data fusion circuitry 311, both of FIG. 3, are implemented by one or more of the example user interface circuitry 404, the example telemetry data platform circuitry 405, the example ensemble learning circuitry 406, the example sensor data fusion circuitry 426, the example anomaly detector circuitry 408, and the example anomaly database storage circuitry 410. Similarly, the example quality and anomaly assessor circuitry 214 (see FIG. 2) can be implemented by at least the example ensemble learning circuitry 406, the example anomaly detector circuitry 408, the example anomaly database storage circuitry 410, and, if needed, the example sensor data fusion circuitry 426.

Returning to FIG. 4, in some examples, the example anomaly detector 408 analyzes the output of the ensemble learning circuitry 406 based on relevance data generated as described in detail below. The relevance data identifies whether, for example, data associated with a given sensor is to be given greater importance (e.g., assigned a heavier weight) than other sensors. In some examples, data determined to be anomalous (or likely anomalous) may also be of low relevance/importance to the operation of the system (e.g., any of the autonomous agents 104, 106, 108, 110 of FIG. 1). In some such examples, the anomalous data can be given less importance by the example anomaly detector 408. In some examples, the relevance is based, in part, on a context in which data was (or is) collected, as described in greater detail above and below.

In some examples, the N machine learning algorithms (e.g., the example model 1 406A, the example model 2 406B, . . . the example model N 406N) each attempt to generate predictive results based on sensed data supplied by corresponding ones of the different sets local sensors (e.g., 104B, 106B, 108B, 110B) and the example telemetry data platform circuitry 405 via the user interface 404. In some such examples, the machine learning algorithms (the model 1 406A, the model 2 406B, . . . , the model N 406N) operate to learn expected behaviors for corresponding sensed data. In some examples, the ensemble learning circuitry 406 determines predictions based, in part, on data quality information including, for example, one or more data quality scores generated in a manner described in detail below. In some examples, over time, the machine learning algorithms (the model 1 406A, the model 2 406B, . . . , the model N 406N) can also learn patterns of operation and corresponding contextual information. For example, a pattern of quality deterioration can be detected for some sensed data types. In some examples, a pattern of quality deterioration can indicate that when temperatures are above or below a threshold the sensed data corresponding to the data type being examined is likely to be analogous. In some such examples, the corresponding machine learning algorithms (the model 1 406A, the model 2 406B, . . . , the model N 406N) can use the learned patterns and the learned expected operation behavior to predict a time(s) (or window(s) of time) within which corresponding sensed data is likely to be anomalous. Thus, in some examples, the results of the machine learning algorithms (the model 1 406A, the model 2 406B, . . . , the model N 406N) can include predictions as to when anomalous behaviors are likely to occur and supply such predictions to the example anomaly detection module 408. The anomaly detector 408 uses these anomaly predictions and the relevance data (described further below) to assess how the individual predictions may affect the operation of the system as a whole. In some examples, the anomaly detector 408 operates in the same manner as the multi-modal anomaly detector circuitry 310 of FIG. 3. In some examples, the operations performed by the anomaly detector 408 to detect anomalies are based on a quality score of the current data set, a running average histogram of past data, a reference threshold determined used offline training, and the relevance weights.

Referring still to FIG. 4, the example implementation 400 of the example edge-based QAE circuitry 102 (see FIG. 1 and FIG. 2) includes an example quality assessor circuitry 411 that includes an example quality calculator circuitry 412 having an example quality learning circuitry 414 and an example quality inference circuitry 416. In some examples, the quality learning circuitry 414 and the quality inference circuitry 416 are implemented using machine learning circuitry and techniques built on neural networks.

In some examples, the example user interface 404 delivers the sensor data collected by the example sensors 104B and the telemetry sensor data collected by, for example, the example telemetry data platform circuitry 405, to the example quality calculator circuitry 412. In some examples, the user interface 404 performs scaling operations on one or more of the sensed data before the sensed data is supplied to the example quality calculator circuitry 412. Such scaling factors can be initially set by a human operator. In some examples, adjustments to the scaling factors can be determined by a human operator or can be determined using machine learning techniques applied during operation of the edge-based QAE circuitry 102 and/or any of the autonomous agents (e.g., the autonomous agents 104, 106, 108, 110 of FIG. 1). In some examples, the user interface 404 performs pre-processing operations on the incoming sensor data to place the sensor data in condition for further processing by computers and machine learning networks.

In addition to the sensed data supplied to the example quality calculator circuitry 412, the quality learning circuitry 414 can receive and/or retrieve collected sensed data from the example data collection database storage circuitry 402. In some examples, the incoming sensor data, whether retrieved from the data collection database storage circuitry, received from the user interface 404, or supplied by the example telemetry data platform circuitry 405 includes tags/labels that identify any of a variety of information about the sensor data. In some examples, the tags/labels can be applied at the sensor level and can include an identifier of the sensor, a time at which the data was sensed, a direction in which the sensor is facing (if relevant), a geographical position of the sensor at the time at which the data is sensed, etc.

In some examples, the example quality calculator circuitry 412 extracts features from the sensed data. The features extracted can include any of a variety of features including, for example, spatial features, and temporal features, etc. In some examples, the quality learning circuitry 414 uses also uses statistical extraction methods and deep learning based feature extraction methods. In some examples, the labels/tags associated with the sensed/sensory data is attached to (or otherwise associated with) the corresponding extracted features.

Thus, the example quality learning circuitry 414 uses data features from a set of sensed data collected at a same time (or within a same time window, for example) by different types of sensors. The quality learning circuitry 414 uses machine learning to evaluate the quality of the data features and to learn about the operation of the autonomous agent 104 as whole.

For example, the quality learning circuitry 414 learns statistical aspects of the features (or sensed data), such as which of the features (or sensed data) correlate to one or more other features (or other sensed data), statistical measures of the features (e.g., mean, median, a frequency distribution of the features, variability of the features, etc. In some examples, the quality learning circuitry 414, when processing the features, attaches labels to the features based on information learned from previous sets of features processed by the quality learning circuitry 414 at an earlier time. In some examples, the attached tag(s)/label(s) can be as simple as a binary tag/label (e.g., having a value of “1” or “0”). In some such examples, a binary value 1 tag can be associated with (or otherwise attached to) data of good quality, while a binary value 0 tag can be associated with (or otherwise attached to) data of poor quality (e.g., data that does not satisfy a threshold level of quality). In some examples, tags/labels to be associated with a feature (or sensed data) can classify the corresponding feature (or sensed data) as belonging to multiple classes or a subset of multiple classes. In some examples, the quality learning circuitry 414 learns from features associated with a content feature of the data such as, whether example sensed image data identifies part of a corner of an image, whether example sensed sound data has a particular pitch, tone, etc.

In some examples, to learn about the operation of the autonomous agent 104 as a whole, the quality learning circuitry 414 determines a context describing conditions in which the sensed data corresponding to the data features were collected. In some examples, a context can be described using a time of day, lighting conditions, weather conditions, geographical location information, conditions of the surface on which the autonomous agent is traveling (when the autonomous agent is a mobile agent that travels on a surface), a wind speed, and/or any number of other variables that can affect a quality analysis. For examples, a set of feature data assigned a quality score that is associated with one context may be determined to satisfy a quality threshold, while the same set of feature data assigned the same quality score but that is associated with a different context may be determined to not satisfy a quality threshold.

In some examples, the features (or corresponding sensed data) are consolidated using any of a variety of data consolidation algorithms. The resulting consolidated data represents the operation of the system (e.g., any or all of the autonomous agents 104, 106, 108, 110) from which the data is being collected at the time the data was collected. In some examples, the consolidated data is a set of data arranged, for example, in a list or an array or in any desired manner.

In some examples, multi-modal sensor fusion (undertaken by the example sensor data fusion circuitry 426) is performed before the sensed data is used for machine learning. In some examples, the multi-modal sensor fusion operations can be integrated into the active learning machine learning quality learning circuitry 414. In some examples, fusion of the sensed sense data is performed immediately or soon after data capture occurs. Any number of data fusion techniques can be employed including ones that use an extended Kalman filter (EKF), ones that use a support vector machine (SVM), etc. In addition, fusion can be performed on either the sensed data and/or the feature data that has been extracted from the sensed data.

In some examples, the example quality inference circuitry 416 makes quality inferences based on the extracted, consolidated features output by the example quality learning circuitry 414. In some examples, the quality inference circuitry 416 applies logical rules to the set of consolidated data features supplied by the example quality learning circuitry 414. The logical rules are applied to evaluate and analyze the consolidated set of feature data to determine whether a consolidated set of feature data agrees with consolidated sets of feature data analyzed previously. In some examples, a current set of consolidated feature data may be within a threshold value of a consolidated set of feature data that was previously analyzed. In some examples, when the consolidated sets of feature data analyzed previously are similar to the current consolidated set of feature data, the quality inference circuitry 416 can infer that the current consolidated set of feature data is similar in quality to the previously analyzed consolidates sets of data/features. In some examples, the quality learning circuitry 414 and the quality inference circuitry 416 can be implemented using a discriminator model machine learning model/algorithm that accesses a database of non-faulty data sets to compare a current consolidated set of feature data with stored consolidated sets of feature data and any quality scores corresponding thereto. Based on the comparison, the quality inference circuitry 416 assigns a quality score to the current consolidated feature set. In some examples, the quality inference circuitry 416 uses the consolidated set of feature data and associated labels to determine a quality score.

In some examples, the quality score is generated by processing 1) the consolidated set of feature data, 2) information from the database of non-faulty data sets, 3) predictive maintenance data, 4) telemetry data, 5) error correction checking data, 6) transmission error data, 7) cross-correlation data, etc., using a discriminator model implemented using machine learning. In some examples, the discriminator model is implemented using a DISTILL FUNCTION (e.g., DISTILL_FUNC). As described, in some such examples, the DISTILL FUNCTION operates on predictive maintenance information, hardware level and/or software block level and/or platform level error correction code (ECC) telemetry data collected from one or more registers or other sources of the processor circuitry of the example autonomous agents 104, 106, 108, 110, node level ECC Check with TEE data (where the "node" represents any of the example autonomous agents 104, 106, 108, 110, network transmission errors using a time sensitive network (TSN), data corresponding to cross-correlations with peer nodes (e.g., peer autonomous agents 104, 106, 108, 110), etc., and/or any combination thereof. In some such examples, the distill function can be represented by the equation below (e.g., EQN 1).

EQN. 1: Quality=DISTILL_FUNC (Predictive Maintenance, IP & Platform Level ECC Telemetry, Node Level ECC Check with TEE, Network Transmission Errors using TSN, and Cross Correlation with peer nodes)

In some examples, the IP and Platform level ECC telemetry is collected from the example telemetry data platform that supports ingestion of all data types including metrics, events, logs and traces. In some examples, the telemetry data platform collects the identified data by monitoring the utilization of a device(s) on-board the autonomous agent 104, 106, 108, 110, (CPU, memory, disk space, bandwidth, etc.) and/or monitoring the performance of individual applications and the execution of tasks within (or by) any of the devices. The telemetry data platform can also collect data related to (e.g., monitor for) device failure (e.g., information indicating that any of the devices/circuitry of the edge-based QAE circuitry 102 or the agent data processing TEE circuitry 104A, 106A, 108A, 110A, etc. have failed).

The DISTILL function operates to compute a 'quality' score using existing information (e.g., previously collected data/features and/or training data/features) from a multivariate time series function incorporating predictive maintenance functionality, error check at the node/autonomous agent level, data transmission error through network [e.g.: by using info from Time Sensitive Networking (TSN)], a correlation score(s) computed in the presence of other autonomous agents in the environment/scenario. The score output by "DISTILL_FUNC" can be a probability (between 0 and 1) thereby qualifying the data. For example, low output values/scores could signify (e.g.: 0.1 or 0.15 or 0.17) that the data collected by the current sensors and in the current scenarios may yield results having poor accuracy (for the given scenario, environment and dynamics). In contrast, high values/scores could signify (e.g.: 0.75 or 0.82 or 0.91) that the data collected by the current sensors operating in the existing/current scenario are likely to yield a highly accurate result and can be used for further analysis in terms of identifying anomaly detection in the system/environment, and/or enacting or more actuators associated with the autonomous agents 104, 106, 108, 110. Scores having a value in the middle (e.g., approximately 0.5 or between 0.4 and 0.6) indicate the corresponding data collected by the current sensors in the current scenario/context is behaving ambiguously such that additional data-points will be used to further analyze the score. Thus, the scores generated by the DISTILL function, for example, significantly reduce the time needed to react to incoming data such that the example autonomous agents 104 106, 108, 100 can react to changing situations/scenarios in real-time or nearly real-time. This ability to learn the quality of collected data over time in the presence of changing environments significantly aids in accurately 'predicting' when (and whether) anomalies will occur or when undesired consequences might occur (e.g., in response to particular actions taken by the autonomous agents), thereby allowing 'pro-active' steps to be taken to prevent such anomalies and/or consequences from occurring.

In some examples, the predictive maintenance information is generated by the ensemble learning circuitry 406 of FIG. 4 and/or using OEM supplied information. In some examples, the Node Level ECC Check with TEE includes data collected from secure environments (trusted execution environments (TEEs)) in the autonomous agents 104, 106, 108, 110 (e.g., the agent data processing TEEs 104A, 106A, 108A, 110A). In some examples, the Network Transmission Errors are collected by monitoring network transmissions on a time sensitive network TSN. Such Network transmission errors can identify a time at which an error occurred, a portion of the network on which the error occurred, etc. In some examples, network transmission errors are collected from error monitoring circuitry common to processing circuitry such as that illustrated in the autonomous agents 104, 106, 108, 110. In some examples, cross correlation between peer nodes can be detected based on how well two or more sets of time series data collected from different ones of the autonomous agents 104, 106, 108, 110 match up and can include a time corresponding to the best match between the time series data. In some examples, data to be cross correlated is generated at one or more of the autonomous agents 104, 106, 108, 110 and/or shared therebetween such that one or more of the autonomous agents 104, 106, 108, 110 can determine cross-correlations between corresponding one of the data sets. In some examples, data to be analyzed to identify how well time-series data sets match is generated at one or more of the autonomous agents 104, 106, 108, 110 and supplied to the edge-based QAE circuitry 102. The edge-based QAE circuitry 102 can then analyze the data to determine whether any of the data sets match well when evaluated using cross-correlation.

Both large-scale machine learning and deep learning models are increasingly common, provide state-of the-art performance, yet can be difficult to operate on edge devices as such models are typically quite large and can require a lot of processing power. Further, data science modeling typically includes training a single large model or an ensemble of different models. However, such models are often trained with a set of data that is different than the data used to test the model. Such training and testing data sets being different, the models trained and tested thereon are often poor representatives of real-world data and systems. For examples, such models, though they tend to be accurate on the validation (testing) data set, fail to perform as well when attempting to predict behavior, meet performance and/or latency requirements, etc., associated with a real world application.

The DISTILL function helps to overcome the above-identified issues with machine learning, by capturing knowledge in a complex machine learning model or an ensemble of models and distilling the large model into a smaller single model. A smaller single model is typically easier to operate due to its smaller size and often performs quite well. Thus, the DISTILL function provides good modeling performance even in the limited processing capacity and limited memory capacity of the autonomous agents 104, 106, 108, 110, and/or in the edge-based QAE circuitry 102 (see FIG. 1). In some examples, generating a DISTILL function based on the DISTILL operands identified above results in a quality score for a set of sensed data being analyzed. Thus, the data quality score takes into consideration not only whether sensed data sets are cross correlated but also whether the sensed data may have been adversely impacted by the issues identified using telemetry data, transmission error data, error correction checking data, predictive maintenance data, and/or any other type of data.

In some examples, the example relevance compute circuitry 418 determines a relevance value/score for each of the data features. In some such examples, the relevance compute circuitry 418 analyzes a set of consolidated data feature sets supplied by the quality calculator circuitry 412. The relevance compute circuitry 418 can be implemented using a deep learning algorithm on a neural network. The relevance compute circuitry 418 generates weights to be assigned to different types of the feature data. In some examples, higher weights are assigned to feature data of high importance and lower weights are assigned to feature data of lower importance. The weights are supplied to the example anomaly detector 408 that uses the weights to determine whether a current set of sensor data corresponding to the current set of feature data is anomalous. In some examples, feature data assigned larger weights have a greater impact on whether the corresponding sensor data will be determined to be anomalous. In contrast, feature data assigned smaller weights have a lesser impact on whether the corresponding sensor data will be determined to be anomalous.

In some examples, the example relevance compute circuitry 418 uses both quality data associated with the consolidated set of data features as well as a context in which the corresponding one of the autonomous agents (e.g., any of the example autonomous agents 104, 106, 108, 100) is/was operating when the sensor data used to generate the consolidated set of data features was collected. For example, if sensor data corresponds to image data and the time of day at which the image data was collected corresponds to a time when lighting conditions were poor (e.g., after sundown, at a time when it was raining or cloudy (e.g., the context), the image data may have been assigned a low quality score. However, the low quality score may be indicative of the poor lighting conditions instead of a poorly operating image sensor. In some such examples, the relevance compute circuitry 418 may assign the corresponding data a low relevance weight so that the corresponding sensor data, despite having a low quality score, does not have undue influence on the determination as to whether the corresponding sensor data is anomalous. Likewise, if sensed image data is assigned a low quality score but is not associated with poor lighting conditions, the relevance compute circuitry 418 may want to emphasize the impact of the low quality image data on the determination as to whether the image data represents an anomaly. In some examples, when the quality learning circuitry 414 processes a sufficient quantity of image sensor data corresponding to different times of day, different weather conditions, etc. the quality learning circuitry 414 and/or the quality inference circuitry 416 can learn to ignore or disregard processing of image sensor data collected in such contexts. As described above, context extraction operations can be performed as part of the data fusion processor or can be performed after sensor data fusion is performed.

Referring still to FIG. 4, in some examples, the example relevance compute circuitry 418 supplies the quality scores generated for a current consolidated set of feature data, context information for the current consolidated set of feature data, and, perhaps, corresponding weight information to the example reputation score circuitry 420. In some examples, the reputation score circuitry 420 uses the supplied information to generate a reputation score for the current data feature set. In some examples, the reputation score circuitry 420 determines whether similar data feature sets corresponding to similar contexts have been previously processed by the example quality assessor circuitry 411. In some examples, the previously processed data feature sets and/or data sets and corresponding quality values are stored in the reputation score storage circuitry 421. In some examples, the When, for example, a sufficient number of similar data feature sets corresponding to similar contexts have been previously processed, and such similar sets have previously been assigned similar or even identical quality scores, the reputation score circuitry 420 can increase a reputation score associated with the current set of feature data. When an insufficient number of similar data features sets corresponding to similar contexts have been previously processed, the reputation score circuitry 420 can leave a current reputation score unchanged or assign a low reputation score. In contrast, when a sufficient number of similar data features sets corresponding to similar contexts have been previously processed and assigned quality scores different than a quality score assigned to a current data feature set, the reputation score circuitry 420 can lower a reputation score associated with the current data feature set. In this way, the reputation score implies a level of confidence in the quality score assigned to the data.

The example decision circuitry 422 determines whether the current data set is to be flagged as unusable due to lack of quality, due to anomalies associated with the current sensed data and/or due to a reputation score assigned to the current data set. In some such examples, the example action circuitry 424 will not use the current set of flagged sensed data set to take any actions but will instead wait until another set of data that is not flagged arrives. In some examples, the example selector circuitry 422A of the example decision circuitry 422 will select the current data set for evaluation at the example active learning feedback circuitry 428. In some such examples, unusable refers to the sensor data being unsuitable for usage in making decisions regarding the taking (or not) of one or more actions, and the causing (or not) of one or more events, etc. In some examples, the selector circuitry 422A can operate randomly or can use any desired selection strategy.

When a selection is made, a corresponding current consolidated set of feature data is selected and supplied to the example active learning feedback circuitry 428 (via, for example, the first connector A). In some examples, the example anomaly detector circuitry 408 provides detected anomaly information (if any) to the example active learning feedback circuitry 428 (via, for example, the second connector B). In some examples, the reputation score storage circuitry 421 is also accessible to the example active learning feedback circuitry 428 (via, for example, the third connector C). In some examples, output information generated at the active learning feedback circuitry 428 is supplied to the active learning feedback circuitry 428 (via, for example, a fourth connector D). In some examples, output information generated at the active learning feedback circuitry 428 is supplied to the example data collection database storage circuitry 402 (via, for example, a fifth connector E). In some examples, the active learning feedback circuitry 428 has access to the output of the example quality calculator circuitry 416 (via, for example, a sixth connector F). In some examples, as described herein, the active learning feedback circuitry 428 evaluates the operation of the autonomous agent(s) 104, 106, 108, 110 using the information supplied via any of the first, second, third and fourth connectors A, B, C, D. In some examples, the evaluation output is supplied by the active learning feedback circuitry 428 to the example data collection database storage circuitry 402. The evaluation output can include a reputation score, a data quality score, a context and/or any other information relevant to a set of data/features being evaluated. The evaluation output thereby accelerates the speed at which the machine learning algorithms/models disclosed herein learn the behavior of the autonomous agent(s) 104, 106, 108, 110 and improves the accuracy of the data quality scores generated by the disclosed machine learning algorithms/models.

In some examples, the DQA circuitry 308 uses the reputation score to weight or otherwise affect (raise or lower) the importance to be assigned to future sensed data (incoming data) depending on similarities between the future sensed data and previously processed data. In some such examples, when future sensed data is determined to have a high reputation score based on previously sensed and quality evaluated data, such future data need not be processed as the same quality score assigned to the similar previously evaluated data sets can be used. In some such examples, when such a future sensed data is identified, the reputation score may be assigned a value high enough such that the decision circuitry 422 allows usage of the current set of sensed data and the anomaly and quality analyses of the data set need not be performed.

In some examples, the reputation score is used to assist in the training of the discriminator model that generates the data quality scores. In some examples, advanced learning is used to build or otherwise validate reputation scores, In some such examples, the quality score calculated for a consolidated set of feature data can be supplied to a query generator. The query generator uses the quality score and accompanying label information to generate a query strategy. The accompanying label information can include any type of information such as information identifying the feature data set, information about the corresponding sensors, information about the context, etc.). The query strategy identifies labels/categories of data to be searched. The query strategy searches for labels/categories of data sets that are similar to the data set associated with the most recently generated quality score. In some such examples, the query is performed on a database (e.g., database storage circuitry 204, data collection database storage circuitry 402, the reputation score storage circuitry 421, etc.) containing the sensor data and/or the data features (and any accompanying reputation scores, quality scores, labels, tags, context information, etc.) to generate a collection of data sets. The collection of data sets is examined by humans with expertise in data quality analyses and compared to the most recently generated quality score and the most recently processed set of sensor quality data. In some examples, the humans/experts can determine that there is sufficient alignment between the quality score generated for the current data set and quality scores generated for previously processed data sets such that the reputation score of the current data set can be increased. Such an alignment indicates the data is similar enough to previously collected data and can, therefore, be considered reputable. If instead, there is insufficient alignment or there are an insufficient set of previously processed data sets that are similar to the current data set, the humans/experts may assign a low reputation score or leave an existing reputation score unchanged. As expressed above, in some examples, when a new data set is identified in a pre-processing stage to be associated with a high reputation score, the quality and anomaly analyses can be bypassed. The ability to bypass such processing results in a significant level of energy savings and compute cycle reduction.

One or more of the example data collection database storage circuitry 402, the example user interface 404, example telemetry data platform circuitry 405, the example ensemble learning circuitry 406 (including the N machine learning algorithms (406A, 406B, . . . 406N), the example anomaly detector circuitry 408, the example anomaly database storage circuitry 410, the example quality assessor circuitry 411 including the example quality calculator circuitry 412, the example quality learning circuitry 414, the example quality inference generating circuitry 416, and the example relevance compute module circuitry 418, the example reputation score 420, the example reputation score storage circuitry 421, the example decision module 422, the example selector circuitry 422A, the example action circuitry 424 and the example sensor data fusion circuitry 426 of the example block diagram 400 of FIG. 4 may be instantiated (e.g., create an instance of, bring into being for any length of time, materialize, implement, etc.) by processor circuitry such as a central processing unit executing instructions. Additionally or alternatively, one or more of the data collection database storage circuitry 402, the user interface 404, the telemetry data platform circuitry 405, the ensemble learning circuitry 406 (including the N machine learning algorithms (406A, 406B, . . . 406N), the anomaly detector circuitry 408, the anomaly database storage circuitry 410, the quality assessor circuitry 411 (including the quality calculator circuitry 412, the quality learning circuitry 414, the quality inference generating circuitry 416, and the relevance compute module circuitry 418), the reputation score 420, the reputation score storage circuitry 421, the decision module 422, the example selector circuitry 422A, the action circuitry 424, and the example sensor data fusion circuitry 426 may be instantiated (e.g., create an instance of, bring into being for any length of time, materialize, implement, etc.) by an ASIC or an FPGA structured to perform operations corresponding to the instructions. It should be understood that one or more of the data collection database storage circuitry 402, the user interface 404, the example telemetry data platform circuitry 405, the ensemble learning circuitry 406 (including the N machine learning algorithms (406A, 406B, . . . 406N), the anomaly detector circuitry 408, the anomaly database storage circuitry 410, the example quality assessor circuitry 411 (including the quality calculator circuitry 412, the quality learning circuitry 414, the quality inference generating circuitry 416, and the relevance compute module circuitry 418), the reputation score 420, the reputation score storage circuitry 421, the decision module 422, the selector circuitry 422A, the action circuitry 424, and the example sensor data fusion circuitry 426 may, thus, be instantiated at the same or different times. Some or all of the data collection database storage circuitry 402, the user interface 404, the example telemetry data platform circuitry 405, the ensemble learning circuitry 406 (including the N machine learning algorithms (the model 1 406A, the model 2 406B, . . . the model N 406N), the anomaly detector circuitry 408, the anomaly database storage circuitry 410, the quality assessor circuitry 411 (including the quality calculator circuitry 412, the quality learning circuitry 414, the quality inference generating circuitry 416, and the relevance compute module circuitry 418), the reputation score 420, the reputation score storage circuitry 421, the decision module 422, the selector circuitry 422A, the action circuitry 424, and the example sensor data fusion circuitry 426 may be instantiated, for example, in one or more threads executing concurrently on hardware and/or in series on hardware. Moreover, in some examples, some or all of the data collection database storage circuitry 402, the user interface 404, the telemetry data platform circuitry 405, the ensemble learning circuitry 406 (including the N machine learning algorithms (the model 1 406A, the model 2 406B, . . . the model N 406N), the anomaly detector circuitry 408, the anomaly database storage circuitry 410, the quality assessor circuitry 411 (including the quality calculator circuitry 412, the quality learning circuitry 414, the quality inference generating circuitry 416, and the relevance compute module circuitry 418), the reputation score 420, the reputation score storage circuitry 421, the decision module 422, the selector circuitry 422A, the action circuitry 424, and the example sensor data fusion circuitry 426 may be implemented by microprocessor circuitry executing instructions to implement one or more virtual machines and/or containers.

In some examples, one or more of the example data collection database storage circuitry 402, the example user interface 404, the example telemetry data platform circuitry 405, the example ensemble learning circuitry 406 (including the N example machine learning algorithms (406A, 406B, . . . 406N), the example anomaly detector circuitry 408, the example anomaly database storage circuitry 410, the example quality assessor circuitry 411 (including the example quality calculator circuitry 412, the example quality learning circuitry 414, the example quality inference generating circuitry 416, and the example relevance compute module circuitry 418), the example reputation score 420, the example reputation score storage circuitry 421, the example decision module 422, the selector circuitry 422A, the example action circuitry 424, and the example sensor data fusion circuitry 426 are instantiated by processor circuitry executing agent data processing instructions and/or configured to perform operations such as those represented by the flowcharts of FIGS. 6, 7 and 8.

In some examples, the example edge-based data QAE 102 of FIGS. 1 and 3 and/or the autonomous agents 104, 106, 108, 110 of FIGS. 1 and 2 includes one or more of means for storing collected/sensed data, means for interfacing with a user, means for collecting telemetry data, means for learning characteristics of a data set, means for detecting data set anomalies, means for storing data anomaly information, means for assessing data quality, means for generating a reputation score, means for storing reputation score information, means for deciding data usage, means for acting (or not), and means for fusing sensor data. In some examples, the means for assessing data quality includes means for calculating a data quality score, and means for determining data relevance. In some examples, the means for calculating a data quality score includes means for discriminating between data of different quality levels and means for inferring a quality score.

In some examples, the means for storing collected/sensed data is implemented by the data collection database storage circuitry 402 of FIG. 4. In some examples, the means for interfacing with a user is implemented by the example user interface 404. In some examples, the means for collecting telemetry data is implemented by the example telemetry data platform circuitry 405. In some examples, the means for learning characteristics of a data set is implemented by the example ensemble learning circuitry 406 using the N example machine learning algorithms (406A, 406B, . . . 406N). In some examples, the means for detecting data set anomalies is implemented by the example anomaly detector circuitry 408. In some examples, the means for storing data anomaly information is implemented by the example anomaly database storage circuitry 410. In some examples, the means for assessing data quality is implemented by the example quality assessor circuitry 411. In some examples, the means for generating a reputation score is implemented by the example reputation score 420. In some examples, the means for storing reputation score information is implemented by the example reputation score storage circuitry 421. In some examples, the means for deciding data usage is implemented by the example decision module 422. In some examples, the means for fusing sensor data is implemented by the example sensor data fusion circuitry 426, and the means for acting (or not) is implemented by the example action circuitry 424.

In some examples, the means for calculating a data quality score is implemented by the example quality calculator circuitry 412. In some examples, the means for discriminating between data of different quality levels is implemented by the example quality learning circuitry 414. In some examples, the means for inferring a quality score is implemented by the example quality inference generating circuitry 416. In some examples, the means for determining data relevance is implemented by the example relevance compute module circuitry 418.

Figure 11:
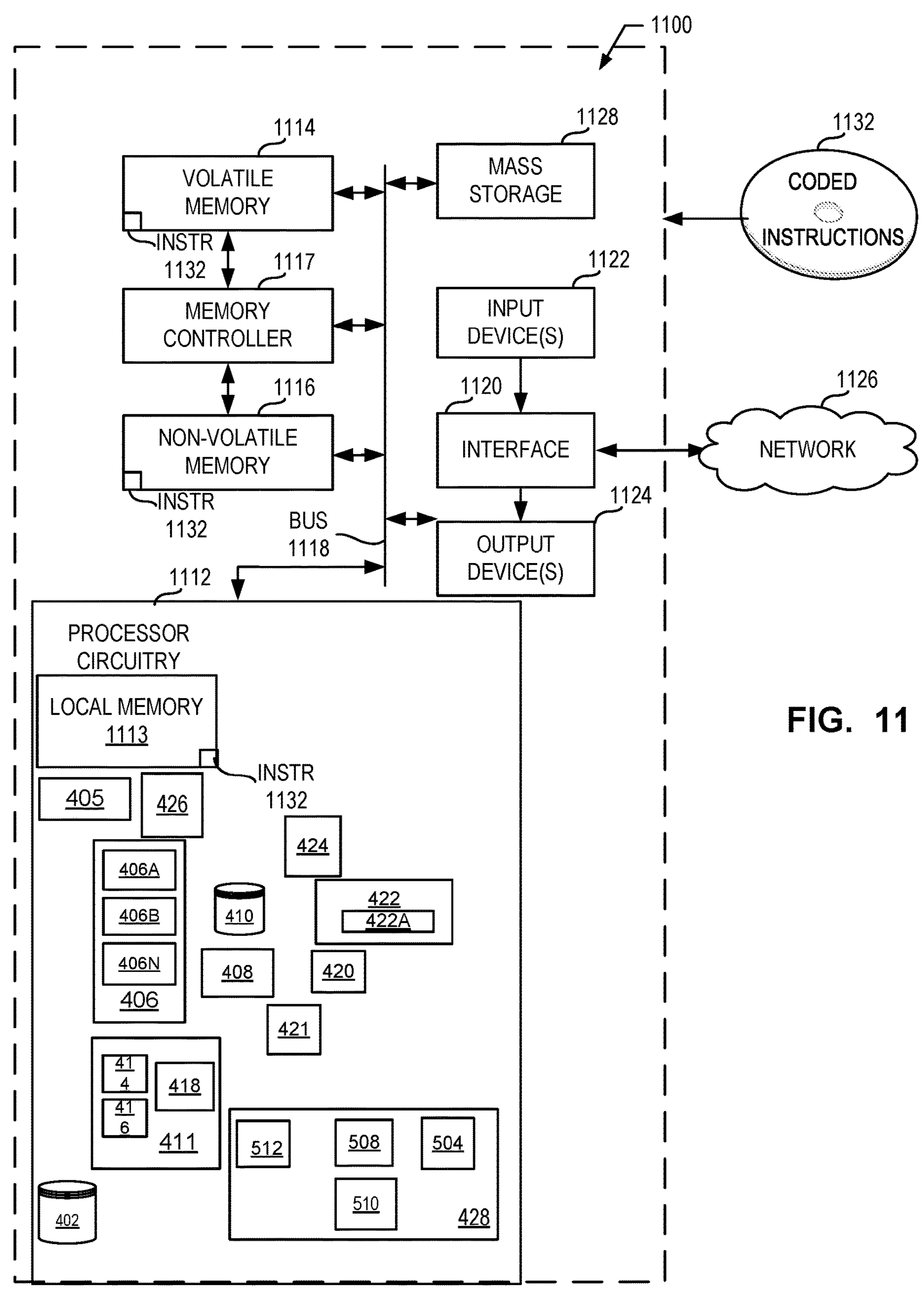
FIG. 11 is a block diagram of an example processing platform including processor circuitry structured to execute the example machine readable instructions and/or the example operations of FIGS. 6, 7, and 8 to implement the example circuitry of FIG. 4 and FIG. 5, which can implement the edge-based quality analytics engine 102 of FIGS. 1 and 3, or the autonomous agents of FIGS. 1 and 3.

In some examples, one or more of the example data collection database storage circuitry 402, the example user interface 404, the example telemetry data platform circuitry 405, the example ensemble learning circuitry 406 (including the N example machine learning algorithms (the model 1 406A, the model 2 406B, . . . the model N 406N), the example anomaly detector circuitry 408, the example anomaly database storage circuitry 410, the example quality assessor circuitry 411 (including the example quality calculator circuitry 412, the example quality learning circuitry 414, the example quality inference generating circuitry 416, and the example relevance compute module circuitry 418), the example reputation score 420, the example reputation score storage circuitry 421, the example decision module 422, the example selector circuitry 422A, the example action circuitry 424, and the example sensor data fusion circuitry 426 included in either or both of the example edge-based QAE 102 of FIGS. 1 and 3 and the example autonomous agents 104, 106, 108, 110 of FIGS. 1 and 2 may be instantiated by processor circuitry such as the example processor circuitry 1112 of FIG. 11. For instance, one or more of the data collection database storage circuitry 402, the user interface 404, the telemetry data platform circuitry 405, the ensemble learning circuitry 406 (including the N machine learning algorithms (406A, 406B, . . . 406N), the anomaly detector circuitry 408, the anomaly database storage circuitry 410, the quality assessor circuitry 411 (including the quality calculator circuitry 412, the quality learning circuitry 414, the quality inference generating circuitry 416, and the relevance compute module circuitry 418), the reputation score 420, the reputation score storage circuitry 421, the decision module 422, the selector circuitry 422A, the action circuitry 424, and the sensor data fusion circuitry 426 may be instantiated by the example microprocessor 1200 of FIG. 12 executing machine executable instructions such as those implemented by at least some of the blocks of FIGS. 6, 7, and 8.

In some examples, one or more of the example data collection database storage circuitry 402, the example user interface 404, the example telemetry data platform circuitry 405, the example ensemble learning circuitry 406 (including the N example machine learning algorithms (406A, 406B, . . . 406N), the example anomaly detector circuitry 408, the example anomaly database storage circuitry 410, the example quality assessor circuitry 411 (including the example quality calculator circuitry 412, the example quality learning circuitry 414, the example quality inference generating circuitry 416, and the example relevance compute module circuitry 418), the example reputation score 420, the example reputation score storage circuitry 421, the example decision module 422, the selector circuitry 422A, the example action circuitry 424, and the sensor data fusion circuitry 426 may be instantiated by hardware logic circuitry, which may be implemented by an ASIC, XPU, or the FPGA circuitry 1300 of FIG. 13 structured to perform operations corresponding to the machine readable instructions. Additionally or alternatively, one or more of the data collection database storage circuitry 402, the user interface 404, the telemetry data platform circuitry 405, the ensemble learning circuitry 406 (including the N machine learning algorithms (the model 1 406A, the model 2 406B, . . . the model N 406N), the anomaly detector circuitry 408, the anomaly database storage circuitry 410, the quality assessor circuitry 411 (including the quality calculator circuitry 412, the quality learning circuitry 414, the quality inference generating circuitry 416, and the relevance compute module circuitry 418), the reputation score 420, the reputation score storage circuitry 421, the decision module 422, the selector circuitry 422A, the action circuitry 424, and the sensor data fusion circuitry 426 may be instantiated be by any other combination of hardware, software, and/or firmware. For example, one or more of the data collection database storage circuitry 402, the user interface 404, the telemetry data platform circuitry 405, the ensemble learning circuitry 406 (including the N machine learning algorithms (the model 1 406A, the model 2 406B, . . . the model N 406N), the anomaly detector circuitry 408, the anomaly database storage circuitry 410, the quality assessor circuitry 411 (including the quality calculator circuitry 412, the quality learning circuitry 414, the quality inference generating circuitry 416, and the relevance compute module circuitry 418), the reputation score 420, the reputation score storage circuitry 421, the decision module 422, the selector circuitry 422A, the action circuitry 424, and the sensor data fusion circuitry 426 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 5:
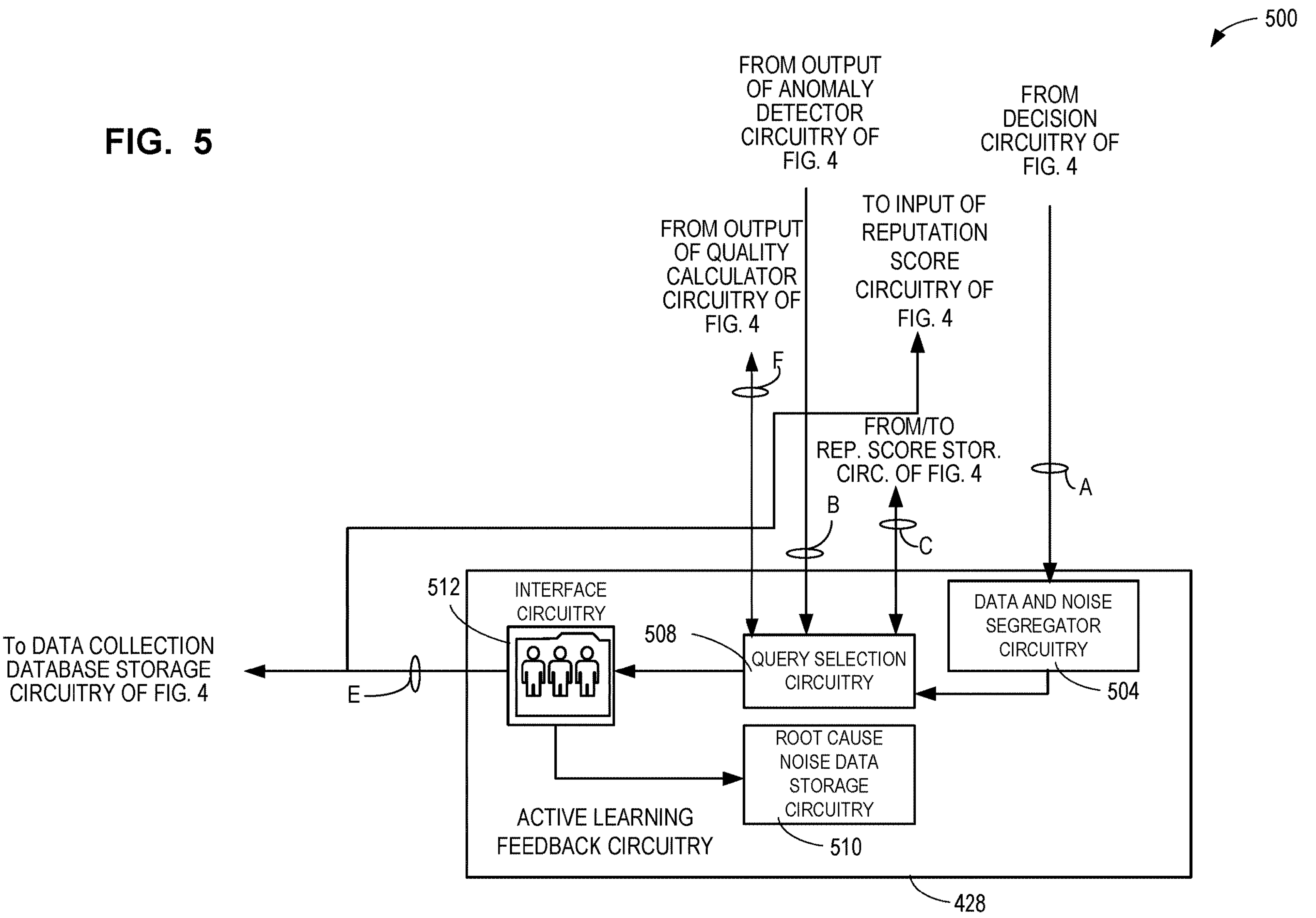
FIG. 5 is a block diagram of an active learning feedback circuitry included in the data quality and learning system of FIG. 4.

FIG. 5 is a block diagram 500 of the example active learning feedback circuitry 428 included into the anomaly detection and quality score generating circuitry described in connection with FIG. 4. In some examples, the active learning feedback loop circuitry 428 is included in either or both of the example edge-based QAE 102 of FIGS. 1 and 3 and the example autonomous agents 104, 106, 108, 110 of FIGS. 1 and 2. In some examples, the active learning feedback circuitry 428 includes an example data and noise segregator circuitry 504, an example query selection circuitry 508, an example root cause noise data storage circuitry 510 for information that identifies or can be used to identify a root cause of problematic data, and an example interface circuitry 512. In some examples, the decision circuitry 422, as described with reference to FIG. 4 determines, based on anomaly and reputation data of a current consolidated set of data/feature(s), whether a corresponding set of data/features should be flagged as unusable. In some such examples, unusable refers to the sensor data being unsuitable for usage in making decisions regarding the taking (or not) of one or more actions, and the causing (or not) of one or more events, etc. As also described with reference to FIG. 4, the decision circuitry 422 includes an example selector circuitry 422A. The selector circuitry 422A selects information upon which a current decision is being generated for further analysis. In some examples, the selector circuitry 422A can operate randomly or can use any desired selection strategy.

When a selection is made, a corresponding current consolidated set of feature data is selected and supplied to the example data and noise segregator circuitry 504 of the example active learning feedback circuitry 428. In some examples, the data and noise segregator circuitry 504 which uses any number of noise segregation techniques to identify which, if any, of the current consolidated set of data/features represents noise and which represents the data/signal (e.g., the information collected by a corresponding one of the sensors). In this context, noise is not meant to be narrowly interpreted to be a corrupted part of a data/signal that can be ignored. Instead noise can represent any information not determinable as simple data/signal. In some examples, the noise can provide valuable insight about the operation of the system(s) (e.g., any, some or all of the autonomous agents 104, 106, 108, 110 of FIG. 1) from which the sensor data is/was collected. In some examples, the data and noise segregator circuitry 504 supplies the segregated noise and/or the segregated data to the query selector circuitry 508.

In addition, the query selector circuitry 508 receives information identifying detected anomalies from the anomaly detector 408 (of FIG. 4) and receives data quality inference/data quality scores from the example quality calculator 412 and also can access reputation scores held in the reputation score storage circuitry 421 of FIG. 4. The query selector circuitry 508 examines the segregated noise and/or data and any accompanying information (e.g., information included in labels associated with the current consolidated set of feature data, information included in labels associated with the sensor data itself, etc.) as well as a corresponding reputation score (if any). The query selector circuitry 508 generates a query based on the noise and/or data, the detected anomaly information (if any), the example reputation score (if any) and/or any additional information identified from sensor data labels. The query is used to retrieve previously collected consolidated sets of feature data. The results of the query are supplied to the human interface circuitry 512 at which one or more humans/experts can view the data and associated information to identify context information associated with the query results. In some examples, the human/expert upon reviewing the query results can generate one or more labels and cause the labels to be attached to any of the sensed data and/or the feature data. In some examples, the humans/experts can generate and attach labels indicating that any "noise" in the feature data is due to one or more expected causes/reasons.

The labeled data is then supplied by the example interface circuitry 512 to the example data collection database storage circuitry 402 (see FIG. 4). In some examples, the labeled data can additionally be supplied by the example active learning feedback circuitry 428 to the example quality calculator circuitry 412 of FIG. 4. In this way, the labeled data can be used by the quality learning circuitry 414 to learn about the noise in the system and to either ignore or treat the labeled data as expected (e.g., not faulty, associated with normal operation). In this manner, training of the example quality learning circuitry 414 and the example quality inference generating circuitry 416 is accelerated and accuracy of the data quality scores generated by the example quality calculator circuitry 412 is improved.

In some examples, the humans/operators may determine, based on review, that the current consolidated set of data features are not due to normal operating conditions or the context associated with the current consolidated set of feature data. In some such examples, the human/operator may use the example interface circuitry 512 to label the current consolidated set of feature data and/or any associated sensor data as unusable or problematic and can use the interface circuitry 512 to alert other devices/circuitry of the QAE circuitry engine 102 and/or corresponding ones of any of the autonomous agents 104, 106, 108, 110 to halt usage of (or data collection by) one or more of the sensors (e.g., any of the sensors included in the sets of sensors 104B, 106B, 108B, 110B) until a root cause of the generation of the unusable data is determined and corrected. In some such examples, the corresponding data and related information is stored in the root cause noise data storage circuitry 510 for use in determining a root cause at a later time.

As described above in connection with the reputation score circuitry 216 of FIG. 2, in some examples, the example data and noise segregation circuitry 504 determines a signal to noise ratio and/or segregates the signal "data" from the signal "noise" using both the sensed signal information and the data quality score assigned thereto. In some such examples, after the data is sensed and the data quality score is determined/computed, the signal to noise ratio is determined (and/or the data and noise are segregated). In some examples, the signal to noise ratio can be determined when an anomaly has been detected thereby indicating that some form of "noise" may be responsible for the anomaly or otherwise associated with the anomaly. Unlike many technologies in which data determined to be noisy (e.g., determined to have noise included in the same signal) is discarded and/or dropped from further evaluation, the example query selection circuitry 508 can use the so-called "noisy" spatiotemporal data-points to intelligently 'learn,' based on, for example, a context in which the spatiotemporal data-points are collected. In some such examples, the query selection circuitry 508 can query for sets of data/features that are similar in terms of their values and/or were collected under very similar circumstances/contexts. As the definition of noise can be different for data collected by the same sensors but across different applications/scenarios/contexts, the temporal aspects (which can take into consideration the contextual/circumstantial information) can be evaluated to determine how to qualify the noise for corresponding data-points changes. For instance and as described above, in some example contexts, noise may be expected due to current environmental conditions and, therefore useable by the autonomous agent when determining whether one or more actions are to be taken (as described further below) and would thereby be deemed to have good reputation. In other example contexts, noise may be unexpected and would thereby be deemed to be of poor quality or as having a poor reputation. In some such examples, the data quality and/or reputation are assessed as being problematic and, unusable by the autonomous agent. Thus, the so-called noise may be qualified as differently (e.g., as positive (expected), negative (unexpected), neutral, etc.) in different circumstances/contexts.

In some examples, the example active learning feedback circuitry 428 (including the example data and noise segregator circuitry 504, the example query selector circuitry 508, the example root cause noise data storage circuitry 510 and the example interface circuitry 512) of FIG. 5 may be instantiated (e.g., create an instance of, bring into being for any length of time, materialize, implement, etc.) by processor circuitry such as a central processing unit executing instructions. Additionally or alternatively, the active learning feedback circuitry 428 (including the example data and noise segregator circuitry 504, the example query selector circuitry 508, the example root cause noise data storage circuitry 510 and the example interface circuitry 512) of FIG. 5 may be instantiated (e.g., create an instance of, bring into being for any length of time, materialize, implement, etc.) by an ASIC or an FPGA structured to perform operations corresponding to the instructions. It should be understood that one or more of the active learning feedback circuitry 428 (including the example data and noise segregator circuitry 504, the example query selector circuitry 508, the example root cause noise data storage circuitry 510 and the example interface circuitry 512) of FIG. 5 may be instantiated, for example, in one or more threads executing concurrently on hardware and/or in series on hardware. Moreover, in some examples, some or all of the active learning feedback circuitry 428 (including the data and noise segregator circuitry 504, the query selector circuitry 508, the root cause noise data storage circuitry 510 and the interface circuitry 512) of FIG. 5 may be implemented by microprocessor circuitry executing instructions to implement one or more virtual machines and/or containers.

In some examples, one or more of the example active learning feedback circuitry 428 (including the example data and noise segregator circuitry 504, the example query selector circuitry 508, the example root cause noise data storage circuitry 510 and the example interface circuitry 512) of FIG. 5 are instantiated by processor circuitry executing agent data processing instructions and/or configured to perform operations such as those represented by the flowcharts of FIGS. 6, 7 and 8.

In some examples, the example active learning feedback circuitry 428 of FIG. 4 and FIG. 5 includes one or more of a means for a means for segregating, means for selecting a query, a means for storing root cause noise data and means for interfacing. In some examples, the example means for segregating is implemented by the example data and noise segregator circuitry 504, the example means for selecting a query is implemented by the example query selector circuitry 508, the example means for storing root cause noise data is implemented by the example root cause noise data storage circuitry 510 and the means for interfacing is implemented by the example interface circuitry 512.

In some examples, the example active learning feedback circuitry 428 (including the example data and noise segregator circuitry 504, the example query selector circuitry 508, the example root cause noise data storage circuitry 510 and the example interface circuitry 512) of FIG. 5 may be instantiated by processor circuitry such as the example processor circuitry 1112 of FIG. 11. For instance, one or more of the example data and noise segregator circuitry 504, the example query selector circuitry 508, the example root cause noise data storage circuitry 510 and the example interface circuitry 512 of FIG. 5 may be instantiated by the example microprocessor 1200 of FIG. 12 executing machine executable instructions such as those implemented by at least some of the blocks of FIGS. 6, 7, and 8.

In some examples, the example active learning feedback circuitry 428 or one or more of the example data and noise segregator circuitry 504, the example query selector circuitry 508, the example root cause noise data storage circuitry 510 and the example interface circuitry 512 of FIG. 5 may be instantiated by hardware logic circuitry, which may be implemented by an ASIC, XPU, or the FPGA circuitry 1300 of FIG. 13 structured to perform operations corresponding to the machine readable instructions. Additionally or alternatively, the active learning feedback circuitry 428 and/or one or more of the data and noise segregator circuitry 504, the query selector circuitry 508, the root cause noise data storage circuitry 510 and the interface circuitry 512 of FIG. 5 may be instantiated by any other combination of hardware, software, and/or firmware. For example, the example active learning feedback circuitry 428 and/or one or more of the example data and noise segregator circuitry 504, the example query selector circuitry 508, the example root cause noise data storage circuitry 510 and the example interface circuitry 512 of FIG. 5 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the system architecture 100 (e.g., the example edge-based QAE circuitry 102, and the example autonomous agents 104, 106, 108, 110 having example agent data processing TEE circuitry 104A, 106A, 108A, 110A and having example local sensors 104B, 106B, 108B, 110B) of FIG. 1 is illustrated in FIGS. 2-5, one or more of the elements, processes, and/or devices illustrated in FIGS. 2-5 may be combined, divided, re-arranged, omitted, eliminated, and/or implemented in any other way. Further, the example database storage circuitry 204, the example policy manager circuitry 206, the example attestation manager circuitry 208, the example calibration safety and maintenance controller circuitry 210, the example local data fuser and analyzer circuitry 212, the example quality & anomaly assessor circuitry 214, the example reputation score circuitry 216, the example agent data processing TEEs 104A, 106A, 108A, 110A, the example sensors 104B, 106B, 108B, 110B, the example data collection database storage circuitry 301, the example crowd-sourced data aggregator circuitry 302, the example telemetry data platform 303, the example telemetry data platform 303, the example maintenance predictor circuitry 304, the example ALML circuitry 306, the example DQA circuitry 308, the example data quality threshold comparator circuitry 308A, the example multi-modal anomaly detector circuitry 310, the example multi-modal data fusion circuitry 311, the example consolidated safety analyzer circuitry 312, the example safety threshold comparator circuitry 312A, the example reputation score circuitry 314, the example data collection database storage circuitry 402, the example user interface 404, the example telemetry data platform circuitry 405, the example ensemble learning circuitry 406, the example learning model 1 406A, the example learning model 2 406B, the example learning model N 406N, the example anomaly detector 408, the example anomaly database storage circuitry 410, the example quality assessor 411, the example quality calculator circuitry 412, the example quality learning circuitry 414, the example quality inference circuitry 416, the example relevance compute circuitry 418, the example reputation score circuitry 420, the example reputation score storage circuitry 421, the example decision circuitry 422, the example selector circuitry 422A, the example event setter 424, the example sensor data fusion circuitry 426, the example active learning feedback circuitry 428, the example data and noise segregator circuitry 504, the example active learning machine learning circuitry 506, the example query selection module circuitry 508, the example root cause noise data storage circuitry 510, the example interface circuitry 512, more generally, the example system of FIG. 1, may be implemented by hardware alone or by hardware in combination with software and/or firmware. Thus, for example, any of the example database storage circuitry 204, the example policy manager circuitry 206, the example attestation manager circuitry 208, the example calibration safety and maintenance controller circuitry 210, the example local data fuser and analyzer circuitry 212, the example quality and anomaly assessor circuitry 214, the example reputation score circuitry 216, the example agent data processing TEEs 104A, 106A, 108A, 110A, the example sensors 104B, 106B, 108B, 110B, the example data collection database storage circuitry 301, the example crowd-sourced data aggregator circuitry 302, the example telemetry data platform 303, the example telemetry data platform 303, the example maintenance predictor circuitry 304, the example ALML circuitry 306, the example DQA circuitry 308, the example data quality threshold comparator circuitry 308A, the example multi-modal anomaly detector circuitry 310, the example multi-modal data fusion circuitry 311, the example consolidated safety analyzer circuitry 312, the example safety threshold comparator circuitry 312A, the example reputation score circuitry 314, the example data collection database storage circuitry 402, the example user interface 404, the example telemetry data platform circuitry 405, the example ensemble learning circuitry 406, the example model 1 406A, the example model 2 406B, the example model N 406N, the example anomaly detector 408, the example anomaly database storage circuitry 410, the example quality assessor 411, the example quality calculator circuitry 412, the example quality learning circuitry 414, the example quality inference circuitry 416, the example relevance compute circuitry 418, the example reputation score circuitry 420, the example reputation score storage circuitry 421, the example decision circuitry 422, the example selector circuitry 422A, the example event setter 424, the example sensor data fusion circuitry 426, the example data and noise segregator circuitry 504, the example active learning machine learning circuitry 506, the example query selection module circuitry 508, the example root cause noise data storage circuitry 510, the example interface circuitry 512 and/or, more generally, the example system of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example system architecture 100 of FIG. 1 may include one or more elements, processes, and/or devices in addition to, or instead of, those illustrated in FIGS. 2-5, and/or may include more than one of any or all of the illustrated elements, processes and devices.

Flowcharts representative of example machine readable instructions, which may be executed to configure processor circuitry to implement the example system architecture 100 of FIGS. 1-5, are shown in FIGS. 6, 7 and 8. The machine readable instructions may be one or more executable programs or portion(s) of an executable program for execution by processor circuitry, such as the processor circuitry 912, 1012, 1112 shown in the example processor platforms 900, 1000, 1100, discussed below in connection with FIG. 9, FIG. 10, and FIG. 11, respectively, and/or the example processor circuitry discussed below in connection with FIGS. 12 and/or 13. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example programs are described with reference to the flowcharts illustrated in FIGS. 6-8, many other methods of implementing the example system architecture 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 6-8 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 6 is a flowchart representative of example machine readable instructions and/or example operations 600 that may be executed and/or instantiated by processor circuitry to generate data quality scores and reputation scores. The machine readable instructions and/or the operations 600 of FIG. 6 begin at a block 602, at which the sensor data is supplied by the example sensors 104B to the example quality assessor circuitry 411 (FIG. 4). In some examples, the sensor data (including any sensor data supplied by the example telemetry data platform circuitry 405) passes to the data quality assessor circuitry 411 by way of the user interface 404. In some examples, the user interface circuitry 404 causes the incoming sensor data to be pre-processed to place the sensor data in condition for further processing by computers and machine learning networks.

In addition to the sensed data supplied to the example quality calculator circuitry 412, the quality learning circuitry 414 can receive and/or retrieve the sensed data from the example data collection database storage circuitry 402. In some examples, the incoming sensor data from the sensors 104B, whether retrieved from the example data collection database storage circuitry 402, received from the example user interface 404, or supplied by the example telemetry data platform circuitry 405, includes tags/labels that identify any of a variety of information about the sensor data. In some examples, the tags/labels can be applied at the sensor level and can include an identifier of the sensor, a time at which the data was sensed, a direction in which the sensor is facing (if relevant), a geographical position of the sensor at the time at which the data is sensed, etc.

In some examples, the example quality calculator circuitry 412 (FIG. 4) of the example quality assessor 411 (FIG. 4) extracts features from the sensed data at the blocks 604, 606 and 608. The features extracted by the quality calculator circuitry 412 (at the block 604) can include any of a variety of features including, for example, spatial features, and temporal features, etc. In some examples, the quality learning circuitry 414 uses statistical extraction methods (at the block 606) and deep learning based feature extraction methods (at the block 608) to extract the data features. In some examples, the labels/tags associated with the sensed/sensory data is attached to (or otherwise associated with) the corresponding extracted features.

During the data extraction performed at the blocks 604, 606 and 608, the example quality learning circuitry 414 uses features from a set of sensed data collected at a same time (or within a same time window, for example) by different types of sensors (e.g., any of the local sensors 104B, 106B, 108B, 110B). The quality learning circuitry 414 uses machine learning to process the data features to learn about the quality of the sensed data and the system that generated the sensors (e.g., any of the autonomous agents 104, 106, 108, 110). For example, the quality learning circuitry 414 learns 1) statistical aspects of the features including which of the features correlate to one or more other features, 2) statistical measures of the features (e.g., mean, median, a frequency distribution of the features, 3) any variability associated with the features, etc. In some examples, the quality learning circuitry 414, when processing the sets of features/sets of sensor data, attaches labels to the features based on information learned from previous sets of features processed by the quality learning circuitry 414 at an earlier time. In some examples, the quality learning circuitry 414 learns from features associated with a content characteristic of the data such as, whether example sensed image data identifies part of a corner of an image, whether example sensed sound data has a particular pitch, tone, etc.

In some examples, the features are consolidated using any of a variety of data consolidation algorithms (at the block 610). In some examples, the feature and/or data sets are consolidated prior to be supplied to the example quality calculator circuitry 416. In some examples, the data sets are not consolidated prior to be supplied to the example quality calculator circuitry 416. In some such examples, the feature sets may be consolidated after the example quality learning circuitry 414 has extracted the features. The resulting consolidated data represents the operations/behaviors of the system from which the data is being collected and at the time the data was collected (e.g., any of the autonomous agents 104, 106, 108, 110). In some examples, the consolidated data is a set of data arranged, for example, in a list or an array or in any desired manner.

In some examples, the example quality inference circuitry 416 makes quality inferences based on the extracted, consolidated features output by the example quality learning circuitry 414. In some examples, the quality inference circuitry 416 applies logical rules to the set of consolidate data features supplied by the example quality learning circuitry 414. The logical rules are applied to evaluate and analyze the consolidated set of feature data to determine whether a consolidated set of feature data agrees with consolidated sets of feature data analyzed previously. In some examples, a current set of consolidated feature data may be sufficiently similar to a consolidated set of feature data that was previously analyzed. In some examples, when the consolidated sets of feature data analyzed previously are similar to the current consolidated set of feature data, the quality inference circuitry can infer that the current consolidated set of feature data is similar in quality to the previously analyzed consolidates sets of feature data.

In some examples, the example quality inference circuitry 416 and/or the quality learning circuitry 414 can be implemented using a discriminator model machine learning model. In some examples, the discriminator model machine learning model is built (trained) using a database of non-faulty data feature sets (at the block 612). The discriminator model machine learning model is then executed to discriminate between incoming consolidated sets of feature data (or sensor data) that accord with normal (non-faulty) operations and those consolidated sets of feature data that do not accord with normal (non-faulty) operation. Based on the processing of the incoming consolidated sets of feature data by the discriminator model machine learning model, a quality score is generated and associated with the incoming consolidated sets of feature data (at the block 614).

Sensor data (also called asserted sensor data) as referred to herein includes not only the sensor data collected and supplied by the example local sensors (e.g., the local sensors 104B, 106B, 108B, 110B), but also includes sensor data operated on by the DISTILL function to arrive at a data quality score. As described above, the DISTILL function operates on the predictive maintenance information, hardware level and/or software block level and/or platform level error correction code (ECC) telemetry data collected from one or more registers or other sources of the processor. circuitry of the example autonomous agents 104, 106, 108, 110, node level ECC Check with TEE data (where the "node" represents any of the example autonomous agents 104, 106, 108, 110, network transmission errors using a time sensitive network (TSN), data corresponding to cross-correlations with peer nodes (e.g., peer autonomous agents 104, 106, 108, 110), etc., and/or any combination thereof. In some such examples, the DISTILL function is implemented using a discriminator machine learning model (as described above) that learns to distinguish between features/data associated with normal (non-faulty) operational behavior and features/data associated with non-normal (faulty) operational behavior. In such examples, the data sets used as operands of the DISTILL function are collected at a same time (or within a same duration of time) as the asserted sensor data. By supplying the DISTILL function data to the example quality assessor circuitry 411 (e.g., the discriminator machine learning model), any issues related to any of 1) equipment maintenance, 2) hardware/software/platform level errors, 3) node level errors of any of the agent data processing TEEs 104A, 106A, 108A, 110A detected by error correction checks, 4) network transmission errors, etc., that occur at a same time or within a same duration of time as collection of the sensor data sets (or corresponding feature data sets) are factored into the data quality score to be assigned to the sensor data sets (or corresponding feature data sets) (see again the block 614).

In some examples, the operand data of the DISTILL function that corresponds to predictive maintenance information, network transmission errors, hardware/software and/or platform level errors, TEE level errors, etc., is/are supplied to the example sensor data fusion circuitry 426 and/or the example quality assessor circuitry 411 and/or the example ensemble learning circuitry 406 via selections made by an operator of the example user interface circuitry 404 and/or via the example telemetry data platform circuitry 405 (which can include telemetry data registers, error correction checking (ECC) monitors, time sensitive network communication monitors etc.), and/or via the example maintenance predictor circuitry 304 (of FIG. 3) and/or the example the example calibration and maintenance safety controller circuitry 210 (of FIG. 2).

The generated quality scores and corresponding sets of data and/or data features are stored (at the block 616) In some examples, the scores and corresponding sets are stored in the example database storage circuitry 204 (of FIG. 2), the data collection database storage circuitry 402 (of FIG. 4 and FIG. 5), or in any other suitable memory configuration (at the block 616).

In some examples, a user (e.g., a system administrator) can use, for example, the user interface circuitry 404 (see FIG. 4) or any available user interface circuitry to query the generated quality scores and corresponding sets of data and/or data features (at the block 618) in an attempt to identify data sets that have been assigned a low quality score or a high quality (or any quality score of interest). In some such examples, the system administrator can review the data sets, the score(s), as well as any corresponding context information that results from the query (at the block 620). In some examples, the administrator can, based on operational system expertise, determine whether the assigned score(s) appear to be accurate (or within an expected range of scores) or are instead faulty in some way. Based on the administrator(s) review, the administrator can generate a reputation score (or adjust an existing reputation score) corresponding to the data/feature set and associated data quality score (at the block 622).

In some examples, the quality score may be high and the corresponding feature/data set may appear to be in line with expected behaviors such that the high quality score is warranted. In some examples, the quality score may be low and the corresponding feature/data set may appear to out of line with expected behaviors such that the low quality score is warranted. In some such examples, the administrator(s) can generate or adjust a reputation score associated with the data quality score. In such examples, the reputation score would reflect confidence in the corresponding data quality scores.

In some examples, a data/feature set assigned a high quality score may appear to be out of line with expected system behavior such that the data/feature set or the quality score appears to have been adversely affected by an error of some type. In such examples, the high data quality score is not warranted and the administrator(s) can respond by generating a reputation score (or adjust an existing reputation score) to indicate a low confidence in the data quality score. By way of further example, a data/feature set assigned a low data quality score may appear to be in line with expected system behavior such that the low data quality score does not appear warranted. In such examples, the administrator(s) can respond by generating a reputation score (or adjust an existing reputation score) to indicate a low confidence in the data quality score. The reputation score, the corresponding data/feature set, the data quality score, etc., can be supplied as training data to the example discriminator model machine learning model (at the block 612). In some such examples, the discriminator model can more accurately assess the quality of incoming data/feature sets, based on the supplied information. In some examples, training data from a normal (e.g., non-faulty) data reference set is also or instead supplied to the example discriminator model for training/reference at a block 613. In some examples, the normal data reference set is stored in the example data collection database storage circuitry 402 (see FIG. 4).

In some examples, the flowchart of FIG. 6 continues to operate indefinitely, or until the system is halted for maintenance, repair or any other reason. In some examples, as described above in connection with FIG. 4, the example reputation score circuitry 420 can be used to implement the example blocks 616, 618, 620, and/or 622. In some examples, as also described above with reference to FIG. 4, a system administrator can rely on context information to determine whether a data quality score is such that the reputation score should be adjusted (lowered or raised) or left alone. Such context information can include any conditions affecting the autonomous agent at the time of data collection including lighting conditions, weather conditions, time of day, location of autonomous agent, etc.

In some examples, when, a sufficient number of similar sets of data features corresponding to similar contexts have been previously processed, and such similar sets have previously been assigned similar or even identical quality scores, the example reputation score circuitry 420 can automatically increase a reputation score associated with the current set of feature data and also the previous sets. When an insufficient number of similar sets of data features corresponding to similar contexts have been previously processed, the reputation score circuitry 420 can leave a current reputation score unchanged or assign a low reputation score. In contrast, when a sufficient number of similar data features sets corresponding to similar contexts have been previously processed and assigned quality scores different than a quality score assigned to a current data feature set, the reputation score circuitry 420 can lower a reputation score associated with the current data feature set. The examples of this paragraph assume a human with operational system expertise is not available to assess the data quality scores such that the reputation score circuitry 420 can be configured, when particular situations arise, to adjust (or not) a reputation score for a data/feature set.

Although not shown in FIG. 6, the reputation score, data quality score and corresponding data/feature set can be supplied to the decision circuitry 422 of FIG. 4. As described above, this information and any corresponding anomaly information is used by the decision circuitry 422 to decide whether the set of features/data currently being processed has a high enough reputation score, a high enough data quality score and a sufficient lack of anomalies to allow actions to be taken based on the data set. If not, the decision circuitry 422 prevents the corresponding data set from being used. Otherwise, the decision circuitry 422 permits usage of the set of features/data for the purpose of taking one or more actions, events, etc.

FIG. 7 is a flowchart representative of example machine readable instructions and/or example operations 700 that may be executed and/or instantiated by processor circuitry (e.g., the processor circuitry 900 of FIG. 9, the processor circuitry 1000 of FIG. 10, or the processor circuitry of FIG. 11) to compute reputation scores and to develop threshold quality scores. In some examples, the threshold quality scores, if not satisfied by the set of data/features, will cause the corresponding sets of sensed data and data features to be stored for later root cause evaluation by a human operator (e.g., an administrator). The flowchart begins at a block 702 at which contextual information is extracted from a set of sensor data supplied by any or all of the example local sensors 104B, 106B, 108B, 110B of the example autonomous agents 104, 106, 108, 110, respectively, and supplied by the example telemetry data platform 303 of FIG. 3 (shown as the example telemetry data platform 405 in FIG. 4). In some examples, the contextual information is extracted by, for example, the example sensor fusion data fusion circuitry 426 of FIG. 4, or the example crowd-sourced data aggregator circuitry 302 of FIG. 3 or the example local data fuser and analyzer circuitry 212 of FIG. 2. In some examples, the sensors 104B are configured to supply context data with sensed data. As described above, in some examples, context data can include time of day, date, location, weather conditions, etc. In some examples, after the contextual information is extracted, and, provided that a human operator/administrator expert is available (as determined at a block 704), the expert (using, for example, the user interface circuitry 404 or any other available user interface circuitry) analyzes the contextual information and the corresponding set of data/features to determine whether the contextual information or any other information associated with the set of data/features is causing the set of data/features to exhibit unexpected properties at a block 706. In addition, at the same block 706, the expert(s) can use the analysis to calculate threshold data quality values for each of the data/features. The threshold data quality values are to be used to evaluate future data quality values calculated for future sets of data/features that are associated with the same or a similar context. As described above, if one or more future data features don't meet the corresponding threshold quality value, the corresponding sensed data set can be stored for a later root-cause evaluation. In some examples, the example decision circuitry 422 can be alerted to the inadequacies of the set of data/features and can be instructed to prohibit any actions from being taken based on that set of data/features.

When an expert is not available (as determined at the block 704), default threshold data quality values can be determined/derived for each of the data and/or data features (at a block 708). In some examples, the threshold quality values are supplied during initiation of the autonomous agents 104, 106, 108, 110, and/or initiation of the example edge-based QAE circuitry 102. In some examples, default threshold quality values are derived or determined using values included in the database storage circuitry 204 or the data collection database storage circuitry 402. In some examples, the threshold data quality values can be derived based on previously processed data collected by the same sensor and the data quality values assigned to the processed data. In some examples, the threshold data quality values can be derived based on a quality associated with the sensor. In some examples, the threshold data quality values can be stored in the reputation score database storage circuitry 421 with the reputation scores or in any other available storage circuitry. In some examples, after either the block 706 or the block 708, a reputation score is determined for a corresponding set of data/features (as described with respect to FIG. 6) and the threshold data quality values are supplied to the example quality assessor circuitry 411 of FIG. 4 (at a block 710) for use in training the discriminator model of FIG. 6. In addition, the reputation score is supplied by the reputation score circuitry to the decision circuitry 422 as illustrated in FIG. 4 and described in connection with FIG. 6 above. After the block 710, the operations of FIG. 7 are concluded with respect to a set of data/features currently being processed and are thereafter repeated as new sets of data/features collected by the sensors are ready for processing via, for example, the operations of FIG. 6.

FIG. 8 is a flowchart representative of example machine readable instructions and/or example operations 800 that may be executed and/or instantiated by processor circuitry to develop data quality scores for sets of data/features and to detect anomalies (if any) in such sets of data/features sensor data. In some examples, the flowchart of operations 800 begins at a block 802 at which real time data (e.g., sensor data) and any events (e.g., transmission errors, node level errors, etc.) are collected by multiple sensors 104B and supplied to the example quality assessor circuitry 411 of FIG. 4. In some examples, at the block 802, the real time data/events can also be pre-processed before being supplied to the example quality assessor 411. In some examples, the example user interface 404 can cause the data/events to be pre-processed (e.g., pre-screened for obviously erroneous information/data/outliers). In some examples, also at the block 802, the data/events are scaled as needed to enable processing of the data/events, collectively.

In some examples, after the block 802, the data/events are analyzed to determine a corresponding data quality score at a block 804. The analyzing can result in the calculation of data quality values corresponding to each of a set of data features extracted from the collected data/events. In some examples, any of the operations described above with respect to the example quality and anomaly assessor circuitry 214 (FIG. 2), the example local data fuser and analyzer circuitry 212 (FIG. 2), the example DQA circuitry 308, the example data quality threshold comparator circuitry 308A (FIG. 3), the example ALML circuitry 306 (FIG. 3), the example quality calculator circuitry 412 (FIG. 4), and/or the example active learning machine learning circuitry 506 (FIG. 5), can be used to analyze the quality of the set of data/features.

Next, at a block 806, the example quality values generated at the block 804 can be evaluated at a block 806 to determine whether corresponding sets of data features and/or corresponding data sensors satisfy corresponding threshold quality values. The threshold quality values are determined as described with reference to the flowchart 700 of FIG. 7. In some examples, when the threshold quality values are not satisfied, the set of data/features, information identifying the corresponding data sensors, the corresponding data quality scores, a corresponding reputation score (as described with reference to the flowchart 600 of FIG. 6), etc., are stored for a future root cause evaluation at a block 808. In some examples, a root cause evaluation is called for because the inability to satisfy all of the sensor quality threshold values may be an indication that unexpected noise was encountered in the data, that one or more sensors are not operating properly, etc. In some examples, the root cause evaluation is performed by the human experts/administrators when generating/adjusting reputation scores as described with respect to FIG. 6. In some such examples, the query is generated based on the set of data/features that did not satisfy the threshold value as well as any noise detected by the example data and noise segregation circuitry 504 in addition to any detected data anomalies. After storing the information needed to perform a root cause evaluation (described above), the operations continue at the block 802 at which a next set of data is collected. Processing then proceeds to the blocks subsequent to the block 802 as described above and below.

In some examples, when the threshold quality values are satisfied, the example anomaly detector 408 (see FIG. 4) determines an anomaly score for sensor data values included in the set of data/features at a block 810. In some examples, simultaneously with the anomaly score computation, relevance weights for the data features (or in some examples, for the sensed data) are determined at the example relevance compute circuitry 418 (see the block 812). In some examples, the relevance weights are based on the quality scores generated at the block 804.

After the anomaly scores and relevance weights have been determined, the example anomaly detector circuitry 418 uses at least some (or all) of the weights and anomaly scores for corresponding ones of the sensed data (and/or the corresponding features of the data and/or for corresponding data/feature sets) to determine a final anomaly score for the scenario represented by the data/feature set currently being evaluated (see the block 814). In some examples, the scenario represented by the current data/feature set represents a behavior of one or more of the autonomous agents 104, 106, 108, 110 in a particular context. In some examples, the scenario represented by the current data/feature set represents events detected by the sensors during operation of one or more of the autonomous agents 104, 106, 108, 110 in a particular context.

At a block 816, the anomaly detector circuitry 418 determines, based on the final anomaly score, whether an anomaly (or anomalies) has been detected in the corresponding set(s) of data/features. If an anomaly has not been detected, the corresponding set(s) of sensor data (and/or corresponding set(s) of data features) can be safely used by the autonomous agent 104 as a basis for performing actions (which can include rescinding previously taken actions). In some such examples, the data itself may be assumed to be useable provided that it is not flagged otherwise. In some examples, when the data is not anomalous, the flowchart 800 again performs the operation at the block 802 and the blocks subsequent thereto to process a next set of real time data/events.

If, instead, at the block 816, an anomaly is detected, the corresponding anomalous data/features is/are stored in the example anomaly database storage circuitry 410 for further reference by the example anomaly detector circuitry 408 and/or further analysis (see block 818). In addition, the anomalous data is flagged as being anomalous to cause the example decision circuitry 422 of FIG. 4 to prevent the anomalous data from being used by the autonomous agent as a basis for taking or rescinding any previously permitted actions (see block 820). In some examples, after the operations described with respect to the block 820 are complete, the flowchart 800 returns to perform the operations described with respect to the block 802 and the blocks subsequent thereto to process a next set of real time data/events.

FIG. 9 is a block diagram of an example processor platform 900 structured to execute and/or instantiate the machine readable instructions and/or the operations of FIGS. 6-8 to implement the example edge-based QAE circuitry 102 of FIG. 1. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs, microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the example data collection database storage circuitry 301, the example crowd-sourced aggregator circuitry 302, the example telemetry data platform circuitry 303, the example maintenance predictor circuitry 304, the example ALML circuitry 306, the example data quality analyzer (DQA) circuitry 308, the example data quality threshold comparator circuitry 308A, the example multi-modal anomaly detector circuitry 310, the example multi-modal data fusion circuitry 311, the example consolidated safety analyzer circuitry 312, the example safety threshold comparator circuitry 312A, and/or reputation score circuitry 314.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 932, which may be implemented by the machine readable instructions of FIGS. 6-8, may be stored in the mass storage device 928, in the volatile memory 914, in the non-volatile memory 916, and/or on a removable non-transitory computer readable storage medium such as a CD or DVD.

FIG. 10 is a block diagram of an example processor platform 1000 structured to execute and/or instantiate the machine readable instructions and/or the operations of FIGS. 6-8 to implement the example autonomous agents 104, 106, 108, 110 of FIGS. 1, 2, 4, and 5. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 100 of the illustrated example includes processor circuitry 1012. The processor circuitry 1012 of the illustrated example is hardware. For example, the processor circuitry 1012 can be implemented by one or more integrated circuits, logic circuits, FPGAs, microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements any of the example agent data processing TEEs 104A, 106A, 108A, 110A, the example database storage circuitry 204, the example policy manager circuitry 206, the example attestation manager circuitry 208, the example calibration and maintenance safety controller circuitry 210, the example local data fuser and analyzer circuitry 212, the example quality & anomaly assessor circuitry 214, and/or the example reputation score circuitry 216.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1032, which may be implemented by the machine readable instructions of FIGS. 6-8, may be stored in the mass storage device 1028, in the volatile memory 1014, in the non-volatile memory 1016, and/or on a removable non-transitory computer readable storage medium such as a CD or DVD.

FIG. 11 is a block diagram of an example processor platform 1100 structured to execute and/or instantiate the machine readable instructions and/or the operations of FIGS. 6-8 to implement the data quality example autonomous agents 104, 106, 108, 110 as represented by the circuitry of FIG. 4 and FIG. 5 or to implement the example edge-based QAE 102 of FIGS. 1, 3, 4 and 5 as can also be represented by the circuitry of FIG. 4 and FIG. 5. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs, microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements any of the example ensemble learning circuitry 406, the example anomaly detector 408, the example quality assessor 411, the example reputation score circuitry 420, the example decision circuitry 422, the example selector circuitry 422A, the example event setter circuitry 424, the example sensor data fusion circuitry 426, the example active learning feedback circuitry 428 of FIG. 4, and the example data and noise segregator circuitry 504, the example query selection circuitry 508, the example root case noise data storage circuitry 510, the example interface circuitry 512 of FIG. 5.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuitry 1120 of the illustrated example. The output device(s) 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1132, which may be implemented by the machine readable instructions of FIGS. 6-8, may be stored in the mass storage device 1128, in the volatile memory 1114, in the non-volatile memory 1116, and/or on a removable non-transitory computer readable storage medium such as a CD or DVD.

Figure 12:
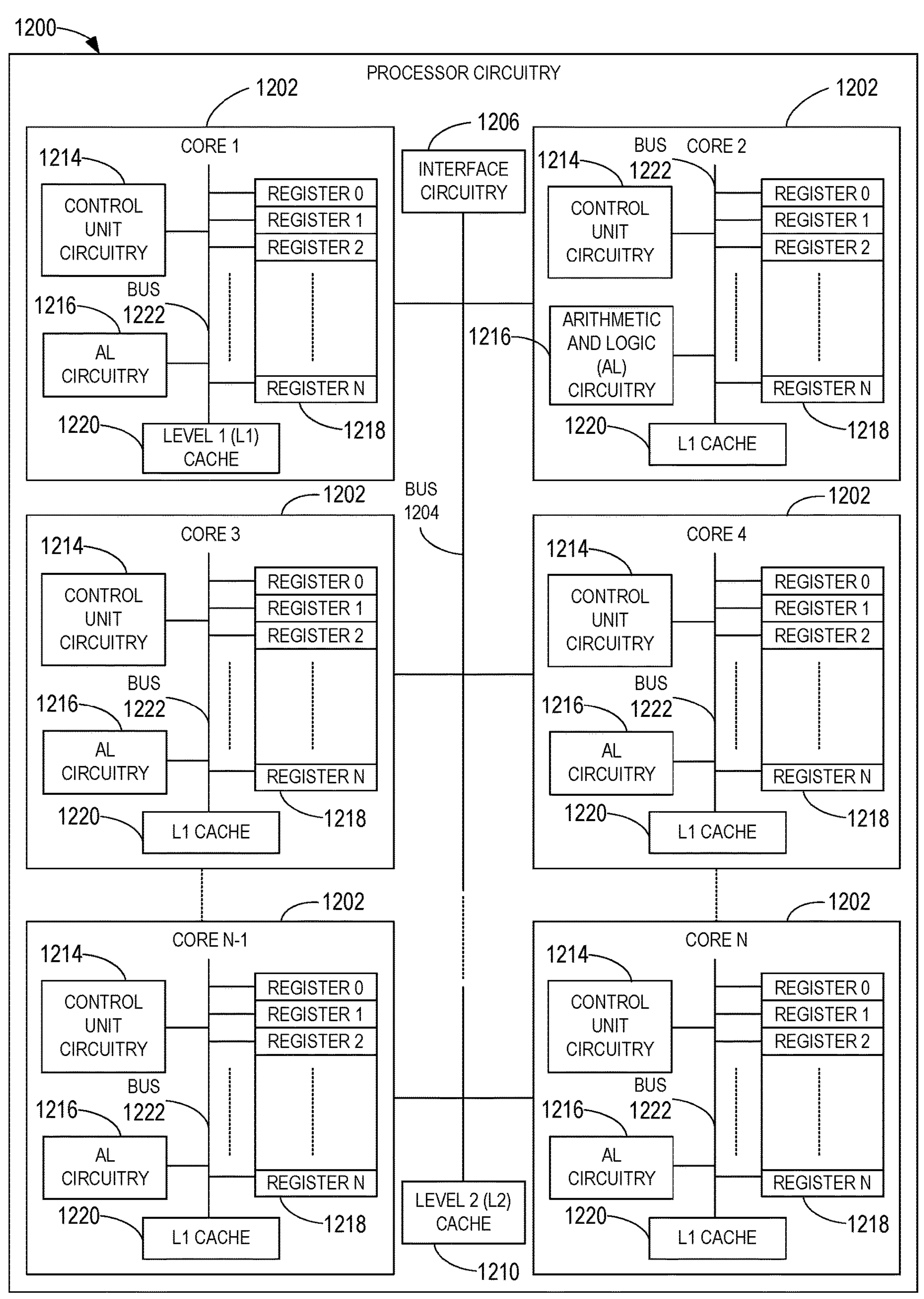
FIG. 12 is a block diagram of an example implementation of the processor circuitry of FIGS. 9-11.

FIG. 12 is a block diagram of an example implementation of the processor circuitry 912 of FIG. 9. The block diagram of FIG. 12 can also be used to implement the processor circuitry 1012 of FIG. 10, or the processor circuitry 1112 of FIG. 11 . . . . In this example, the processor circuitry 912 of FIG. 9, the processor circuitry 1012 of FIG. 10, and the processor circuitry 1112 of FIG. 11 are separately implemented by separate microprocessors such as a microprocessor 1200. For example, the microprocessor 1200 may be a general purpose microprocessor (e.g., general purpose microprocessor circuitry). The microprocessor 1200 can executes some or all of the machine readable instructions of the flowcharts of FIGS. 6-8 to effectively instantiate the circuitry of FIG. 2, of FIG. 3, of FIG. 4 and/or of FIG. 5 as logic circuits to perform the operations corresponding to those machine readable instructions. In some such examples, the different circuitry/devices of FIGS. 2-5 are instantiated by the hardware circuits of the microprocessor 1200 in combination with the instructions. For example, the microprocessor 1200 may be implemented by multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all of the machine readable instructions and/or operations represented by the flowchart of FIGS. 6-8.

The cores 1202 may communicate by a first example bus 1204. In some examples, the first bus 1204 may be implemented by a communication bus to effectuate communication associated with one(s) of the cores 1202. For example, the first bus 1204 may be implemented by at least one of an Inter-Integrated Circuit (I2C) bus, a Serial Peripheral Interface (SPI) bus, a PCI bus, or a PCIe bus. Additionally or alternatively, the first bus 1204 may be implemented by any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2 cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 914, 916 of FIG. 9, the main memory 1014, 1016 of FIG. 10, the main memory 1114, 1116 of FIG. 11). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the local memory 1220, and a second example bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer based operations. In other examples, the AL circuitry 1216 also performs floating point operations. In yet other examples, the AL circuitry 1216 may include first AL circuitry that performs integer based operations and second AL circuitry that performs floating point operations. In some examples, the AL circuitry 1216 may be referred to as an Arithmetic Logic Unit (ALU). The registers 1218 are semiconductor-based structures to store data and/or instructions such as results of one or more of the operations performed by the AL circuitry 1216 of the corresponding core 1202. For example, the registers 1218 may include vector register(s), SIMD register(s), general purpose register(s), flag register(s), segment register(s), machine specific register(s), instruction pointer register(s), control register(s), debug register(s), memory management register(s), machine check register(s), etc. The registers 1218 may be arranged in a bank as shown in FIG. 12. Alternatively, the registers 1218 may be organized in any other arrangement, format, or structure including distributed throughout the core 1202 to shorten access time. The second bus 1222 may be implemented by at least one of an I2C bus, a SPI bus, a PCI bus, or a PCIe bus Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

FIG. 13 is a block diagram of another example way to implement any of the processor circuitry 912 of FIG. 9, the processor circuitry 1012 of FIG. 10 and/or the processor circuitry 1112 of FIG. 11. In this example, the processor circuitry 912, 1012, and/or 1112 can be implemented by FPGA circuitry 1300. For example, the FPGA circuitry 1300 may be implemented by an FPGA. The FPGA circuitry 1300 can be used, for example, to perform operations that could otherwise be performed by the example microprocessor 912 of FIG. 9 (or the example microprocessor 1012 of FIG. 10 or the example microprocessor 1112 of FIG. 11) executing corresponding machine readable instructions. However, once configured, the FPGA circuitry 1300 instantiates the machine readable instructions in hardware and, thus, can often execute the operations faster than they could be performed by a general purpose microprocessor executing the corresponding software.

More specifically, in contrast to any of the microprocessor 900 of FIG. 9, the microprocessor 1000 of FIG. 10, the microprocessor 1100 of FIG. 11 described above (which are general purpose devices that may be programmed to execute some or all of the machine readable instructions represented by the flowchart of FIGS. 6-8 but whose interconnections and logic circuitry are fixed once fabricated), the FPGA circuitry 1300 of the example of FIG. 13 includes interconnections and logic circuitry that may be configured and/or interconnected in different ways after fabrication to instantiate, for example, some or all of the machine readable instructions represented by the flowcharts of FIGS. 6-8. In particular, the FPGA circuitry 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the software represented by the flowchart of FIGS. 6-8. As such, the FPGA circuitry 1300 may be structured to effectively instantiate some or all of the machine readable instructions of the flowchart of FIGS. 6-8 as dedicated logic circuits to perform the operations corresponding to those software instructions in a dedicated manner analogous to an ASIC. Therefore, the FPGA circuitry 1300 may perform the operations corresponding to the some or all of the machine readable instructions of FIGS. 6-8 faster than the general purpose microprocessor can execute the same.

In the example of FIG. 13, the FPGA circuitry 1300 is structured to be programmed (and/or reprogrammed one or more times) by an end user by a hardware description language (HDL) such as Verilog. The FPGA circuitry 1300 of FIG. 13, includes example input/output (I/O) circuitry 1302 to obtain and/or output data to/from example configuration circuitry 1304 and/or external hardware 1306. For example, the configuration circuitry 1304 may be implemented by interface circuitry that may obtain machine readable instructions to configure the FPGA circuitry 1300, or portion(s) thereof. In some such examples, the configuration circuitry 1304 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1306 may be implemented by external hardware circuitry. For example, the external hardware 1306 may be implemented by the microprocessor 1200 of FIG. 12. The FPGA circuitry 1300 also includes an array of example logic gate circuitry 1308, a plurality of example configurable interconnections 1310, and example storage circuitry 1312. The logic gate circuitry 1308 and the configurable interconnections 1310 are configurable to instantiate one or more operations that may correspond to at least some of the machine readable instructions of FIGS. 6-8 and/or other desired operations. The logic gate circuitry 1308 shown in FIG. 13 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations. The logic gate circuitry 1308 may include other electrical structures such as look-up tables (LUTs), registers (e.g., flip-flops or latches), multiplexers, etc.

The configurable interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example Dedicated Operations Circuitry 1314. In this example, the Dedicated Operations Circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 12 and 13 illustrate two example ways to implement any of the processor circuitry 912 of FIG. 9, the processor circuitry 1012 of FIG. 10, and the processor circuitry 1112 of FIG. 11, many other approaches are contemplated. For example, as mentioned above, modern FPGA circuitry may include an on-board CPU, such as one or more of the example CPU 1320 of FIG. 13. Therefore, the processor circuitry 912 of FIG. 9 (or the processing circuitry 1012 of FIG. 10 or the processor circuitry 1112 of FIG. 11) may additionally be implemented by combining the example microprocessor 1200 of FIG. 12 and the example FPGA circuitry 1300 of FIG. 13. In some such hybrid examples, a first portion of the machine readable instructions represented by the flowchart of FIGS. 6-8 may be executed by one or more of the cores 1202 of FIG. 12, a second portion of the machine readable instructions represented by the flowchart of FIGS. 6-8 may be executed by the FPGA circuitry 1300 of FIG. 13, and/or a third portion of the machine readable instructions represented by the flowcharts of FIGS. 6-8 may be executed by an ASIC. It should be understood that some or all of the system architecture circuitry 100 of FIG. 1 (represented by the block diagrams of FIGS. 2-5) may, thus, be instantiated at the same or different times. Some or all of the circuitry may be instantiated, for example, in one or more threads executing concurrently and/or in series. Moreover, in some examples, some or all of the system architecture circuitry 100 of FIG. 1 (represented by the block diagrams of FIGS. 2-5) may be implemented within one or more virtual machines and/or containers executing on the microprocessor.

In some examples, the processor circuitry 912 of FIG. 9, the processor circuitry 1012 of FIG. 10, and/or the processor circuitry 1112 of FIG. 11 may be in one or more packages. For example, the microprocessor 1200 of FIG. 12 and/or the FPGA circuitry 1300 of FIG. 13 may be in one or more packages. In some examples, an XPU may be implemented by the processor circuitry 912 of FIG. 9, the processor circuitry 1012 of FIG. 10, and/or the processor circuitry 1112 of FIG. 11, which may be in one or more packages. For example, the XPU may include a CPU in one package, a DSP in another package, a GPU in yet another package, and an FPGA in still yet another package.

From the foregoing, it will be appreciated that example systems, methods, apparatus, and articles of manufacture have been disclosed that evaluate data and/or data features to determine a data quality score and a reputation score that indicates a confidence level in the quality score. Disclosed systems, methods, apparatus, and articles of manufacture improve the efficiency of using a computing device by improving the accuracy of machine learning models/algorithms in autonomous agents and at an edge-base quality analytics engine 102 that operates in cooperation with the autonomous agents. Further the machine learning models/algorithms of the invention benefit from active learning by improving the accuracy of data quality scores and reputations scores. Providing an understanding of not only whether data is of a sufficient quality for use in making an autonomous agent perform one or more operations but also providing a confidence level in the data quality provides a way to improve the safety of autonomously operating systems, devices, components, etc.

Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to perform data quality assessment and learning for automated devices are disclosed herein. Further examples and combinations thereof include the following:

Example 1 includes an apparatus comprising at least one memory, machine readable instructions, and processor circuitry to at least one of instantiate or execute the machine readable instructions to calculate a data quality score for data generated by sensors of a an autonomous agent, generate a reputation score based on the data quality score and the data generated by the sensors, the reputation score to indicate a level of confidence in an accuracy of the data quality score, and control usage of the data by action circuitry of the autonomous agent based on the data quality score and the reputation score, the data quality score and the reputation score represented by a first value and a second value, respectively.

Example 2 includes the apparatus of example 1, wherein the processor circuitry is to calculate the data quality score based on a discriminator machine learning model implemented to include active learning.

Example 3 includes the apparatus of example 2, wherein the data includes context information, the context information identifying conditions of an environment of the autonomous agent when the sensors are sensing the data, and the processor circuitry is to identify noise included in a signal containing the data, and based on an outcome of an analysis of the noise, the data and the context information, adjust at least one of the data quality score or the reputation score.

Example 4 includes the apparatus of example 3, wherein the processor circuitry is to supply the outcome of the analysis of the noise, the data and the context information to a machine learning model, the machine learning model to use the outcome of the analysis to determine an impact of the context information on at least one of the data or the noise.

Example 5 includes the apparatus of example 4, wherein the machine learning model uses the impact of the context information on the at least one of the data or the noise to change a manner in which at least one of (i) a future data quality score for future data is to be calculated, or (ii) a future reputation score for the future data is to be generated.

Example 6 includes the apparatus of example 5, wherein the outcome of the analysis indicates the impact of the context information on the at least one of the data or the noise is at least one of (a) neutral when the context information is associated with conditions of the environment expected to introduce the noise, or (b) negative when the context information is associated with conditions of the environment not expected to introduce noise.

Example 7 includes the apparatus of example 4, wherein the data is current data, the machine learning model is an active learning machine learning model and the analysis is performed based on information supplied in response to a query of at least one of stored anomaly data, previously collected data, and previously calculated quality scores corresponding to the previously collected data.

Example 8 includes the apparatus of example 7, wherein the impact is a current impact, and the active learning machine learning model is to change a manner in which a future impact of the context information on future data is determined, the change in the manner based on additional outcomes of additional analyses performed on intermediate data associated with the context information supplied to the active learning machine learning model, the intermediate data collected at a time intervening between a current time corresponding to collection of the current data and a future time corresponding to collection of the future data.

Example 9 includes the apparatus of example 2, wherein the data includes context information, the context information identifying conditions of an environment of the autonomous agent at a time when the sensors are sensing the data, and the processor circuitry is to in response to determining the data is exhibiting one or more anomalies, provide evaluation information to an active learning feedback circuit, the evaluation information to include (i) the data, (ii) the data quality score, (iii) anomaly information about the one or more anomalies, and (iii) the context information, and adjust the reputation score corresponding to the data quality score based on an outcome of an evaluation of the evaluation information, the outcome of the evaluation supplied at a user interface.

Example 10 includes the apparatus of example 1, wherein the processor circuitry is to implement sensor data behavior models based on machine learning, the machine learning to improve an accuracy of the sensor data behavior models as future sensor data is collected, the sensor data behavior models corresponding to subsets of the sensors and determine whether one or more of the sensors is generating anomalous data based on the sensor data behavior models.

Example 11 includes the apparatus of example 10, wherein at least one of the sensor data behavior models is to provide a maintenance recommendation for at least one of the sensors.

Example 12 includes the apparatus of example 10, wherein the sensor data behavior models identify patterns in the data generated by the sensors.

Example 13 includes the apparatus of example 10, wherein the processor circuitry is to implement a multi-modal model based on the sensor data behavior models, the multi-modal model to model expected behavior of the sensors in operation together.

Example 14 includes the apparatus of example 10, wherein the processor circuitry is to determine the reputation score based on an active learning machine learning model and a context of the autonomous agent, the context based on one or more conditions of the autonomous device at a time of collection of the data.

Example 15 includes the apparatus of example 10, wherein the data includes a plurality of data values, and the processor circuitry is to generate relevance weights for the plurality of data values, apply the relevance weights to corresponding ones of the plurality of data values, based on the plurality of data values and corresponding applied weights, determine whether the autonomous agent is behaving anomalously.

Example 16 includes the apparatus of example 10, wherein the processor circuitry is to implement a multi-modal model to model expected behavior of the sensors operating collectively, and determine whether the autonomous agent is behaving anomalously based on at least one of the relevance weights and the multi-modal model of the sensors.

Example 17 includes the apparatus of example 1, wherein the processor circuitry is to separate noise information from data information contained in the data, generate a query based on the signal to noise ratio, the query to identify classifications of information to be retrieved from one or more databases, the classifications of information corresponding to one or more of values included in the data, present a query result to a user interface, the query result to include the one or more values included in the data, a set of corresponding data quality scores, anomaly detection information corresponding to the one or more values included in the data, and information identifying a context in which the autonomous agent is operating, and in response to input received via the user interface after presentation of the query result, cause at least one of 1) attachment of one or more labels to the sensor data, or 2) storage of at least the values included in the data and the corresponding context of the autonomous device for later evaluation.

Example 18 includes a method to evaluate data comprising calculating, by executing an instruction with at least one processor, a data quality score for the data, the data extracted from sensor data generated by sensors of an autonomous agent, generating, by executing an instruction with the at least one processor, a reputation score based on the data quality score and the data, the reputation score to indicate a level of confidence in an accuracy of the data quality score, and controlling, by executing an instruction with the at least one processor, usage of the data by an action circuitry actuator of the autonomous agent based on the data quality score and the reputation score, the data quality score and the reputation score represented by a first value and a second value, respectively.

Example 19 includes the method of example 18, wherein calculating the data quality score includes using a discriminator machine learning model implemented to include active learning.

Example 20 includes the method of example 19, wherein the data includes context information, the context information identifying conditions of a sensed environment, and the method including in response to determining the data is exhibiting one or more anomalies, providing evaluation information to an active learning feedback circuit, the evaluation information to include (i) the data, (ii) the data quality score, (iii) anomaly information about the one or more anomalies, and (iv) the context information, and adjusting the reputation score corresponding to the data quality score based on an evaluation of the reputation score supplied at a user interface.

Example 21 includes the method of example 20, the method including supplying the evaluation of the reputation score to the discriminator machine learning model as training data.

Example 22 includes the method of example 18, the method including implementing sensor data behavior models, the sensor data behavior models to identify normal sensor behavior and the sensor data behavior models corresponding to groupings of the sensors and determining whether one or more of the sensors is generating anomalous data based on the sensor data behavior models.

Example 23 includes the method of example 22, wherein at least one of the sensor data behavior models is to provide a maintenance recommendation for at least one of the sensors.

Example 24 includes the method of example 22, wherein the sensor data behavior models identify patterns in the data.

Example 25 includes the method of example 22, the method including implementing a multi-modal model based on the sensor data behavior models, the multi-modal model to model expected behavior of the sensors operating together.

Example 26 includes the method of example 18, the method including determining the reputation score based on active learning and a context of the autonomous agent, the context based on one or more conditions of the autonomous agent at a time of collection of the data.

Example 27 includes the method of example 18, wherein the data includes a plurality of data values, and the method including generating relevance weights for the plurality of data values, the relevance weights to indicate an amount of consideration to be given a corresponding data value of the plurality of data values, the plurality of data values with the weights applied to be used to determine when the autonomous agent is behaving anomalously.

Example 28 includes the method of example 27, the method including implementing a multi-modal model to model expected behavior of the sensors operating collectively and determining whether the autonomous agent is behaving anomalously based on the relevance weights and the multi-modal model of the sensors.

Example 29 includes the method of example 18, wherein the data includes data information and noise information, the data includes one or more data values, and the method including segregating the noise information from the data information, generating a query based on the noise information and the one or more data values, the query to identify classifications corresponding to the one or more data values, and query results to include information related to the classifications to be retrieved from one or more databases, presenting the query results to a user interface, the query results to include the one more data values included in the data, a set of corresponding data quality scores, anomaly detection information corresponding to the one or more data values included in the data, and context information identifying a context in which the autonomous agent is operating, and in response to input received via the user interface after presentation of the query results, the input based on an expert evaluation of the query results, causing at least one of 1) attachment of one or more labels to the sensor data, or 2) storage of at least the one or more data values included in the data and context of the autonomous agent for later evaluation.

Example 30 includes At least one non-transitory computer readable medium comprising computer readable instructions that, when executed, cause at least one processor to at least train a machine learning model based on reference sensor data, at least some of the reference sensor data corresponding to a first type of sensor for sensing a first environment external to ones of a plurality of autonomous agents, and at least some of the reference sensor data corresponding to a second type of sensor for sensing a second environment internal to at least one of the plurality of autonomous agents, the reference sensor data collected during normal operation of the plurality of autonomous agents, execute the machine learning model to calculate a first data quality score for a first set of data values generated by first sensors associated with a first autonomous agent of the plurality of autonomous agents, the first sensors to be any of (i) the first type of sensor, (ii) the second type of sensor, or (iii) the first type of sensor and the second type of sensor, generate a first reputation score based on the first data quality score and at least some of the first set of data values, the first reputation score to indicate a level of confidence in an accuracy of the first data quality score, and control usage of the first set of data values by action circuitry of the first autonomous agent based on the first data quality score and the first reputation score, the first data quality score and the first reputation score being a first value and a second value, respectively.

Example 31 includes the at least one non-transitory computer readable medium of example 30, wherein to execute the machine learning model to calculate the first data quality score for the first set of data values, the instructions, when executed, cause the at least one processor to execute a function on the machine learning model, a set of operands of the function to include one or more correlation values indicating one or more correlations between (i) the first set of data values collected by the first sensors of the first autonomous agent, and (ii) a second set of data values collected by second sensors of a second autonomous agent of the plurality of autonomous agents, the first sensors and the second sensors being the first type of sensor, the second type of sensor, or any combination of the first type of sensor and the second type of sensor, and ones of the first set of data values, the ones of the first set of data values corresponding to ones of the first sensors that are the second type of sensor.

Example 32 includes the at least one non-transitory computer readable medium of example 31, wherein the second type of sensor is to collect at least one of error correction code data, network transmission information, or predictive maintenance information.

Example 33 includes the at least one non-transitory computer readable medium of example 31, wherein the reference sensor data is first reference sensor data, and the instructions, when executed, cause the at least one processor to detect anomalies in the first set of data, the anomalies detected based on second reference sensor data, the second reference sensor data associated with anomalous operation of any of the plurality of autonomous agents.

Example 34 includes the at least one non-transitory computer readable medium of example 31, wherein the instructions, when executed, cause the processor to detect an anomaly in the first set of data values, detect noise in the first set of data values, query a database containing previously stored data values and corresponding context information, the query performed in response to the noise and the anomaly being detected, cause results of the query to be presented at a user interface, and make an adjustment the first data quality score and the first reputation score to determine an adjusted first data quality score and an adjusted first reputation score, the adjustments based on an input supplied at the user interface, and the input based on the results of the query.

Example 35 includes the at least one non-transitory computer readable medium of example 34, wherein the instructions, when executed, cause the processor to supply the adjusted first data quality score and the adjusted first reputation score to the machine learning model as training data.

Example 36 includes the at least one non-transitory computer readable medium of example 34, wherein the corresponding context information includes information identifying conditions at times of collection of the previously stored data values.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:

at least one memory;

machine readable instructions; and at least one processor circuit to at least one of instantiate or execute the machine readable instructions to:

calculate a data quality score for data generated by one or more sensors of an autonomous agent;

generate a reputation score based on the data quality score and the data generated by the one or more sensors, the reputation score to indicate a level of confidence in an accuracy of the data quality score; and control usage of the data by action circuitry of the autonomous agent based on the data quality score and the reputation score, the data quality score and the reputation score represented by a first value and a second value, respectively.

2. The apparatus of claim 1, wherein one or more of the at least one processor circuit is to calculate the data quality score based on a discriminator machine learning model implemented to include active learning.

3. The apparatus of claim 1, wherein the data includes context information, the context information identifying one or more conditions of an environment of the autonomous agent when the one or more sensors are sensing the data, and one or more of the at least one processor circuit is to:

identify noise included in a signal containing the data; and based on an outcome of an analysis of the noise, the data and the context information, adjust at least one of the data quality score or the reputation score.

4. The apparatus of claim 3, wherein one or more of the at least one processor circuit is to supply the outcome of the analysis of the noise, the data and the context information to a machine learning model, the machine learning model to use the outcome of the analysis to determine an impact of the context information on at least one of the data or the noise.

5. The apparatus of claim 4, wherein the machine learning model uses the impact of the context information on the at least one of the data or the noise to change a manner in which at least one of (i) a future data quality score for future data is to be calculated, or (ii) a future reputation score for the future data is to be generated.

6. The apparatus of claim 5, wherein the outcome of the analysis indicates the impact of the context information on the at least one of the data or the noise is at least one of (a) neutral when the context information is associated with conditions of the environment expected to introduce the noise, or (b) negative when the context information is associated with conditions of the environment not expected to introduce noise.

7. The apparatus of claim 4, wherein the data is current data, the machine learning model is an active learning machine learning model, and the analysis is performed based on information supplied in response to a query of at least one of stored anomaly data, previously collected data, or previously calculated quality scores corresponding to the previously collected data.

8. The apparatus of claim 7, wherein the impact is a current impact, and the active learning machine learning model is to change a manner in which a future impact of the context information on future data is determined, the change in the manner based on additional outcomes of additional analyses performed on intermediate data associated with the context information supplied to the active learning machine learning model, the intermediate data collected at a time intervening between a current time corresponding to collection of the current data and a future time corresponding to collection of the future data.

9. The apparatus of claim 2, wherein the data includes context information, the context information identifying conditions of an environment of the autonomous agent at a time when the one or more sensors are sensing the data, and one or more of the at least one processor circuit is to:

based on a determination that the data exhibits one or more anomalies, provide evaluation information to an active learning feedback circuit, the evaluation information to include: (i) the data, (ii) the data quality score, (iii) anomaly information about the one or more anomalies, and (iii) the context information; and adjust the reputation score corresponding to the data quality score based on an outcome of an evaluation of the evaluation information, the outcome of the evaluation supplied at a user interface.

10. The apparatus of claim 1, wherein one or more of the at least one processor circuit is to:

separate noise information from data information in the data;

generate a query based on a signal to noise ratio, the query to identify one or more classifications of information to be retrieved from one or more databases, the one or more classifications of information corresponding to one or more of values included in the data;

present a query result to a user interface, the query result to include the one or more values included in the data, a set of corresponding data quality scores, anomaly detection information corresponding to the one or more values included in the data, and information identifying a context in which the autonomous agent is operating; and based on input from the user interface after presentation of the query result, cause at least one of:

1) attachment of one or more labels to the data, or 2) storage of at least the values included in the data and the corresponding context of the autonomous agent.

11. A method to evaluate data, the method comprising:

calculating, by executing an instruction with at least one processor circuit, a data quality score for the data, the data from one or more sensors of an autonomous agent;

generating, by executing an instruction with one or more of the at least one processor circuit, a reputation score based on the data quality score and the data, the reputation score to indicate a level of confidence in an accuracy of the data quality score; and controlling, by executing an instruction with one or more of the at least one processor circuit, usage of the data by an action circuitry actuator of the autonomous agent based on the data quality score and the reputation score, the data quality score and the reputation score represented by a first value and a second value, respectively.

12. The method of claim 11, wherein the calculating of the data quality score is based on a discriminator machine learning model implemented to include active learning.

13. The method of claim 12, wherein the data includes context information, the context information identifying conditions of a sensed environment, and including:

based on determining the data exhibits one or more anomalies, providing evaluation information to an active learning feedback circuit, the evaluation information to include: (i) the data, (ii) the data quality score, (iii) anomaly information about the one or more anomalies, and (iv) the context information; and adjusting the reputation score corresponding to the data quality score based on an evaluation of the reputation score supplied at a user interface.

14. The method of claim 13, including supplying the evaluation of the reputation score to the discriminator machine learning model as training data.

15. The method of claim 11, including:

implementing one or more sensor data behavior models, the one or more sensor data behavior models to identify normal sensor behavior, and the one or more sensor data behavior models corresponding to groupings of the one or more sensors; and determining whether one or more of the one or more sensors is generating anomalous data based on the one or more sensor data behavior models.

16. The method of claim 11, wherein the generating of the reputation score is based on active learning and a context of the autonomous agent, the context based on one or more conditions of the autonomous agent at a time of collection of the data.

17. The method of claim 11, wherein the data includes a plurality of data values, and including:

generating relevance weights for the plurality of data values, the relevance weights to indicate an amount of consideration to be given a corresponding data value of the plurality of data values; and determining whether the autonomous agent is behaving anomalously based on the plurality of data values and the weights.

18. At least one non-transitory computer readable medium comprising computer readable instructions to cause at least one processor circuit to at least:

train a machine learning model based on reference sensor data, at least some of the reference sensor data corresponding to a first type of sensor for sensing a first environment external to ones of a plurality of autonomous agents, and at least some of the reference sensor data corresponding to a second type of sensor for sensing a second environment internal to at least one of the plurality of autonomous agents, the reference sensor data collected during normal operation of the plurality of autonomous agents;

execute the machine learning model to calculate a first data quality score for a first set of data values generated by one or more first sensors associated with a first autonomous agent of the plurality of autonomous agents, the one or more first sensors to be any of: (i) the first type of sensor, (ii) the second type of sensor, or (iii) the first type of sensor and the second type of sensor;

generate a first reputation score based on the first data quality score and at least some of the first set of data values, the first reputation score to indicate a level of confidence in an accuracy of the first data quality score; and control usage of the first set of data values by action circuitry of the first autonomous agent based on the first data quality score and the first reputation score, the first data quality score and the first reputation score being a first value and a second value, respectively.

19. The at least one non-transitory computer readable medium of claim 18, wherein to execute the machine learning model to calculate the first data quality score for the first set of data values, the instructions are to cause one or more of the at least one processor circuit to:

execute a function on the machine learning model, a set of operands of the function to include:

one or more correlation values indicating one or more correlations between (i) the first set of data values collected by the one or more first sensors of the first autonomous agent, and (ii) a second set of data values collected by one or more second sensors of a second autonomous agent of the plurality of autonomous agents, the one or more first sensors and the one or more second sensors being the first type of sensor, the second type of sensor, or any combination of the first type of sensor and the second type of sensor, and ones of the first set of data values, the ones of the first set of data values corresponding to ones of the one or more first sensors that are the second type of sensor.

20. The at least one non-transitory computer readable medium of claim 19, wherein the second type of sensor is to collect at least one of error correction code data, network transmission information, or predictive maintenance information.

21. The at least one non-transitory computer readable medium of claim 19, wherein the reference sensor data is first reference sensor data, and the instructions are to cause one or more of the at least one processor circuit to detect one or more anomalies in the first set of data, detection of the one or more anomalies based on second reference sensor data, the second reference sensor data associated with anomalous operation of any of the plurality of autonomous agents.

22. The at least one non-transitory computer readable medium of claim 19, wherein the instructions are to cause one or more of the at least one processor circuit to:

detect an anomaly in the first set of data values;

detect noise in the first set of data values;

query a database including previously stored data values and corresponding context information, the query performed based on the noise and the anomaly being detected;

cause one or more results of the query to be presented at a user interface; and make an adjustment the first data quality score and the first reputation score to determine an adjusted first data quality score and an adjusted first reputation score, the adjustments based on an input supplied at the user interface, and the input based on the one or more results of the query.

23. The at least one non-transitory computer readable medium of claim 22, wherein the instructions are to cause one or more of the at least one processor circuit to supply the adjusted first data quality score and the adjusted first reputation score to the machine learning model as training data.

24. The at least one non-transitory computer readable medium of claim 22, wherein the corresponding context information includes information identifying conditions at one or more times of collection of the previously stored data values.

* * * * *